(12) United States Patent
Huck et al.

(10) Patent No.: US 8,892,004 B2
(45) Date of Patent: Nov. 18, 2014

(54) DRIVE GEAR FOR EXTENDED DRIVE SHAFT

(71) Applicant: Static Control Components, Inc., Sanford, NC (US)

(72) Inventors: Donald R. Huck, Sanford, NC (US); Lawrence Dale Lewis, Sanford, NC (US); William L London, Sanford, NC (US)

(73) Assignee: Static Control Components, Inc., Sanford, NC (US)

( * ) Notice: Subject to any disclaimer, the term of this patent is extended or adjusted under 35 U.S.C. 154(b) by 0 days.

(21) Appl. No.: 14/175,593

(22) Filed: Feb. 7, 2014

(65) Prior Publication Data

US 2014/0153968 A1    Jun. 5, 2014

Related U.S. Application Data

(63) Continuation-in-part of application No. 14/172,351, filed on Feb. 4, 2014, and a continuation of application No. 13/074,849, filed on Mar. 29, 2011, now Pat. No. 8,644,733.

(51) Int. Cl.
*G03G 21/18* (2006.01)
*G03G 15/00* (2006.01)

(52) U.S. Cl.
CPC .......... *G03G 15/757* (2013.01); *G03G 21/1857* (2013.01)
USPC ............................ 399/167; 399/159; 399/106

(58) Field of Classification Search
None
See application file for complete search history.

(56) References Cited

U.S. PATENT DOCUMENTS

| | | | |
|---|---|---|---|
| 6,473,580 B1 | 10/2002 | Inomata | |
| 7,885,575 B2 | 2/2011 | Batori | |
| 8,121,517 B2 | 2/2012 | Asanuma | |
| 8,135,304 B2 | 3/2012 | Abe | |
| 8,233,821 B2 | 7/2012 | Miyabe | |
| 8,249,483 B2 | 8/2012 | Holmes | |
| 8,254,812 B2 | 8/2012 | Hugang | |
| 8,270,876 B2 | 9/2012 | Morioka | |
| 8,275,286 B2 | 9/2012 | Ueno | |
| 8,280,278 B2 | 10/2012 | Ueno | |
| 8,295,734 B2 | 10/2012 | Ueno | |
| 8,369,744 B2 | 2/2013 | Asanuma | |
| 8,391,748 B2 | 3/2013 | Miyabe | |
| 8,417,154 B2 | 4/2013 | Nieda | |
| 8,433,219 B2 | 4/2013 | Miyabe | |
| 8,437,669 B2 | 5/2013 | Morioka | |
| 8,494,411 B2 | 7/2013 | Miyabe | |
| 8,532,533 B2 | 9/2013 | Ueno | |
| 8,565,640 B2 | 10/2013 | Batori | |
| 8,615,184 B2 | 12/2013 | Zhou | |
| 8,630,564 B2 | 1/2014 | Ueno | |
| 2008/0152388 A1 | 6/2008 | Ueno | |
| 2008/0240796 A1 | 10/2008 | Morioka | |
| 2008/0260428 A1 | 10/2008 | Ueno | |
| 2009/0317131 A1 | 12/2009 | Morioka | |
| 2009/0317132 A1 | 12/2009 | Asanuma | |
| 2009/0317134 A1 | 12/2009 | Miyabe | |
| 2009/0317135 A1 | 12/2009 | Miyabe | |
| 2010/0054823 A1 | 3/2010 | Takasaka | |
| 2011/0217073 A1 | 9/2011 | He | |
| 2012/0183331 A1* | 7/2012 | Huang et al. | 399/167 |
| 2013/0136492 A1 | 5/2013 | Xu | |
| 2013/0322924 A1 | 12/2013 | Kondo et al. | |

* cited by examiner

*Primary Examiner* — Clayton E Labelle
*Assistant Examiner* — Jas Sanghera

(57) ABSTRACT

A cartridge drive gear assembly for holding a drum coupling includes a drive gear having an outer surface and an inner surface, the inner surface including inner projections which extend into the interior of the drive gear and includes at least two voids disposed on opposing sides of the inner projections, and at least one slot disposed in the inner surface.

11 Claims, 70 Drawing Sheets

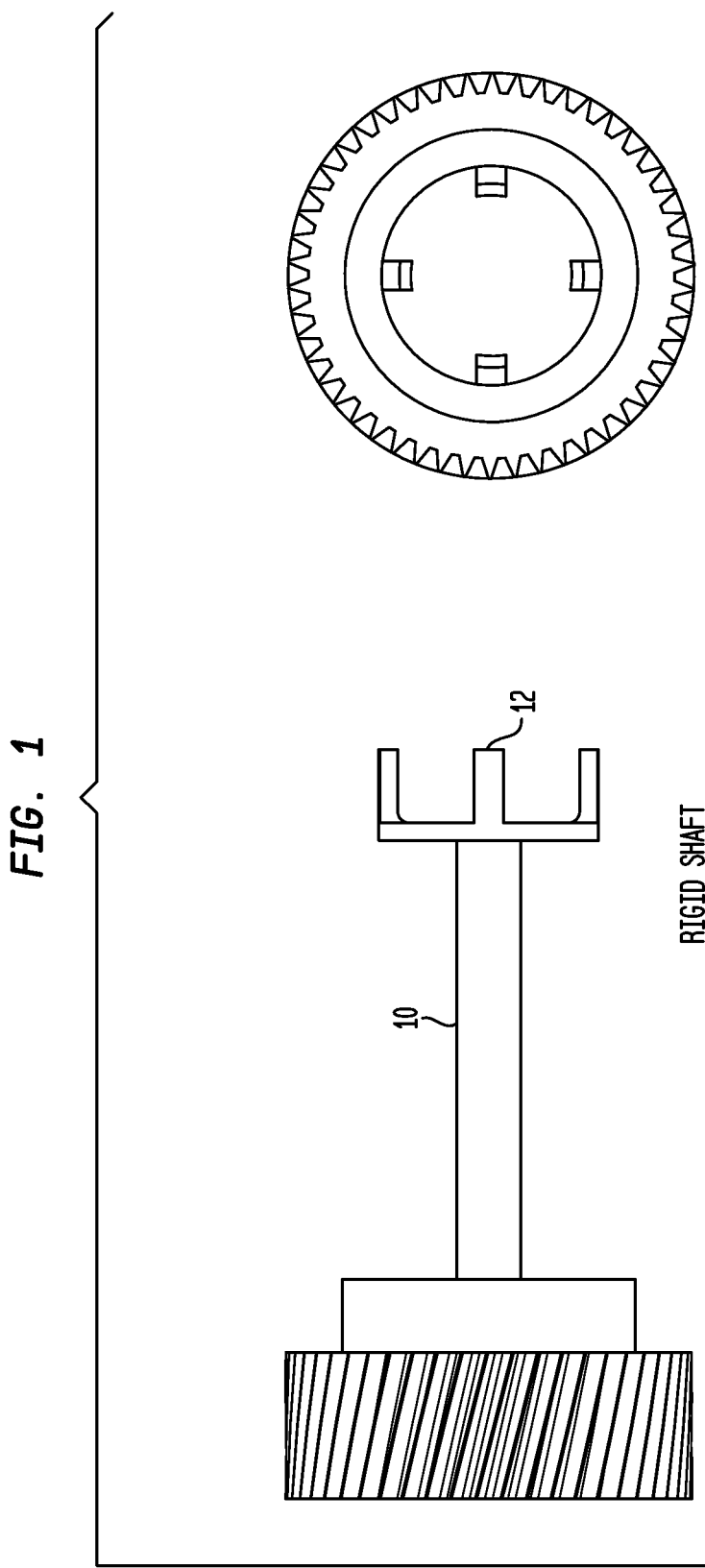

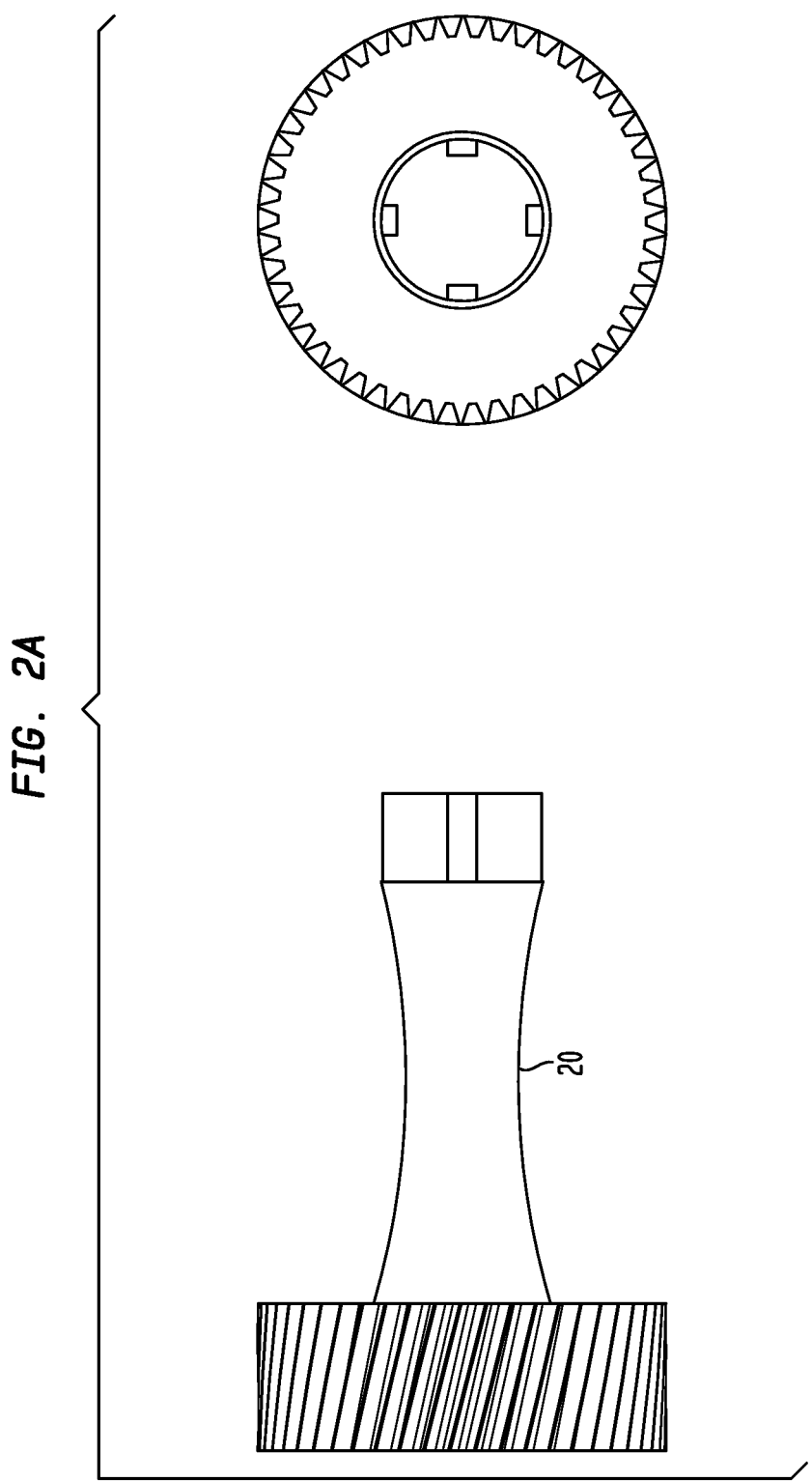

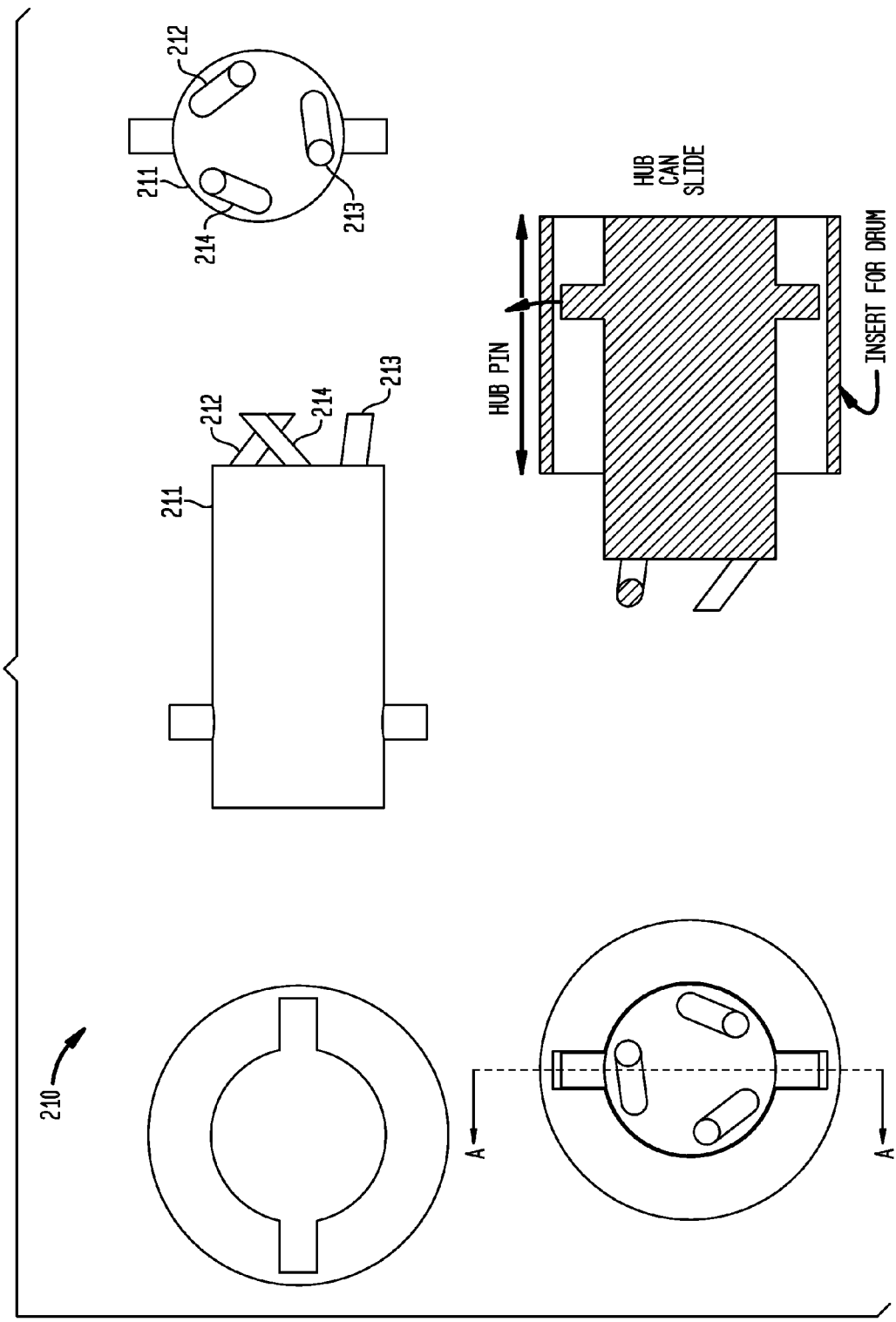

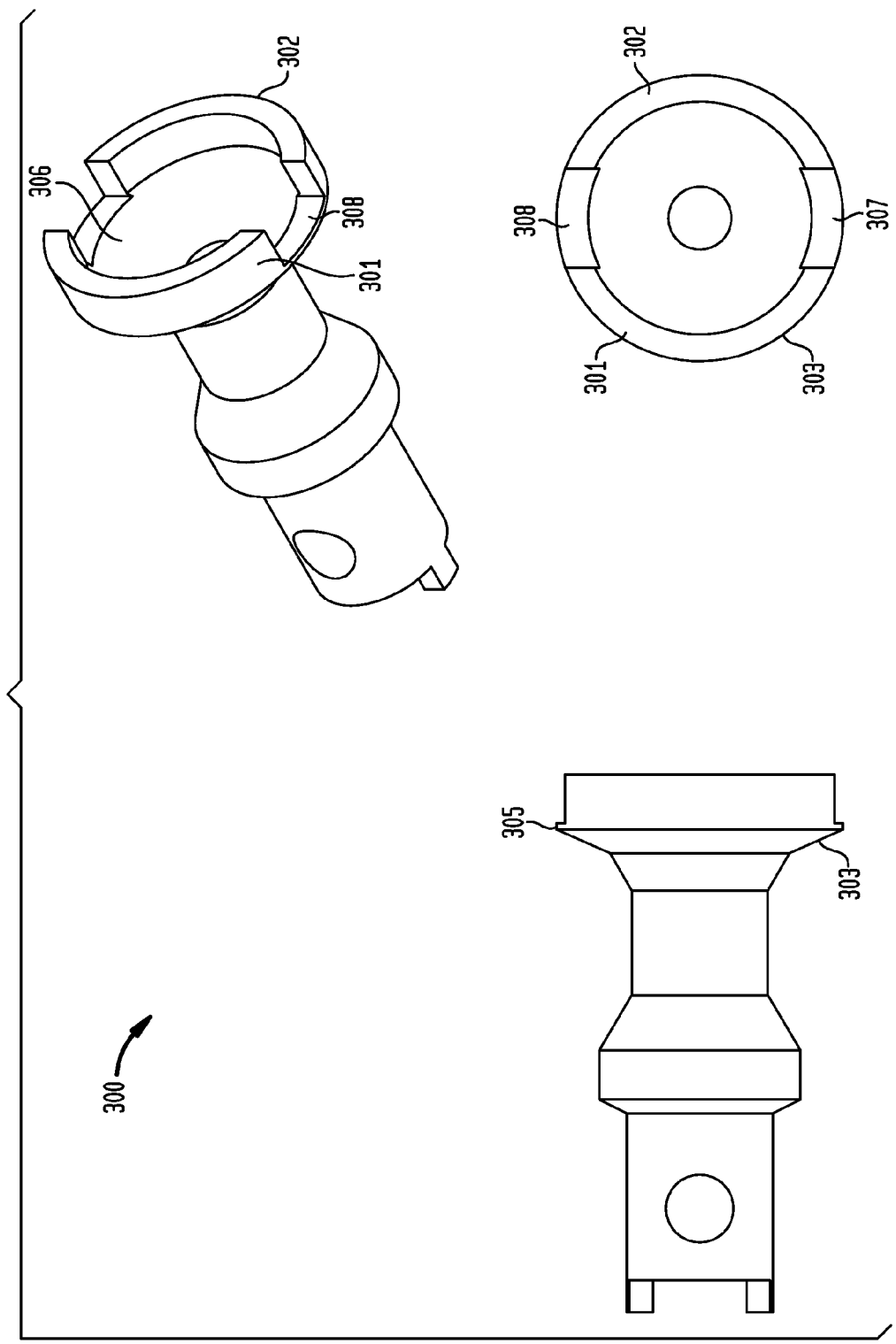

FIG. 45
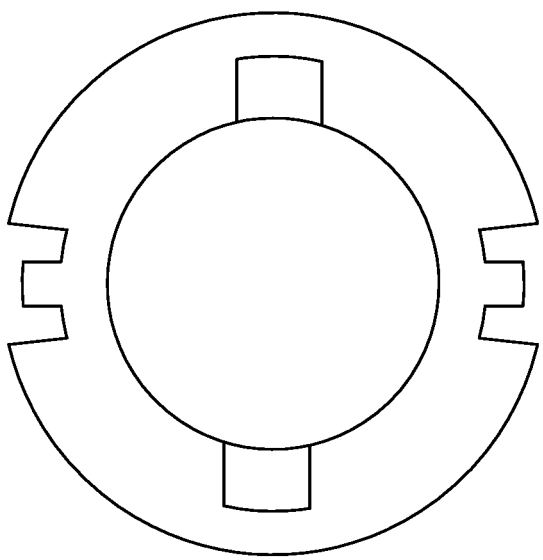
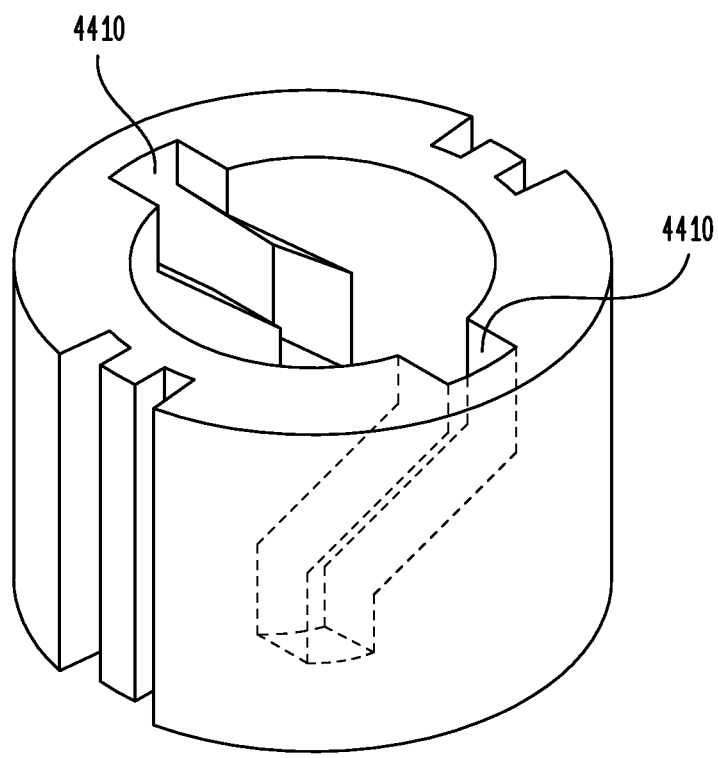

FIG. 53 SECTION A-A

SECTION A-A

SECTION B-B

SECTION B-B

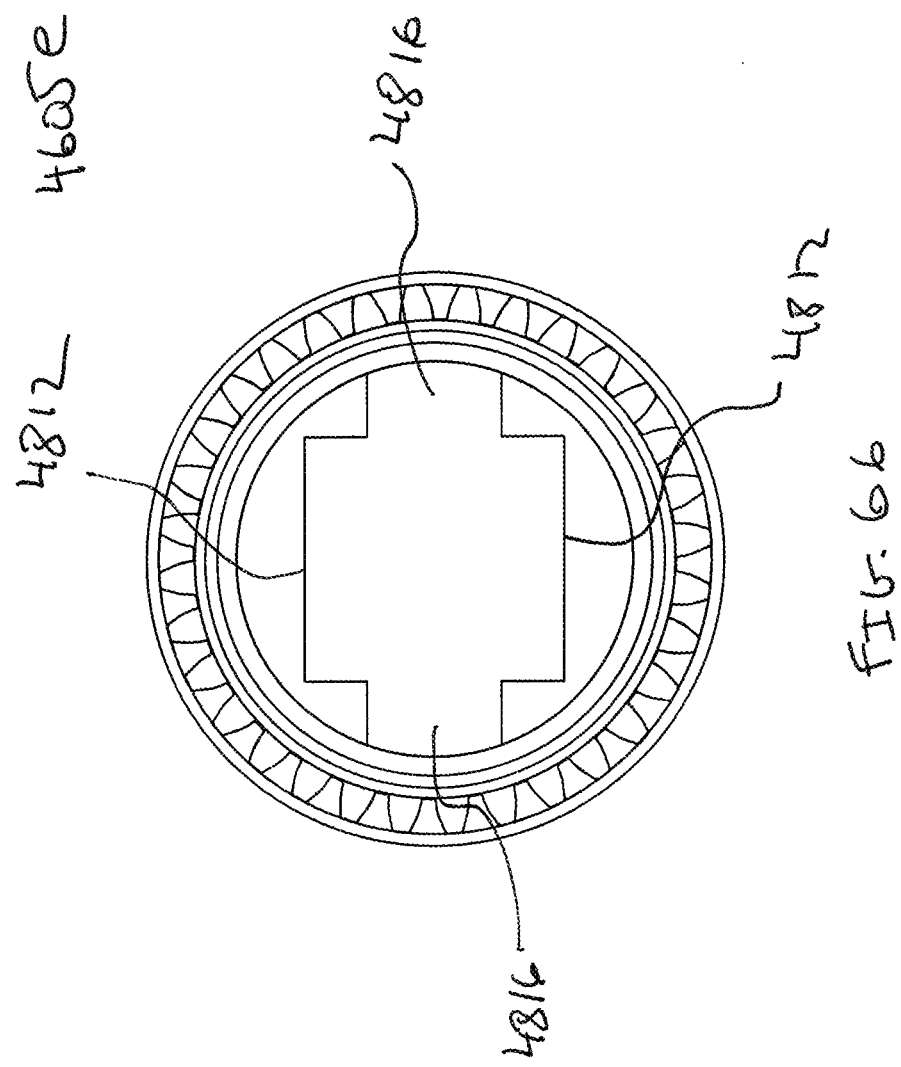

US 8,892,004 B2

DRIVE GEAR FOR EXTENDED DRIVE SHAFT

This application is a continuation-in-part of U.S. patent application Ser. No. 14/172,351 entitled "Cartridge Drive Shaft Gear" filed on Feb. 4, 2014, which is a continuation of U.S. patent application Ser. No. 13/074,849 filed on Mar. 29, 2011, now U.S. Pat. No. 8,644,733 which issued Feb. 4, 2014, both of which are herein incorporated by reference in their entirety. This application claims the benefit of previously filed U.S. Provisional Patent Application No. 61/965,613, entitled "Drive Gear Design for Extended Drive Shaft" which was filed on Feb. 3, 2014, which is incorporated by reference herein in its entirety.

BACKGROUND OF THE INVENTION

New laser printer models are introduced incorporating new and enhanced technology and designs improved over the previous existing laser printer models. This evolution in laser printers necessitates corresponding improvements in laser printer ink and toner cartridge.

A used ink or toner cartridge can be remanufactured to recycle and reuse the cartridge components and to extend the cartridge's life. Remanufacturing involves replacing a number of the components that have been worn out. The cartridge is also refilled with new toner and both the organic photoconductor (OPC) drum and the waste toner wiper blade are replaced. The remanufacturer must obtain replacement parts that perform the same function as the original cartridge components and also interface with the printer's components. Replacement components are purchased in the aftermarket. In one aspect, the present system is directed to the design of the cartridge drive gear shaft that attaches to an aftermarket replacement print cartridge. The shaft gear drives the gear train in a laser printer cartridge, which in turn operates all of the cartridge's moving components.

SUMMARY OF INVENTION

The present invention allows for the remanufacturing of a toner cartridge used in a printer while maintaining all of the desired features of the original toner cartridge.

A cartridge drive gear assembly for holding a drum coupling comprising a drive gear having an outer surface and an inner surface, the inner surface including inner projections which extend into the interior of the drive gear and includes at least two voids disposed on opposing sides of the inner projections; and at least one slot disposed in the inner surface.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention;

FIG. 1 illustrates a one piece cartridge drive gear shaft;

FIGS. 2A and 2B illustrate a two piece cartridge drive gear shaft;

FIGS. 21A & 21B illustrate an equidistantly spaced, non-parallel, non-perpendicular angled prongs on the working end of the drive shaft;

FIG. 30 illustrates a circular shapes and recess working end for the cartridge drive gear shaft;

FIG. 45 illustrates another embodiment of the interior of the print cartridge gear;

FIGS. 62-66 show alternative embodiments of a drive gear assembly in accordance with the present invention.

DETAILED DESCRIPTION OF THE DRAWINGS

Figure 2B:
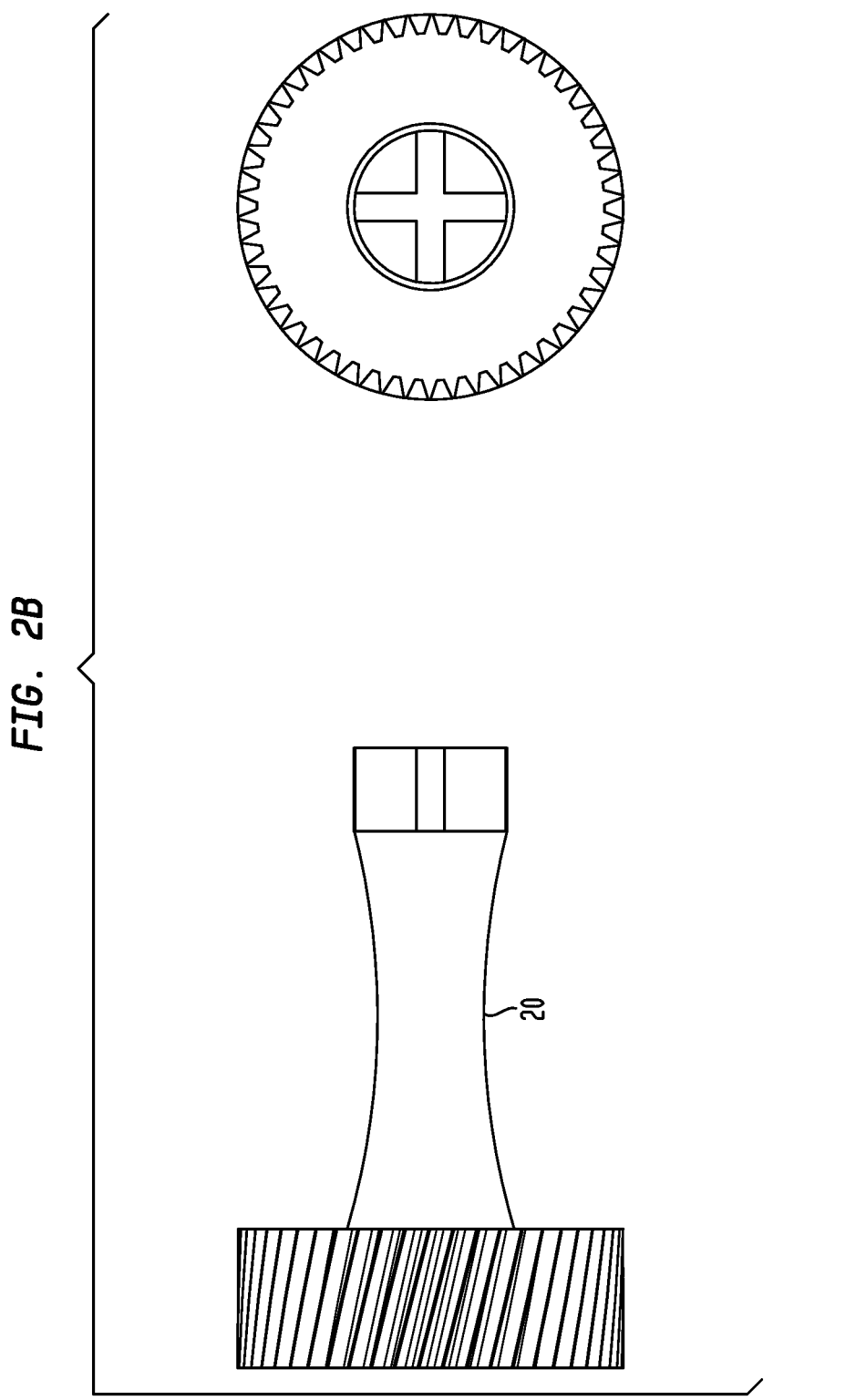

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

The prior cartridge drive gear shaft is movable around a ball joint which is formed between the drive shaft and OPC gear. A remanufactured cartridge can be implemented that replaces the ball joint with a gear shaft that is in a permanent fixed position.

FIG. 1 illustrates an apparatus to replace the cartridge drive gear shaft 10. The one piece is fixed and does not contain moving parts. As such, the shaft cannot be slanted, inclined, swung, pivoted, or rotatable in any direction relative to the axis and cannot necessarily be linearly slanted to any angle in the full range of 360-degree direction in the coupling. This one piece design replaces both the OPC gear and the cartridge drive gear shaft together as one unit. An advantage to this embodiment is that this piece can be manufactured as one solid unit that keeps the cartridge drive gear shaft in a fixed position. The cartridge drive gear shaft 10 has an end 12 that engages with a drive member located inside of the printer.

FIG. 2A and FIG. 2B illustrate a two piece design of the OPC gear where the cartridge drive gear shaft 20 is separate and the OPC gear and cartridge gear shaft can be attached together during remanufacturing of the print cartridge. The separate cartridge drive gear shaft can be attached to the OPC gear with use of at least one extruded guide on the gear shaft that interface with recessed portions of OPC gear and lock once mated together. These two pieces can be attached through a physical interference "snap fit" or through the use of adhesive.

Figure 3:
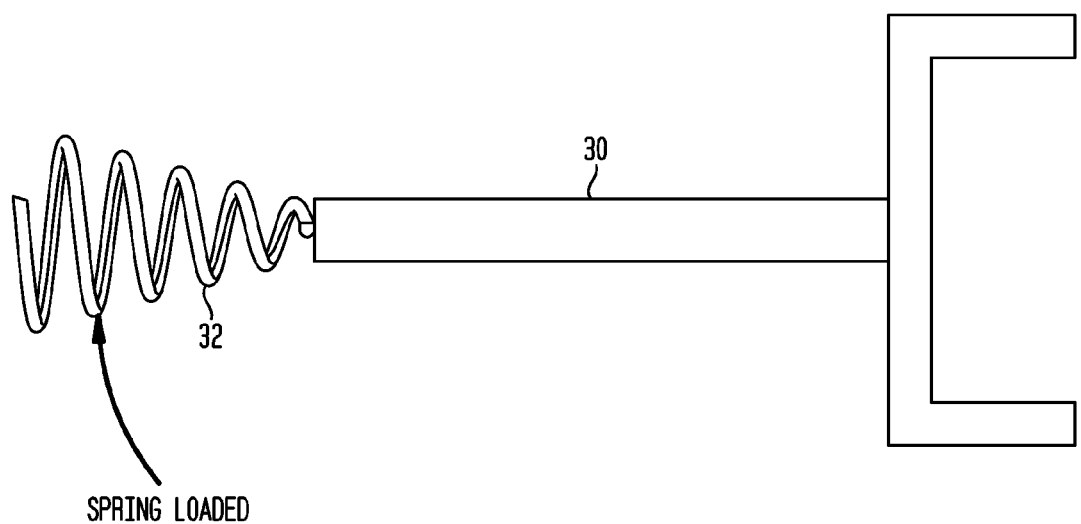
FIG. 3 illustrates a solid fixed mount cartridge drive gear shaft which is attached to the OPC gear.

FIG. 3 illustrates a solid fixed mount cartridge drive gear shaft 30 which is attached to the OPC gear. The cartridge drive gear shaft 30 includes a mechanism consisting of a spring 32 that enables the working end of the cartridge drive gear shaft to move in and out around the printer drive member (not shown) when the print cartridge is installed into the printer. When the cartridge is fully seated into the laser printer the spring would apply a force in the outward direction to ensure an engagement action between the cartridge drive gear shaft and the printer drive member.

An advantage of the previous embodiments is that a cartridge can be remanufactured with inexpensive parts that are sturdy. But, these fixed gear shafts may have difficulty interacting with the printer drive member. The following embodiments alleviate this problem by providing a fixed gear shaft that has some capability for movement.

Figure 4:
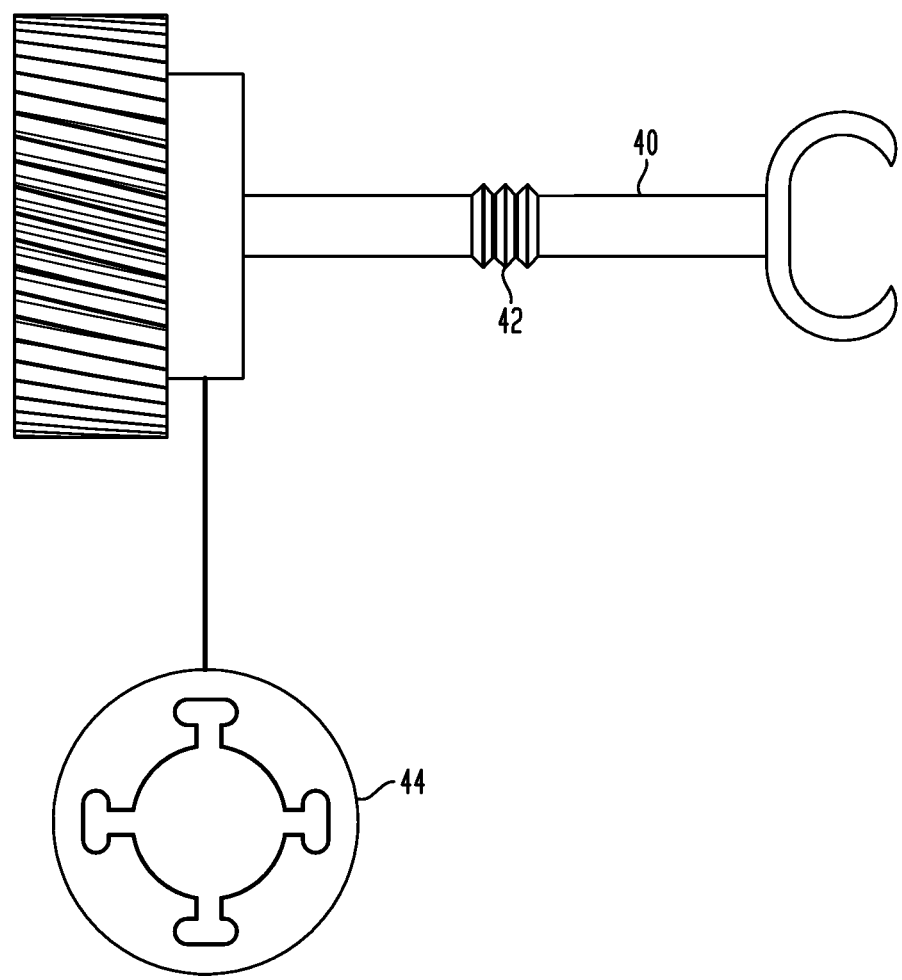
FIG. 4 illustrates another embodiment where a gear shaft that is mounted to the OPC gear in a fixed solid position.

FIG. 4 illustrates a gear shaft 40 that is mounted to the OPC gear in a fixed solid position as previously described. The cartridge drive gear shaft can be mounted with multiple legs that fit into the OPC gear hub 44. The gear shaft includes a flexible section 42 in the middle that enables the cartridge drive gear shaft to be able to move to accommodate slight position changes in the printer drive member. The middle section 42 of the cartridge drive gear shaft may be made of a rubber material or can be comprised of any material that possess flexible properties.

Figure 5:
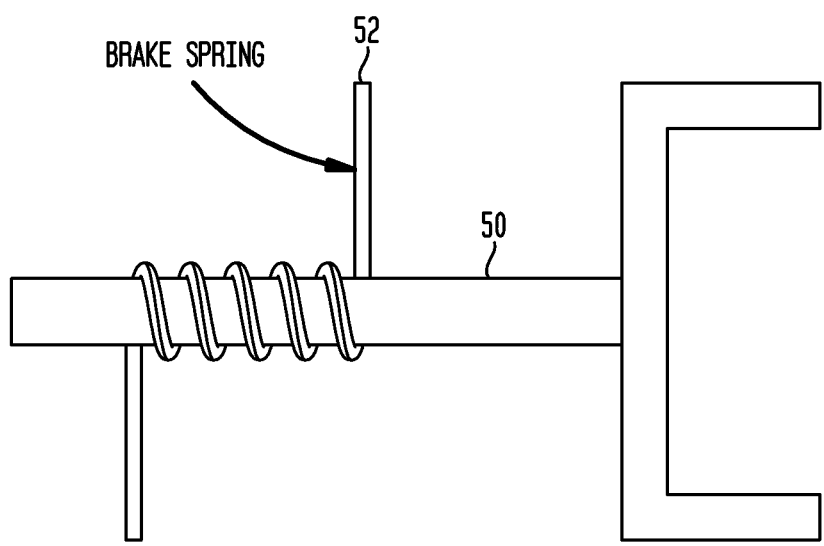
FIG. 5 illustrates a cartridge drive gear shaft having a spring.

FIG. 5 illustrates a cartridge drive gear shaft 50 having a spring 52 in the shaft which assists in the turning. The cartridge drive gear shaft 50 is able to rotate in one direction but cannot turn back in the opposite direction.

As previously disclosed, the prior art drive gear shaft is moveable around a ball joint. The following embodiments allow for a drive gear shaft that has similar movement without using a ball joint.

Figure 6:
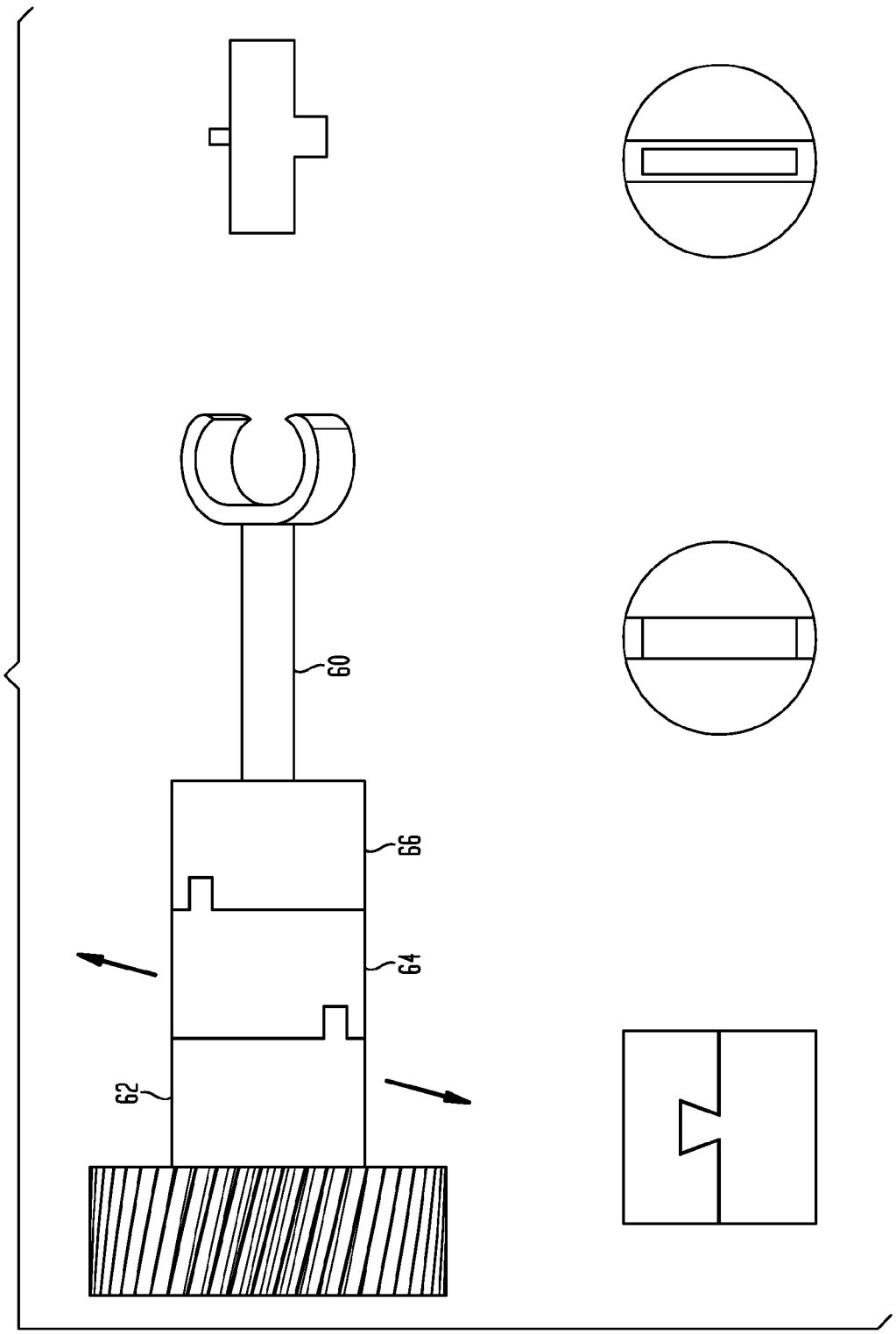
FIG. 6 illustrates a gear design that comprises of three cylindrical sections.

FIG. 6 illustrates replacing the prior art cartridge drive gear shaft with a gear design that comprises of three cylindrical sections 62, 63, 64 that are all the same size and shape but can move independently in separate directions. The sections 62, 63, 64 are attached through T slots that engage each piece and allow them to move, but only along one plane. The first piece 62 can move in X direction while the second piece 63 can move in the Y direction and the individual sections can move at the same time in opposite directions. The cartridge drive gear shaft 60 is located on the third section 64 of the gear assembly and is in a position to engage with the printer drive member.

Figure 7:
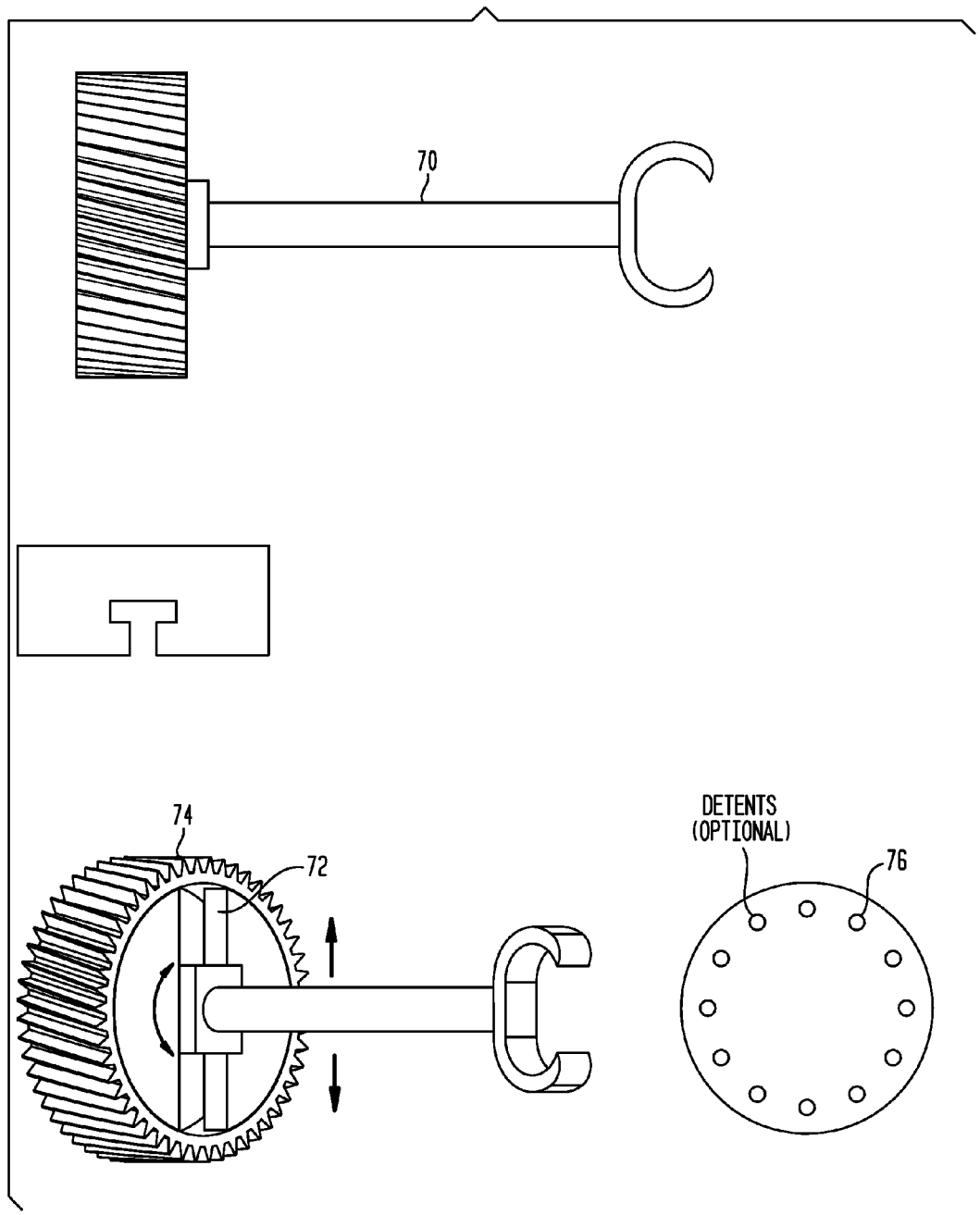
FIG. 7 illustrates a cartridge drive gear shaft that can mount to the OPC gear and move along one plane in two directions.

FIG. 7 illustrates a cartridge drive gear 70 shaft that can mount to the OPC gear and move along one plane in two directions. This can be achieved by having a slot 72 cut through the inside the gear, but not completely through the exterior walls 74. The cartridge drive gear shaft 70 has a T type design that slides into the slot 72, but cannot be pulled out of the gear. This design allows the cartridge drive gear shaft 70 to move on a plane and engage the printer drive member in different locations. Additionally the gear may contain detents 76.

Figure 8:
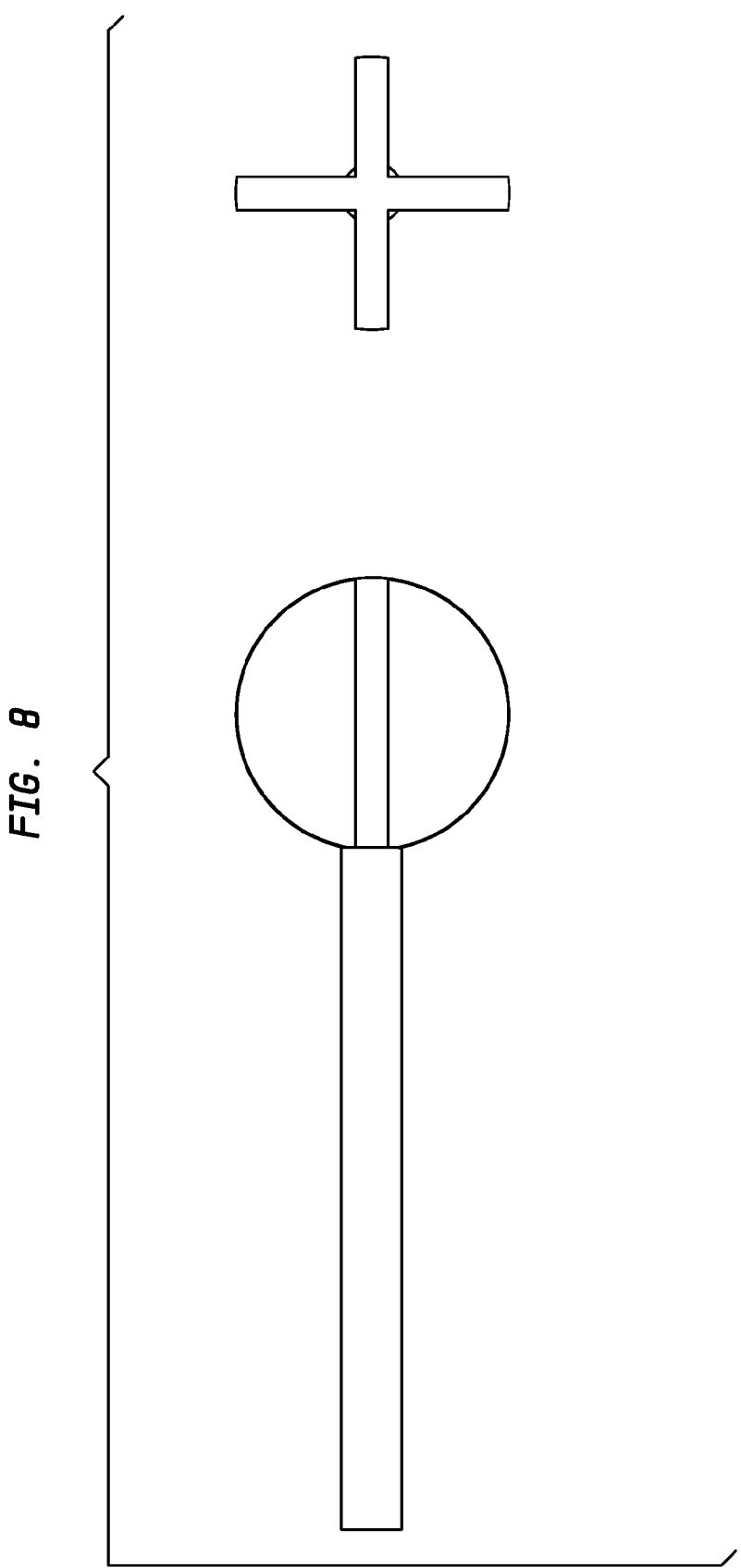
FIG. 8 illustrates another embodiment where a solid gear shaft that is mounted to the OPC gear in a fixed solid position.

FIG. 8 illustrates a solid gear shaft that is mounted to the OPC gear in a fixed solid position as previously described. The gear shaft includes a swivel section in the middle that enables the cartridge drive gear shaft to move and accommodate position changes in the printer drive member. One section of the shaft includes one or more notches or extruded features that are rounded in shape. This section mounts to the second portion of the cartridge drive gear shaft which has an open recessed area that receives the first notched extruded section of the cartridge drive gear shaft. Once the two features are mated together they will lock.

Figure 9:
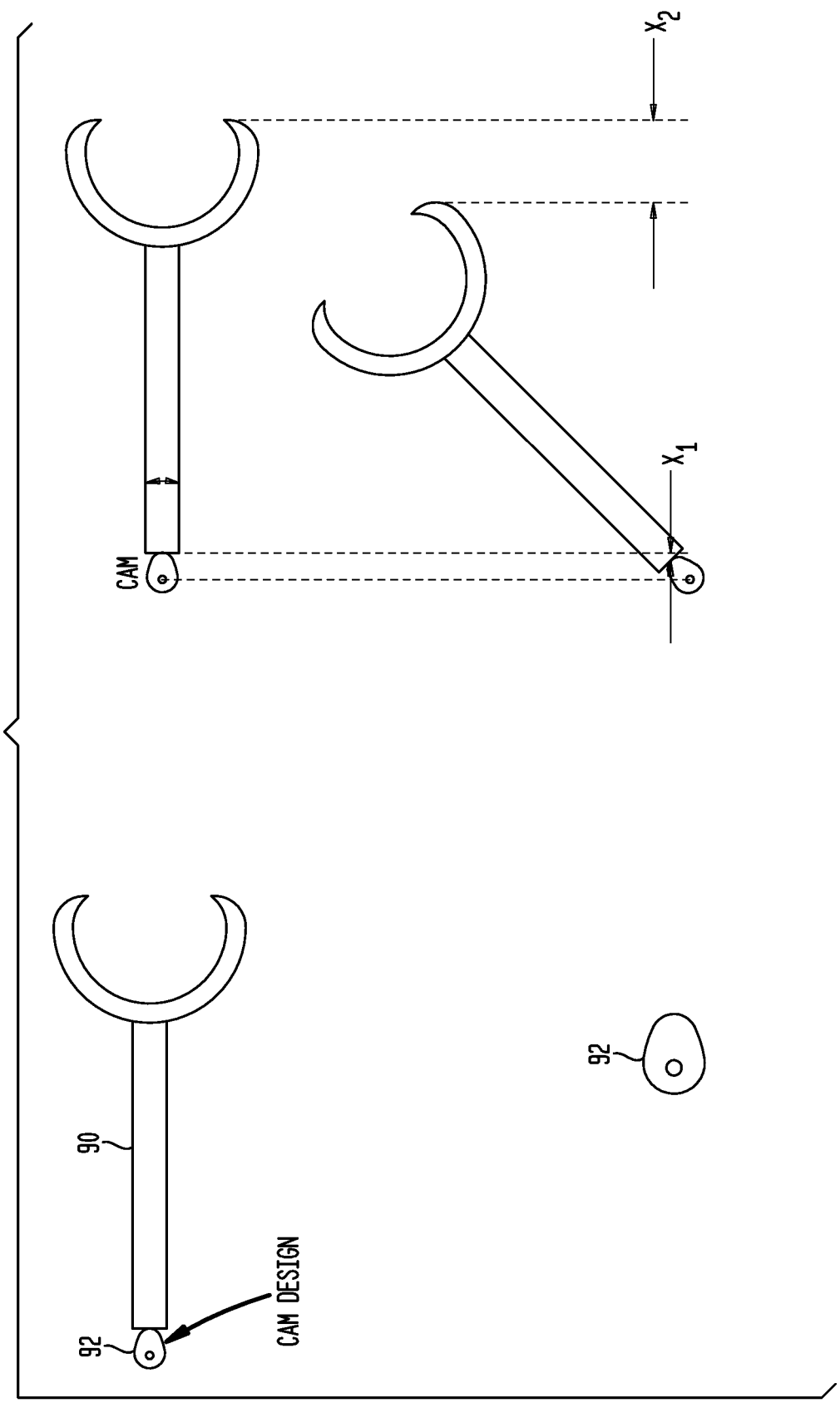
FIG. 9 illustrates a cartridge drive gear shaft mounted to the OPC gear through a cam design.

FIG. 9 illustrates a cartridge drive gear shaft 90 mounted to the OPC gear through a cam mechanism 92. The cam mechanism 92 should be located at the point where the cartridge drive gear shaft 90 and the OPC gear are joined. The cam mechanism 92 allows the cartridge drive gear shaft 90 to have a range of motion. When the printer cartridge is seated into the laser printer the cartridge drive gear shaft 90 engages the printer drive member. Initially the cartridge drive gear shaft 90 has a range of motion, but once the cartridge drive gear shaft 90 has been moved through and past the operational positioning of the cam mechanism 92 it is locked into an engaging position with a predetermined amount of force set by the dimensions and interference of the cam mechanism 92.

Another embodiment is directed to the working end of the cartridge drive gear shaft which connects to and covers the printer drive mechanism. The printer drive mechanism consists of a rotating conical, hemisphere with two smaller cylinder shaped points protruding from opposite sides of the working end of the hemisphere in a diametrically opposed orientation. As the printer cartridge slides into the printer device, the working end of the cartridge drive gear shaft glides over, seats on top of, and covers the printer drive mechanism. The working end comprises a hemispherical indentation that covers the hemispherical printer drive shaft mechanism. The working end also contains four slotted, extruded pieces. As the printer drive mechanism is activated, it rotates and the two points engage and slide into two of the four slots located between the extruded pieces. It is this working end that is improved upon in the present embodiment such that the proposed embodiments will also fit over the hemisphere drive mechanism and also engage at least one of the drive mechanism points.

Figure 10:
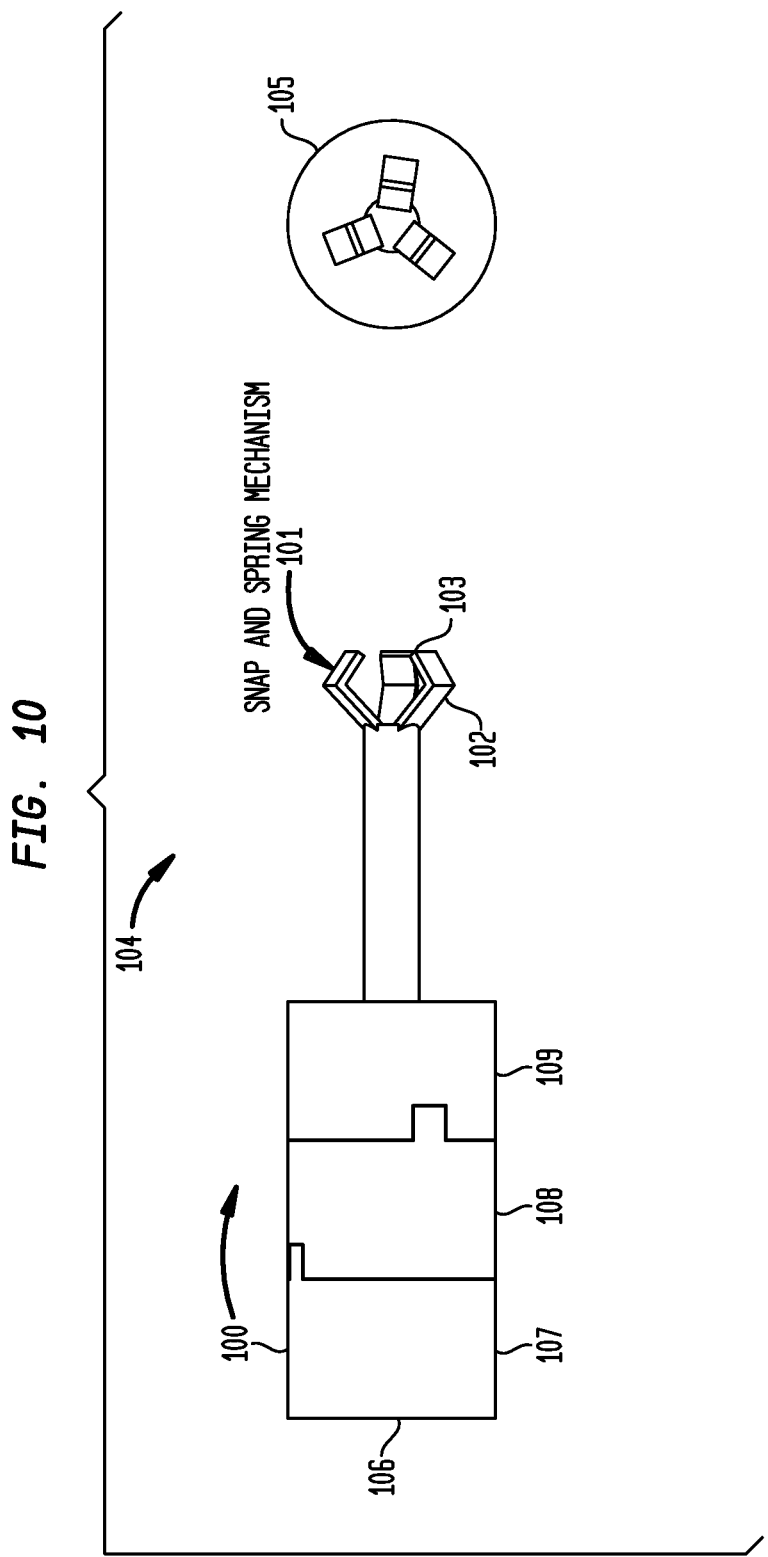
FIG. 10 illustrates a cartridge drive gear shaft having a working end with a plurality of elongated claw-type arms.

FIG. 10 illustrates a working edge 100 with a plurality of elongated claw-type arms 101, 102, 103. The claw arms 101, 102, 103 may assume a closed position when the printer cartridge is inserted into the printer. The claw arms may open 104 and slide over the printer drive mechanism as the cartridge is inserted into the printer. The claw arms may then close 105 due to spring tension applied to each arm individually as the cartridge is fully seated into the laser printer. The closed arms 104 would accommodate the printer drive mechanism and engage the points on the printer drive mechanism. The rotation of the printer drive mechanism may also engage the arms and receive the rotational force from the printer drive mechanism. The rotation of the print drive mechanism rotates the engaged arms attached to the working end of the cartridge drive shaft member and thereby rotates the entire drive shaft, which rotates the affiliated components within the print cartridge. In order to facilitate the positioning of the cartridge drive shaft and arms over the printer drive member, the working end of the drive shaft may be attached to the remainder of the drive shaft by use of an Oldham coupler 106. The Oldham coupler 106 comprises three stacked and connected discs 107, 108, 109 with the center disc rotating at the same speed as the input or output motion. Such a coupler may enable the working end to shift in a plurality of axial directions for greater freedom of movement as the drive shaft working end is seated onto the printer drive member.

Figure 11:
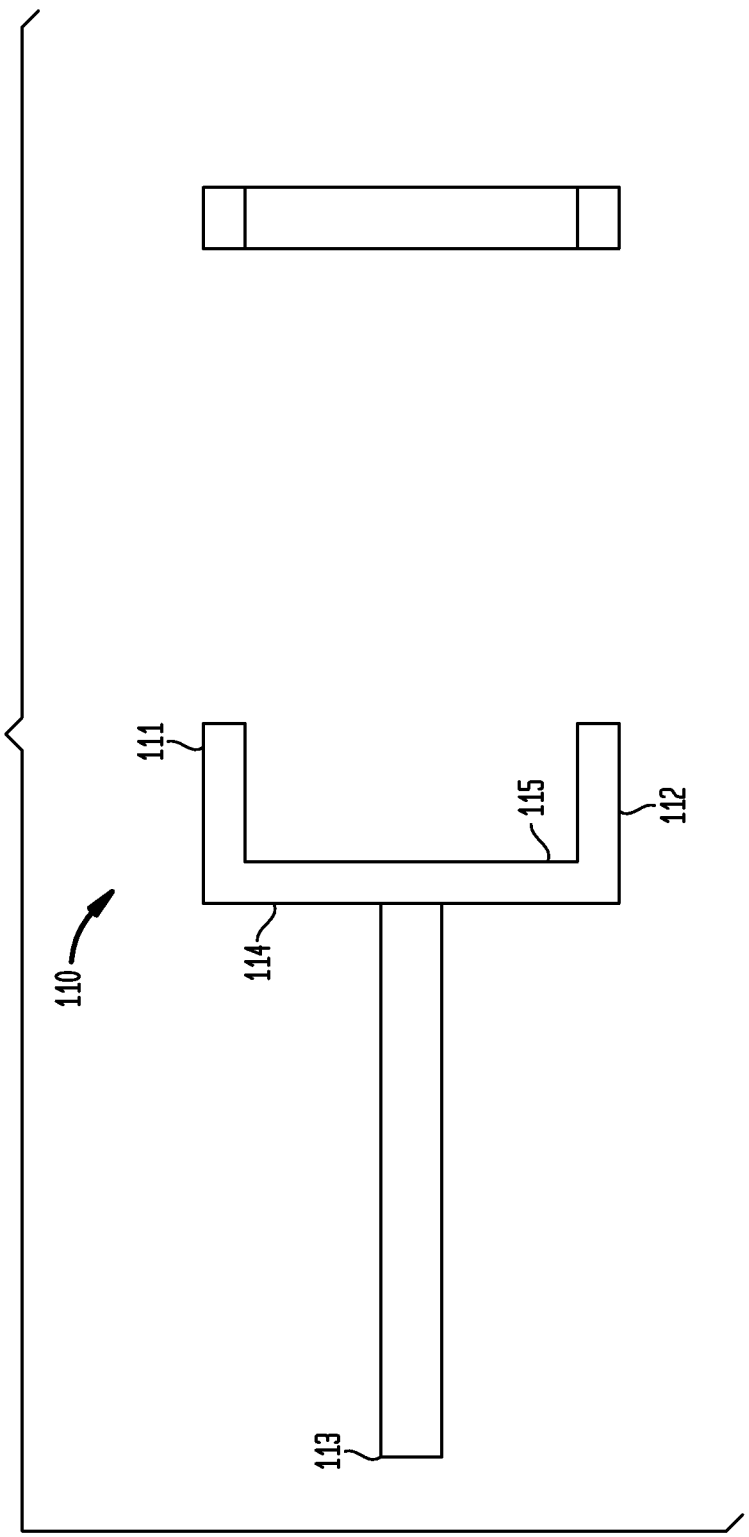
FIG. 11 illustrates a cartridge drive gear shaft having a working end with a plurality of extruded arms.

FIG. 11 illustrates a working end edge 110 containing a plurality of extruded arms 111, 112 branching off from the working end of the shaft 113. Each arm extends from the working end and may extend in a manner such as, but not limited to, from a common section 114 at an angle 115, in a curved, parabolic, or non-uniform manner from the working end. Each individual extruded arm may also extend in a different manner such that one arm might extend at an angle while another may extend in a curved manner. The extruded arms serve to collectively engage the points on the printer drive mechanism when the print cartridge is installed into the printer.

Figure 12:
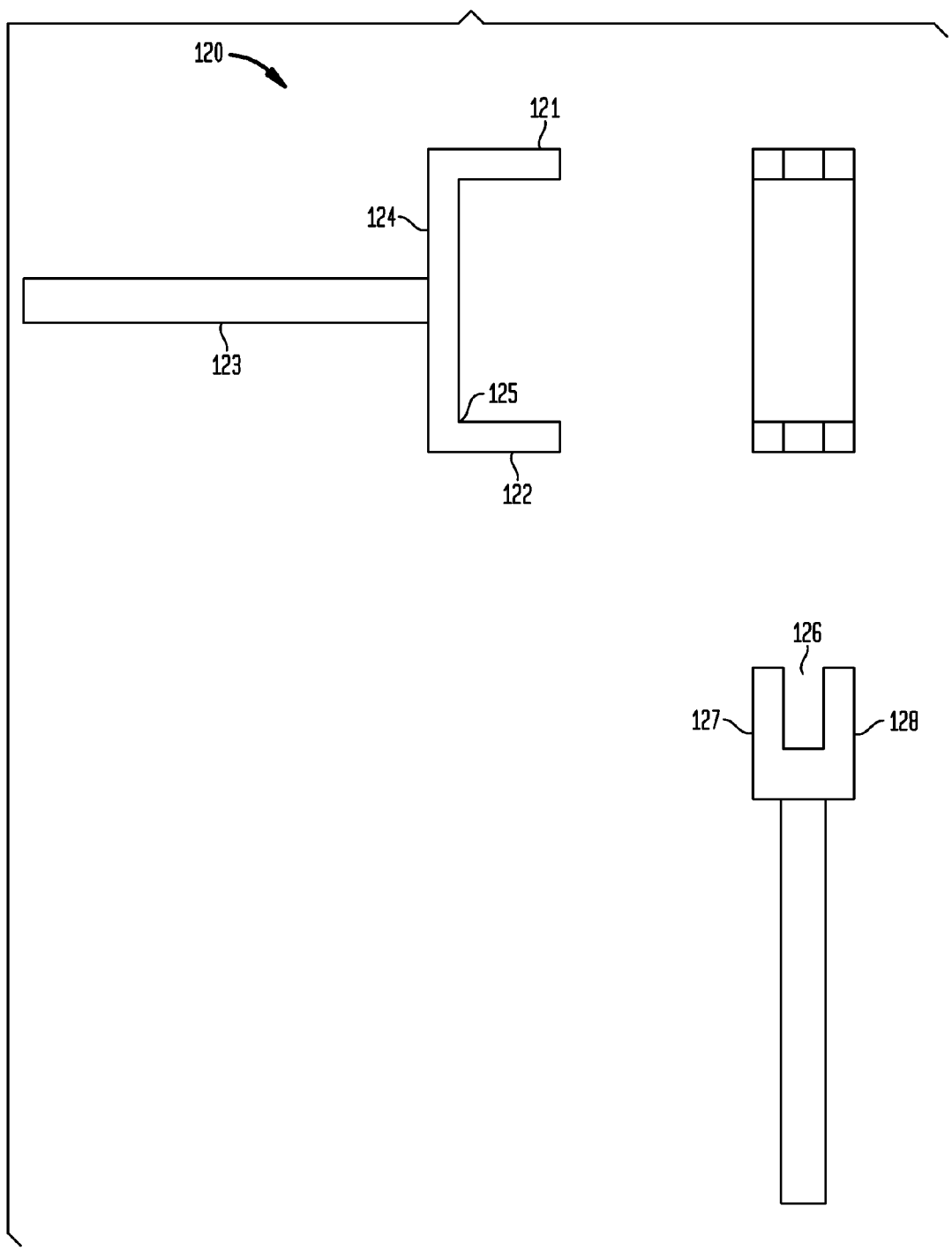
FIG. 12 illustrates another cartridge drive gear shaft having a working end with a plurality of extruded arms.

FIG. 12 illustrates a working end edge 120 containing a plurality of extruded arms 121, 122 branching off at an angle 125 from a common piece 124 connected to the working end 123 of the shaft. Each arm contains two singular extruded arms 121, 122 opposite of each other where the two singular extrusions 127, 128 contain a predetermine gap 126. The plurality of extruded arms with small predetermined gaps would seat onto the points on the printer drive mechanism and would engage the points on the printer drive mechanism when the print cartridge is installed into the printer.

Figure 13:
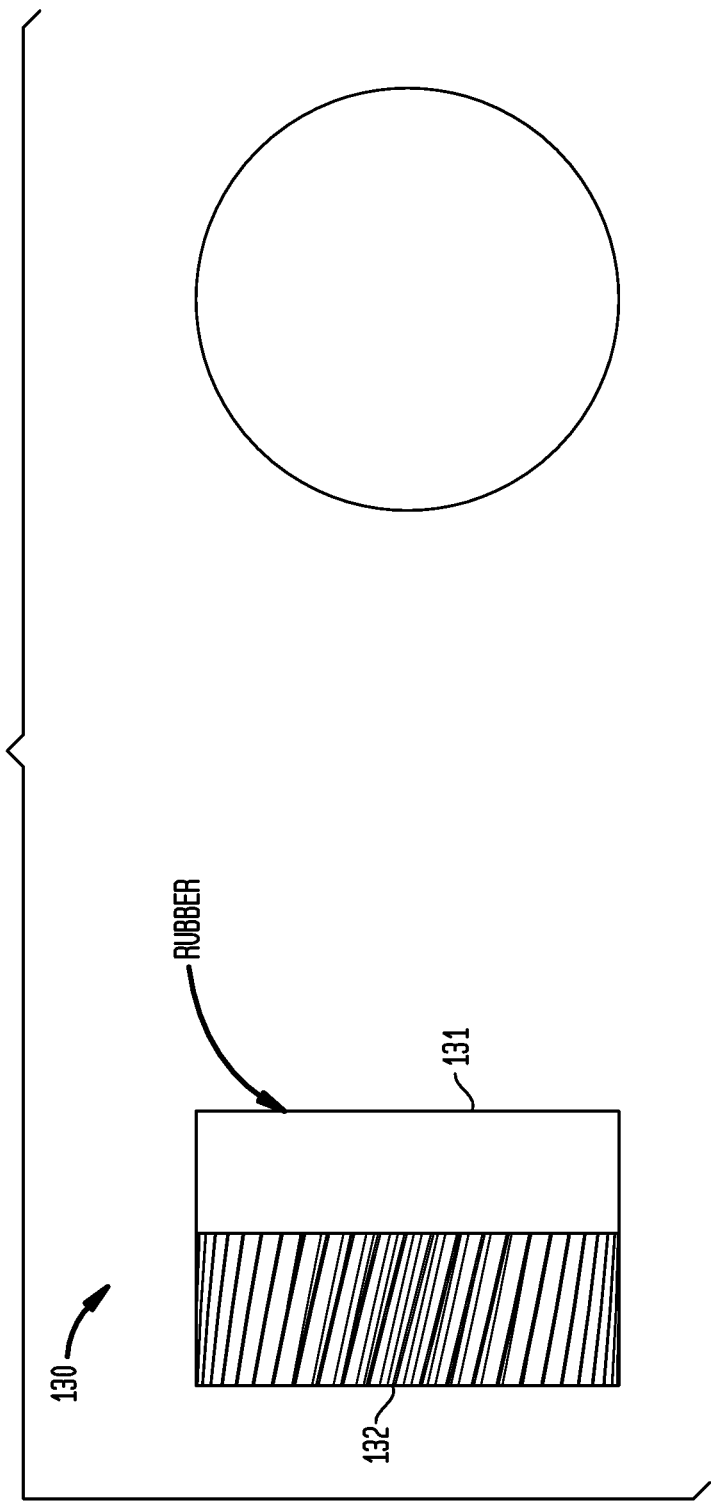
FIG. 13 illustrates a cartridge drive gear shaft having a working end made of a flexible material.

FIG. 13 illustrates a rubber working end 130 of the cartridge drive shaft. The rubber end 131 would be connected to a drive shaft 132 made out of a conventional material such as but not limited to metal or rubber. After the print cartridge is inserted into a printer, the rubber working end 131 would deform as it comes into contact with the printer drive mechanism. The rubber working end would then reform around the printer drive mechanism and tightly grip both the hemispherical surface of the printer drive mechanism and the points. Once the grip forms between the rubber working end of the drive shaft and the printer drive mechanism, the rotational motion of the printer mechanism would be transferred and would rotate the cartridge drive shaft. The rubber working end may be formed in a plurality of shapes including, but not limited to, the designs mentioned within the present application. The working portion is not limited to a rubber material, but can be comprised of different materials that would deform around the solid printer drive mechanism or possess properties similar to rubber.

Figure 14:
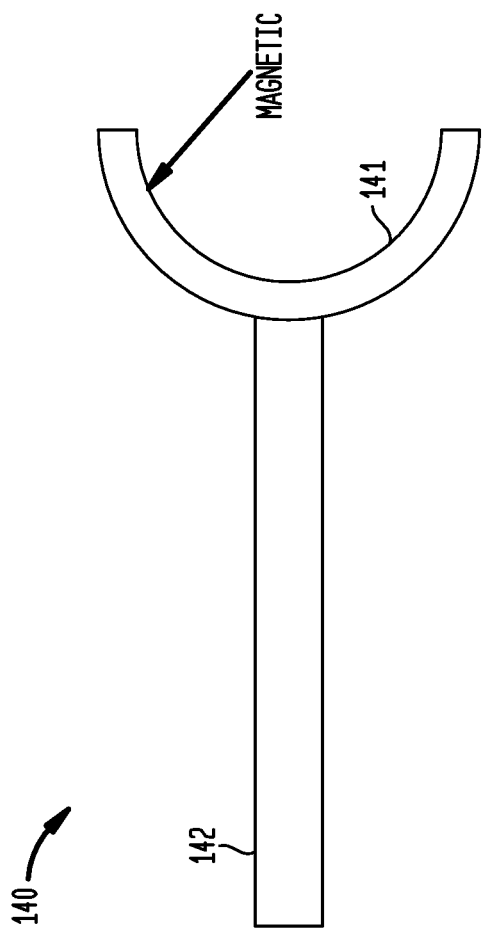
FIG. 14 illustrates a magnet working end attached to a cartridge drive shaft.

FIG. 14 illustrates a combination 140 of magnet working end 141 attached to the cartridge drive shaft 142. After the print cartridge is inserted into a printer, the magnetic working end 141 would be attracted to the metallic printer drive mechanism. The magnetic 141 end would then attach to the metal printer drive mechanism and tightly grip both the hemispherical surface of the printer drive mechanism and the points. Once the grip forms between the magnetic working end 141 of the drive shaft and the printer drive mechanism, the rotational motion of the printer mechanism would be transferred and would rotate the cartridge drive shaft. The magnetic working end may be formed in a plurality of different working designs. Such designs could contain, but would not be limited to, a design of two prongs that would engage the printer drive member when inserted into the printer. The magnetic force of the cartridge drive gear shaft working end would be able to turn from the printer drive member without making any predetermined amount of contact force.

Figure 15:
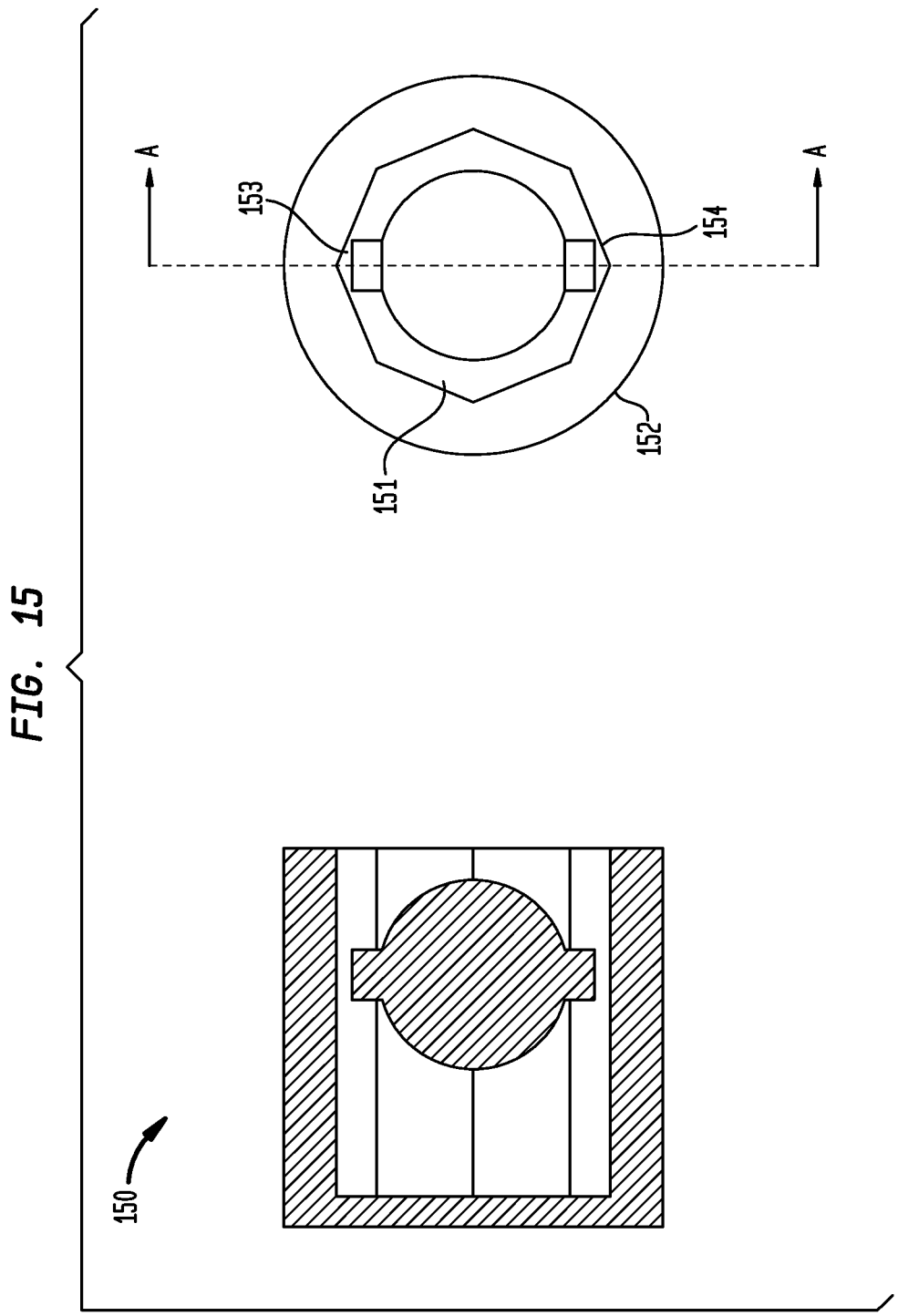
FIG. 15 illustrates a working end that is octagon shaped.

FIG. 15 Illustrates an octagon shape embodiment 150 with a circular recess 152 that has two areas 153, 154 through each side of the circle to engage the printer drive member. As the octagon 151 contains eight sides and subsequently contains eight intersection areas 153, 154 where two separate adjacent side may meet. The intersections would fit to the points on either side of the hemispherical printer drive mechanism as the cartridge is inserted into the printer device. As such, the shape within the circular recess could contain any geometric shape including, but not limited to, a pentagon, hexagon, heptagon, decagon, and any shape having either an odd or even number of sides.

Figure 16:
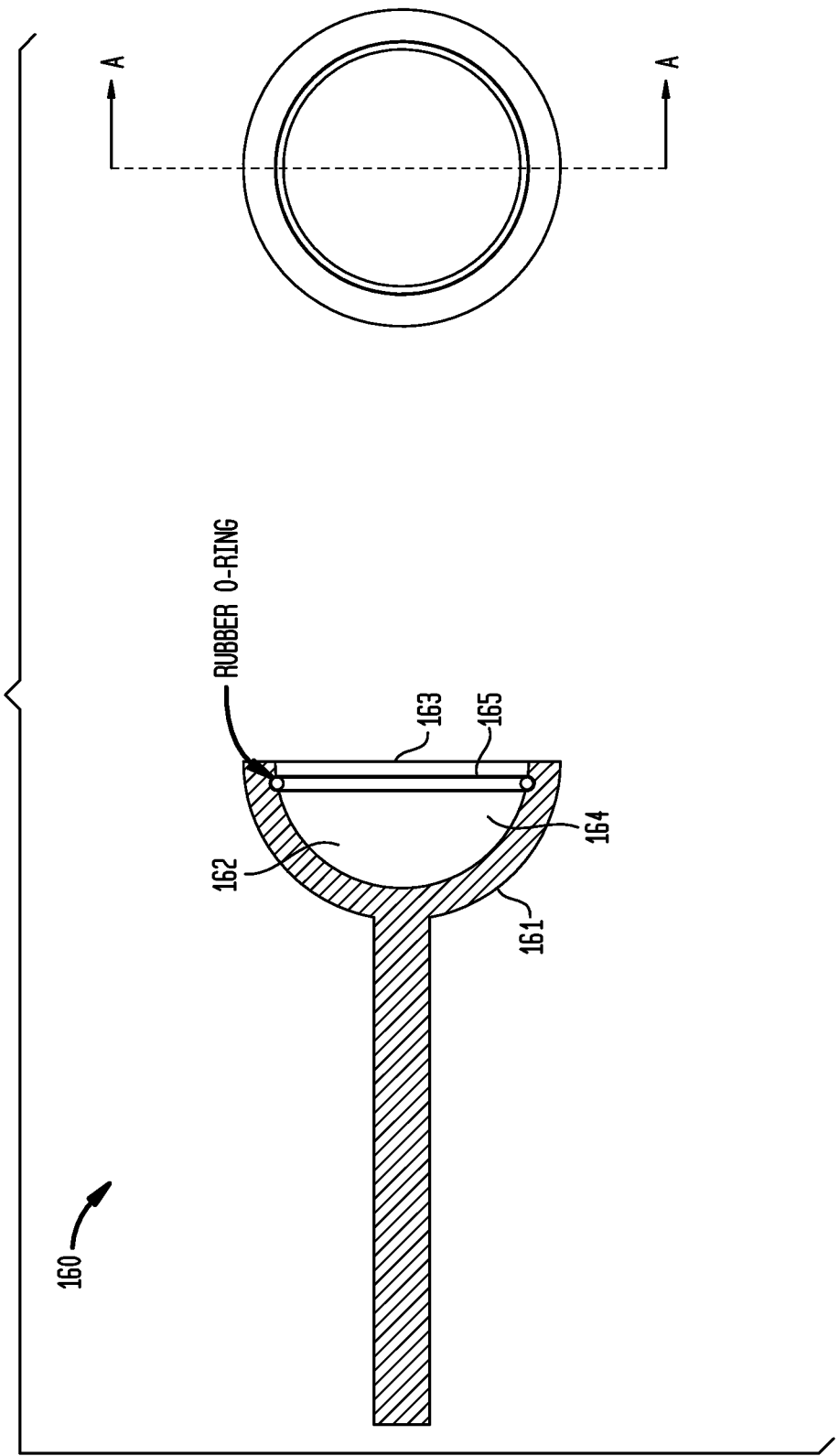
FIG. 16 illustrates a rubber o-ring filled working end.

FIG. 16 illustrates a rubber o-ring filled cylindrical working end 160 for the cartridge drive shaft working end. The working end is a cylindrical shape 161 containing a recessed portion 162 in the center. The recessed portion of the working end is filled with a plurality of rubber o-rings 163 in a variety of diameters. A cavity 164 is contained inside the deepest point inside the recessed portion. As the depth of the recessed portion decreases and the diameter of the recessed portion increases, o-rings of progressively increasingly larger diameter are fitted into the recessed portion of the working end and are stacked on top of each other with each increased diameter o-ring fitting against the increasingly larger diameter of the recessed portion. As such, the first o-ring inserted into the recessed portion will be the smallest diameter o-ring and the last o-ring inserted into the recess will have the largest o-ring diameter 165. When the cartridge drive gear shaft is slid into the printer device, the o-ring filled working end will slide onto the printer drive mechanism. The grip between the o-ring filled drive gear working end and the printer drive mechanism will enable rotational motion from the printer drive mechanism to be transferred to the working end of the print drive shaft.

Figure 17:
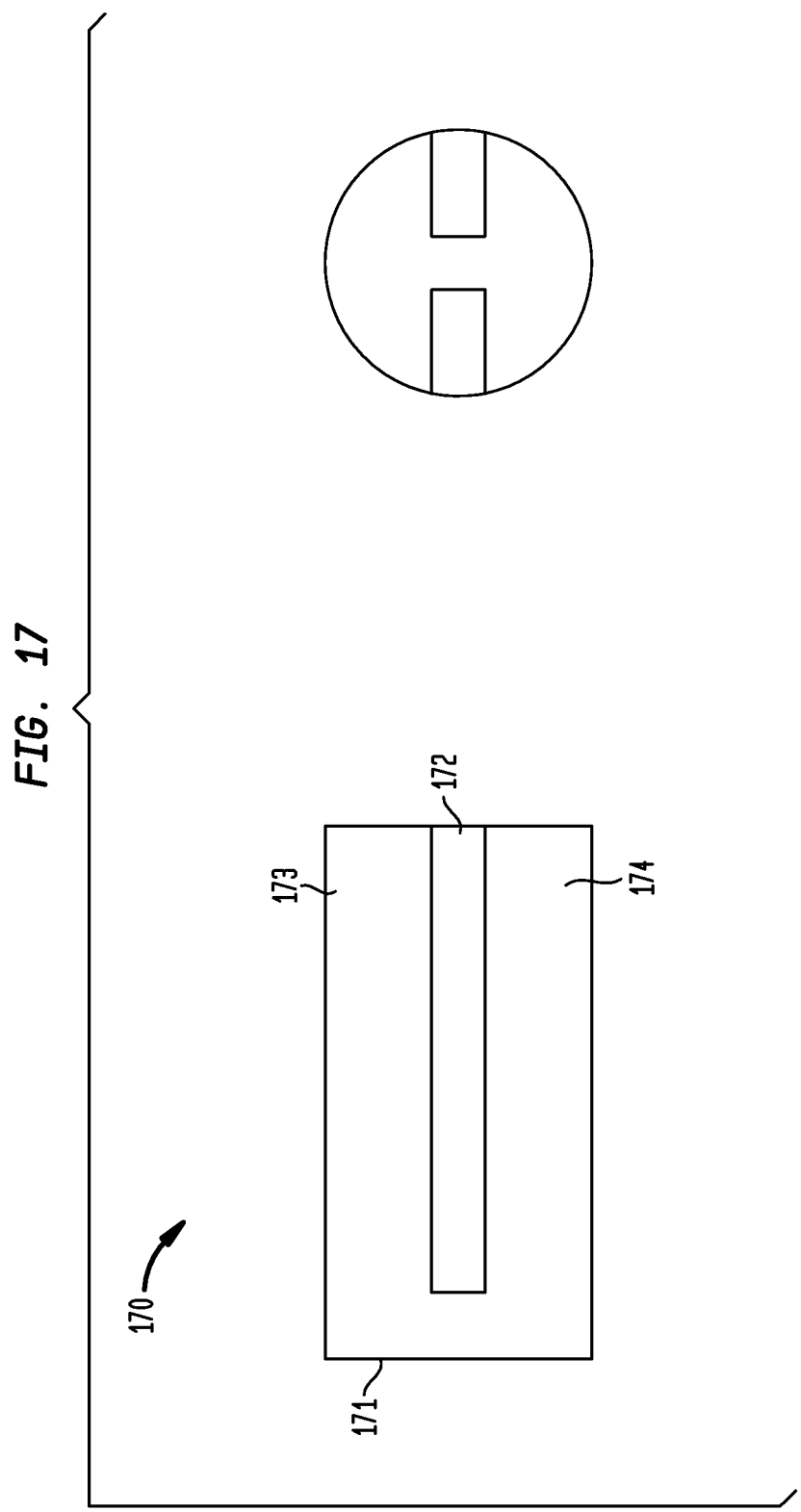
FIG. 17 illustrates a slotted, one-piece cartridge drive gear shaft working end.

FIG. 17 illustrates a slotted, one-piece cartridge drive gear shaft working end 170. The working end is one solid piece 171 with a slot cut through the center producing two separate extended arms 173, 174. The slot engages the points on opposite sides of the printer drive mechanism when the cartridge is inserted into the printer device.

Figure 18:
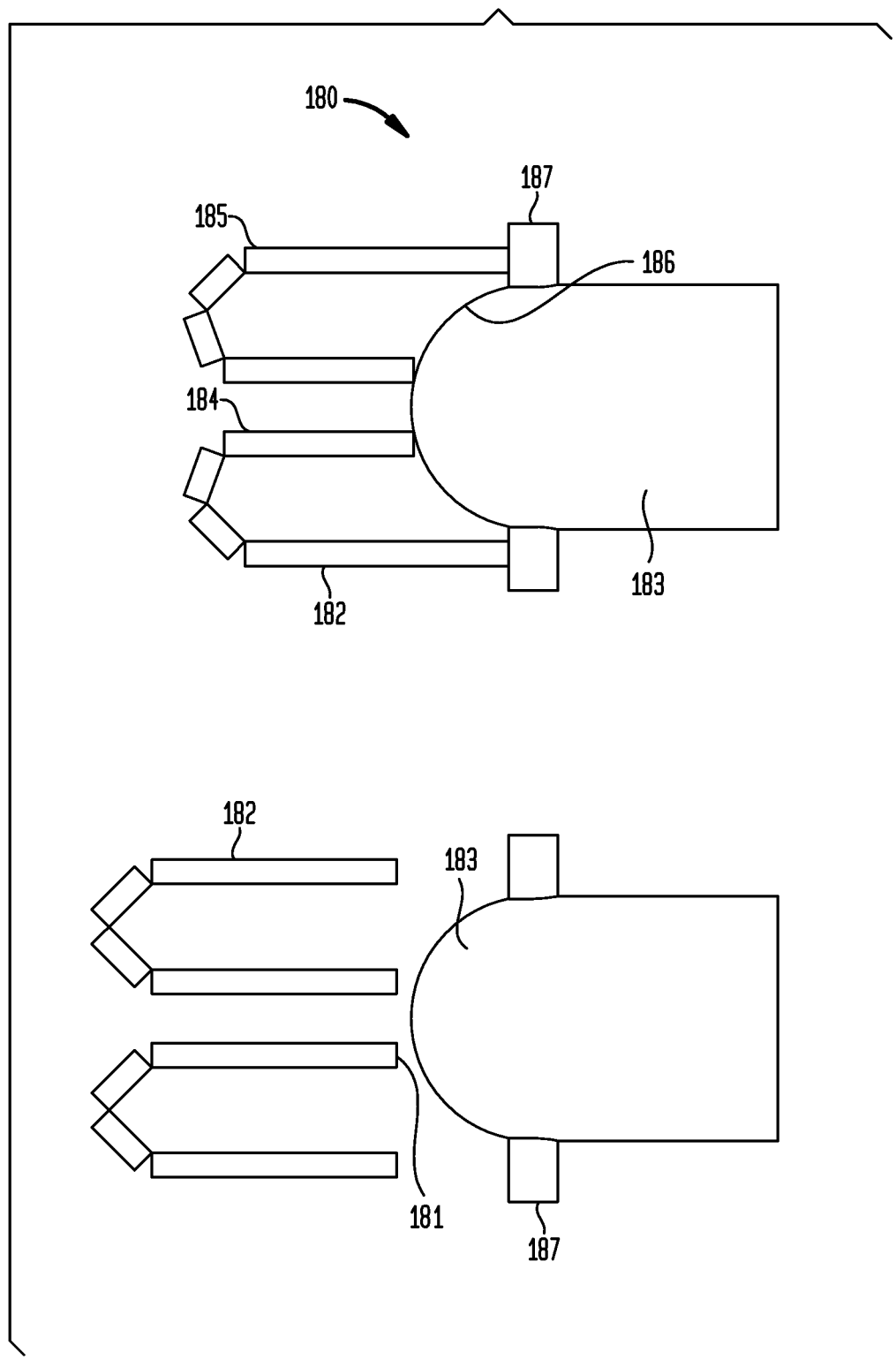
FIG. 18 illustrates a cartridge drive shaft having a multiple cam design.

FIG. 18 illustrates a multiple cam design 180. The working end of the drive gear contains a plurality of cams, wherein each cam has an interior 181 portion and an outside portion 182. Prior to coming in contact with the printer drive mechanism 183, the interior portion 181 and the outside portion 182 are the same length. As the cartridge is inserted into the printer, the interior portions of the cams 184 are forced into contact with the printer drive mechanism 183. The resistance offered by the printer drive mechanism pushes the interior cams backward 184. This also forces the opposing outside portions of each cam 185 to move in the opposite forward direction along the outside edge 186 of the printer drive mechanism 183. As the outside portions 185 move down the surface 186 of the printer drive member, the outside portions of the cam eventually come in contact with and engage with the points 187 on the working end of the printer drive member. The outside portions of the cams 185 then are seated against the points and the rotational motion of the printer drive member 183 is transferred to the working end of the drive shaft and through to the cartridge.

Figure 19:
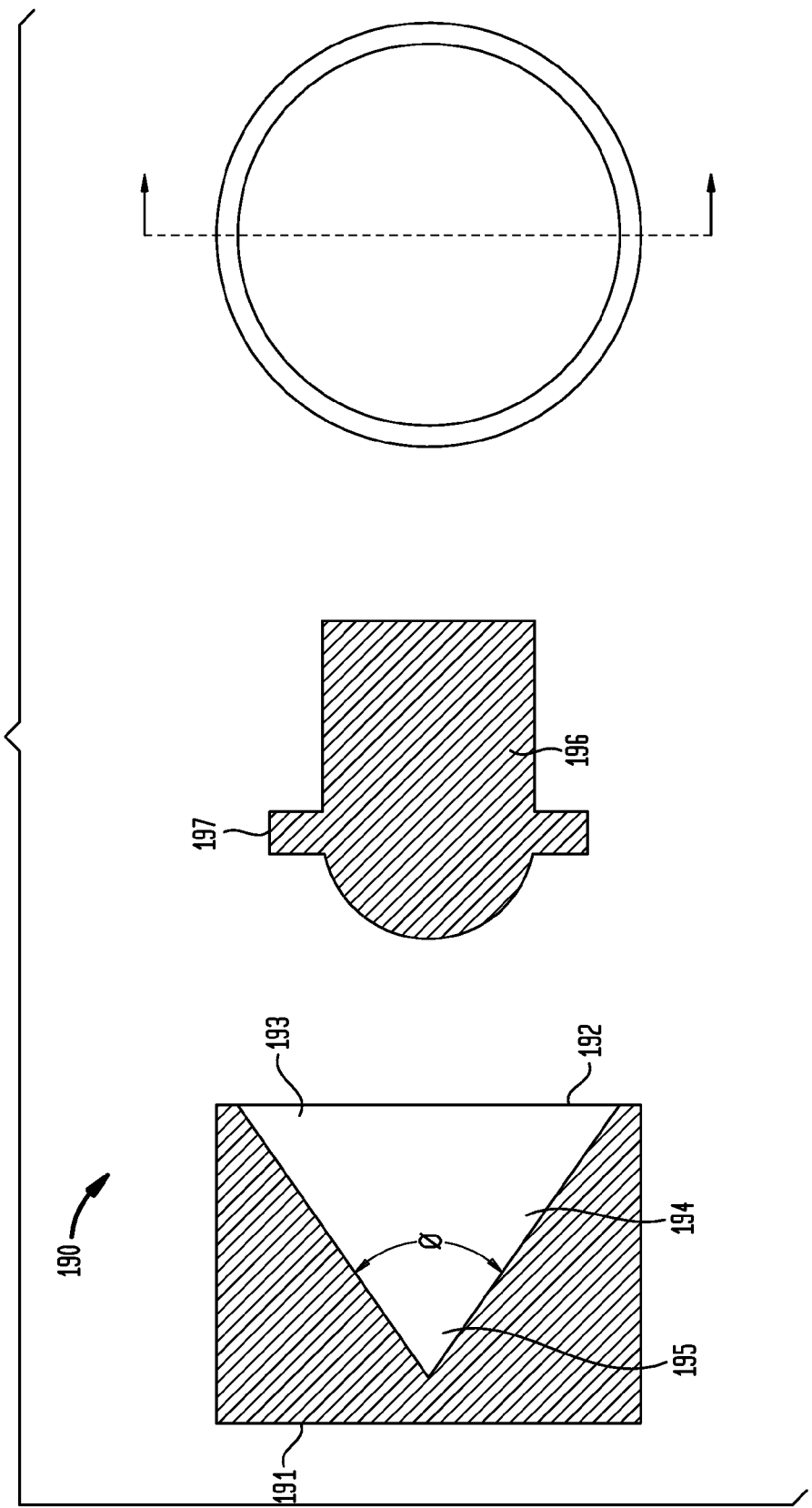
FIG. 19 illustrates an angle section based cartridge drive gear shaft.

FIG. 19 illustrates an angle section based cartridge drive gear shaft 190. The working end is a cylinder constructed of one solid piece 191 and contains a hollow conic indentation 192. The bottom of the working end 193 is the largest diameter of the indentation and the indentation tapers inward to a progressively narrower diameter 194 until the indentation ends 195. A profile indicates a substantially triangular shape, but the taper could also be parabolic, hyperbolic, or any other shape where one side tapers to a smaller side. When the cartridge is inserted into the printer device, the drive gear shaft working end fit over the printer drive member 196 such that the side walls of the indentation engage the points 197 on the printer drive mechanism and the contact or friction between the points and the indentation will be sufficient to transfer rotational force from the print driver mechanism to turn the cartridge drive gear shaft.

Figure 20:
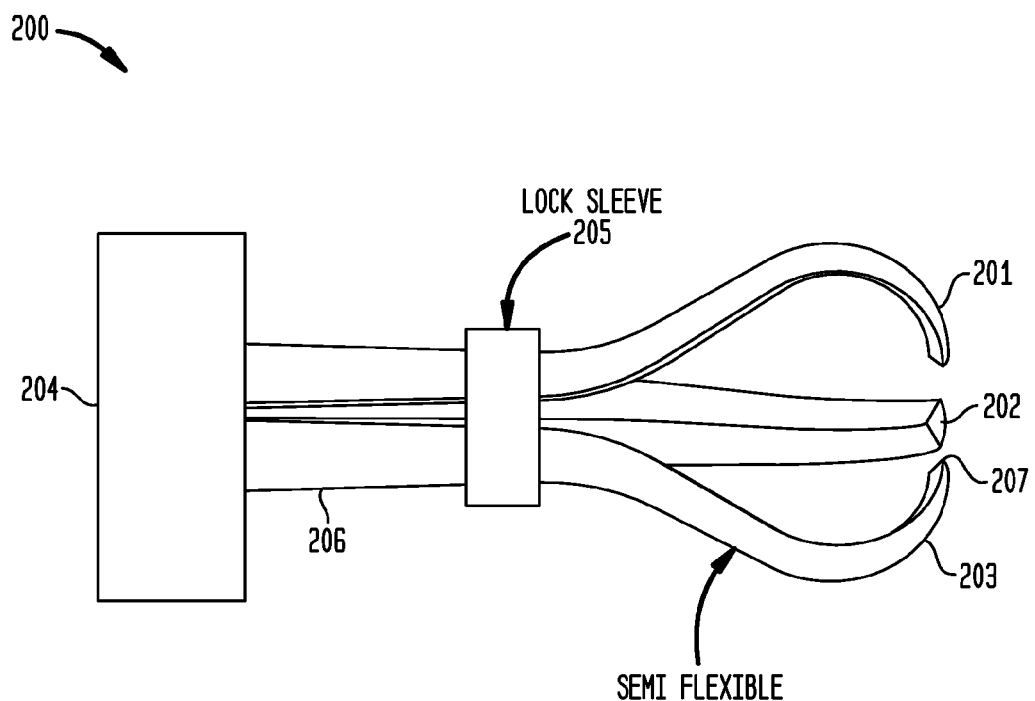
FIG. 20 illustrates a flexible arm cartridge drive gear shaft base.

FIG. 20 illustrates a flexible arm cartridge drive gear shaft working end 200. A plurality of individual flexible extruded arms 201, 202, 203 extend from the working end 204 and may be brought together with an adjustable locking sleeve 205. The locking sleeve changes position by sliding along the length of the arms toward or away from the main portion of the drive shaft 206. The change in position of the locking sleeve may alter the amount of pressure applied by the arms onto anything located between the ends of the arms. The arms may be arranged in a circle and the ends of the arms may contain hooks 207. When the cartridge is inserted into the printer device, the arms on the drive gear shaft working end fit over the printer drive mechanism and the tension of the arms against the side of the printer drive mechanism increases as the locking sleeve is moved toward the ends of the arms.

Figure 21B:
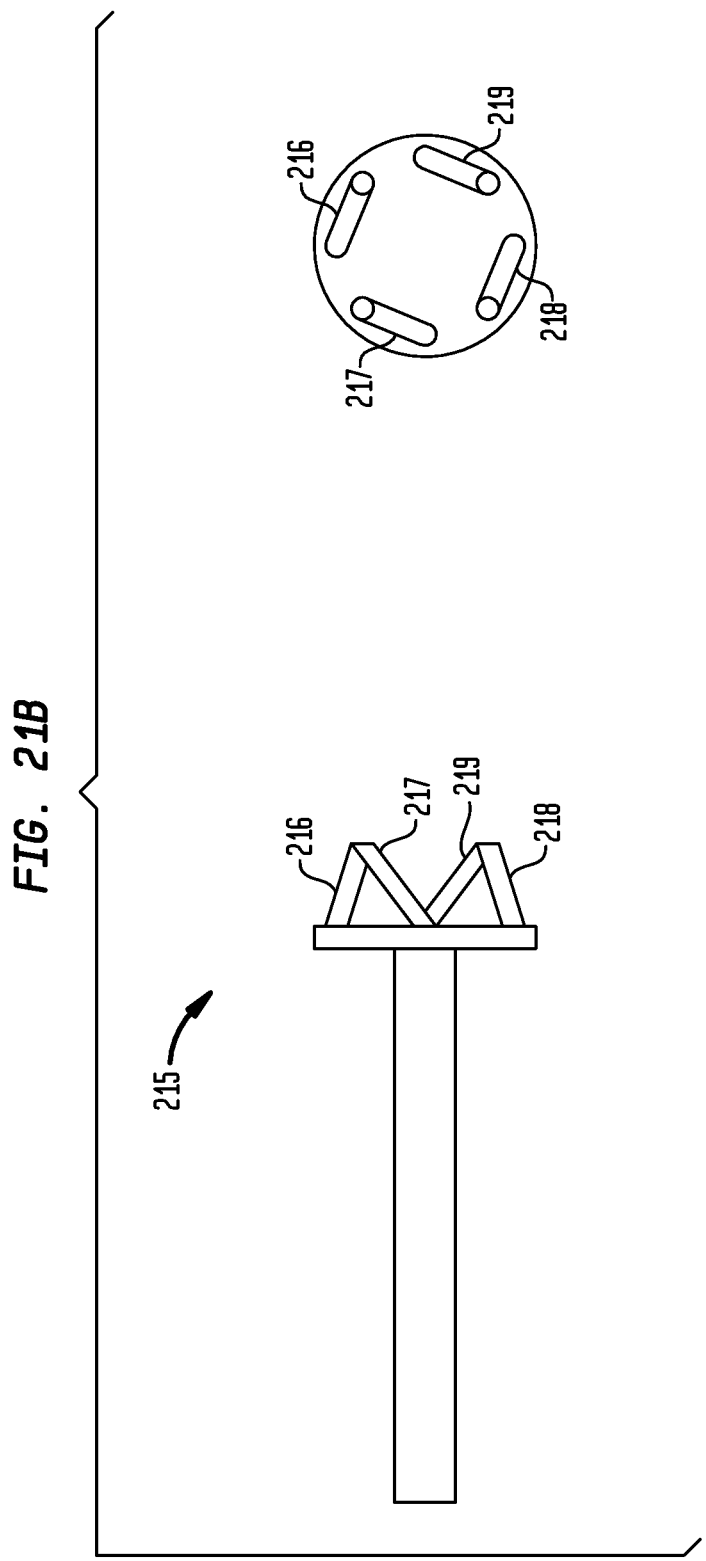

FIG. 21 illustrates equidistantly spaced, non-parallel, non-perpendicular angled prongs on the working end of the drive shaft 210. The drive shaft working end is substantially flat 211 with each of a plurality of prongs 212, 213, 214 extending from the working end such that the angle 214 between the working end and each individual prong is not perpendicular. The prongs are spaced evenly between each other and may be the same distance from the center of the drive shaft working end in a pattern similar to the arrangement of the horses on a merry-go-round. The number of prongs can be two, three 210, four 215, or more and the arrangement will determine a pattern to be displayed such that three prongs 210 would produce a helical structure, four prongs 215 would produce an octagonal structure. The four prong arrangement 215 produces individual prongs 216, 217, 218, 219 which may be diametrically opposite to each other 216, 218 and 217, 219. But the opposite prongs 216, 218 and 217, 219 do not have to be symmetric or diametrically opposite. Not all prongs have to be oriented at the same angles, at least one prong may have an angle different from the other prongs and at least one prong may be perpendicular to the working end. When the cartridge is inserted into the printer device, the prongs fit over the printer drive mechanism and engage the points. The rotation of the printer drive member places the points against the prongs and transfers the rotational energy from the printer drive mechanism to the cartridge drive gear shaft.

Figure 22A:
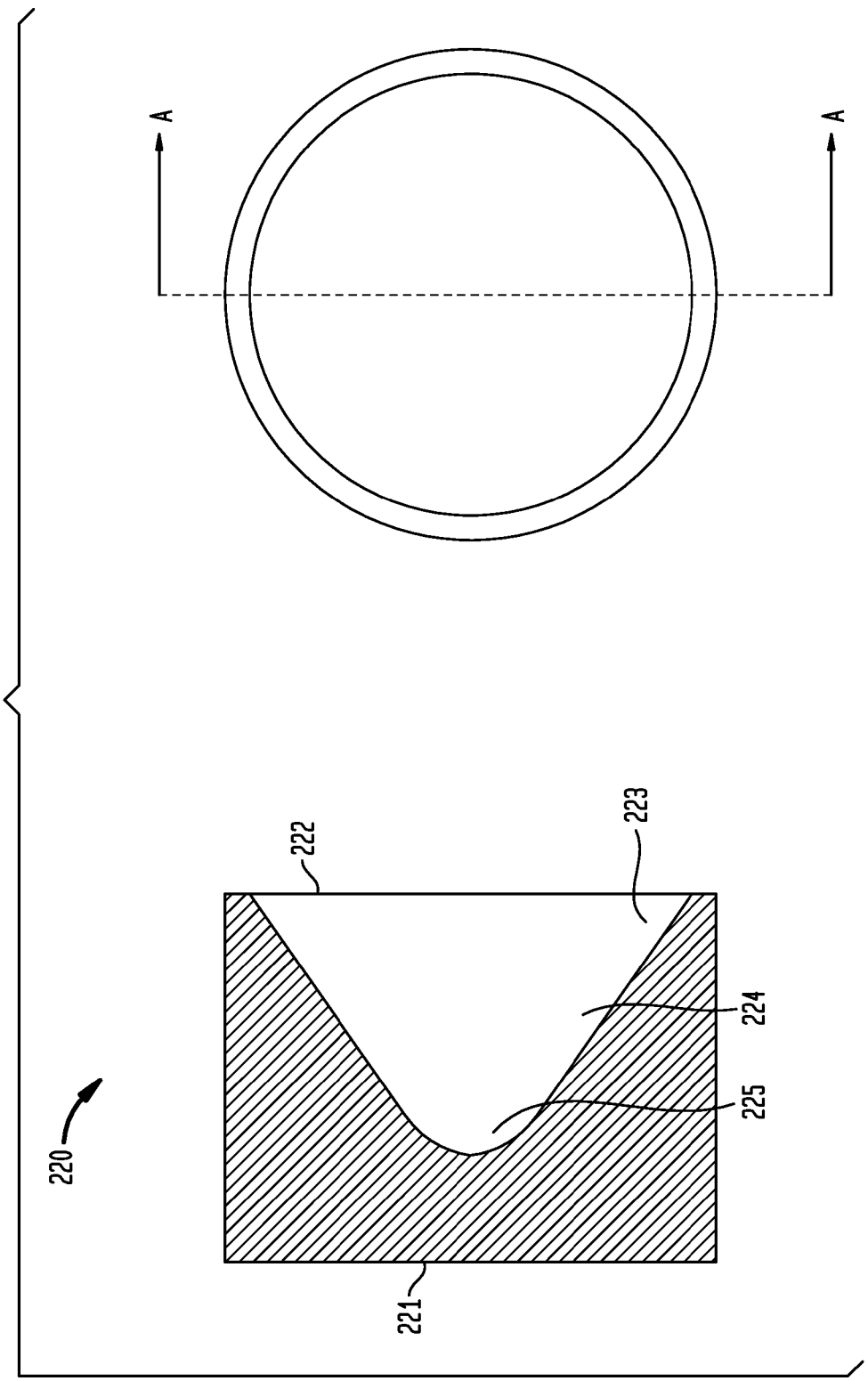
FIGS. 22A & 22B illustrate a rounded conical angle section based cartridge drive gear shaft.
Figure 22B:
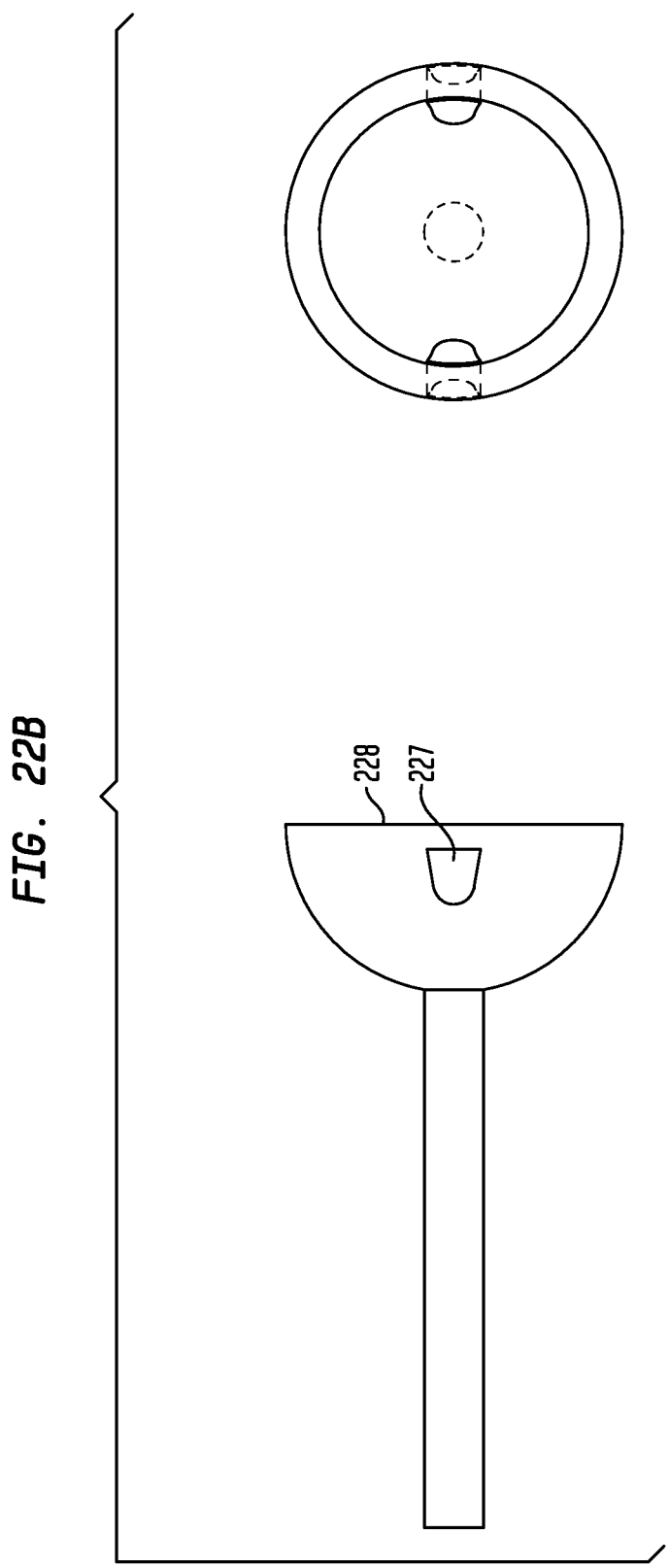

FIG. 22 illustrates a rounded conical angle section based cartridge drive gear shaft 220. The working end is a cylinder 221 constructed of one solid piece and contains a hollow conic indentation 222. The bottom of the working end is the largest diameter 223 of the indentation and the indentation tapers inward 224 to a progressively narrower diameter, until the indentation ends 225. A profile indicates a substantially conical shaped recess shaped to fit over and cover the printer drive mechanism. The conical shaped recess would be able to engage the printer drive member when the cartridge is fully seated. The working end recess within the working end could be of a solid rigid material wherein the friction of the recess against the printer drive mechanism may engage the working end recess to the print drive mechanism. Alternately, the recess could be made of a flexible and non-rigid substance such as rubber to conform and adapt to the drive member. In a further implementation, the conical shape working end recess could also have slots cut into the inside of the recess 227 in order to accommodate the points of the printer drive member. The points from the printer drive member would engage directly with the slots cut on the inside of the cone. When the cartridge is inserted into the printer device, the drive gear shaft working end fit over the printer drive member such that the side walls of the indentation engage the points on the printer drive mechanism and the contact or friction between the points and the indentation will be sufficient to transfer rotational force from the print driver mechanism to turn the cartridge drive gear shaft.

Figure 23:
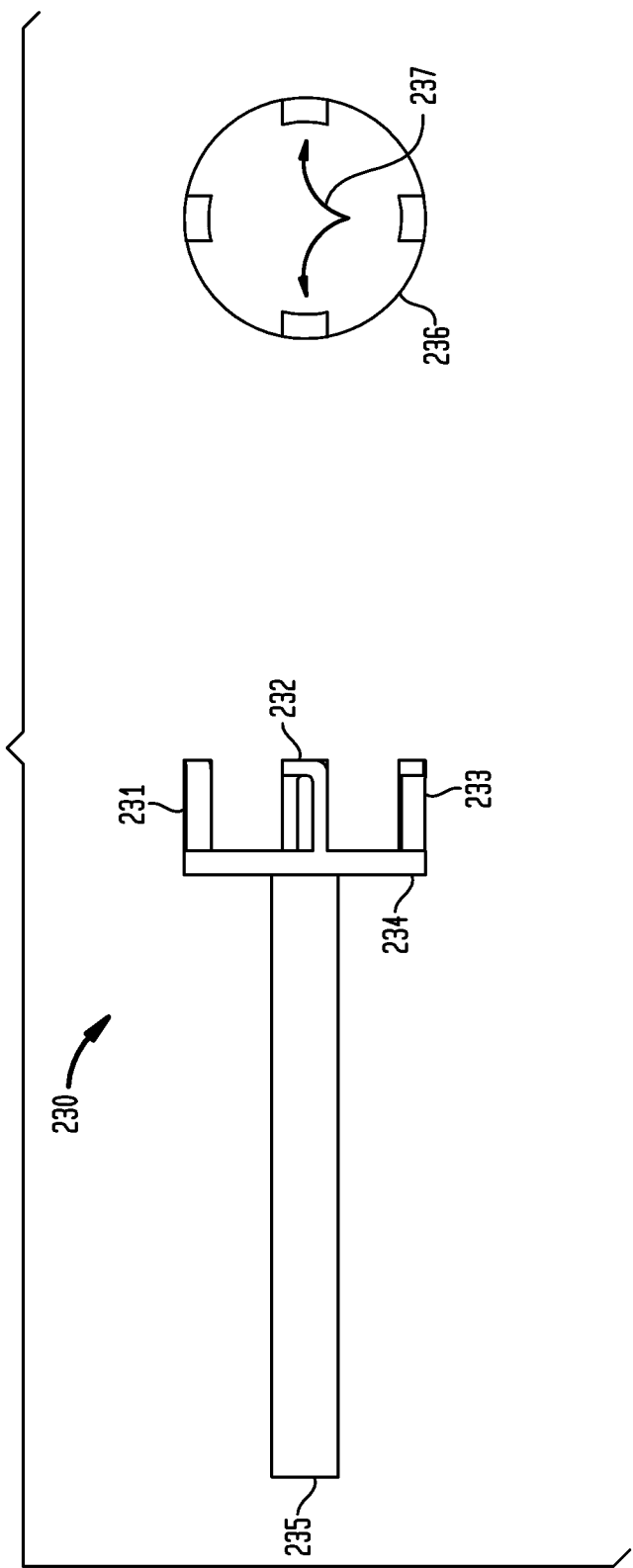
FIG. 23 illustrates a drive shaft containing a plurality of extruded members.

FIG. 23 illustrates a drive shaft containing a plurality of extruded members 230. The extruded members 231, 232, 233 extend perpendicular to the working end 234 and are parallel to the drive shaft 235. The extruded members are not solid throughout but are in fact arch shaped 234 such that the inside of the extruded members underneath the arches do not contain material 235. The curved end resembles the shapes of hooks. The extruded members do not need to be evenly space 236, do not need to be diametrically opposed 237 to each other, and there can be any number of extruded members. When the cartridge is inserted into the printer, the extruded members of the cartridge drive gear shaft would hook onto, lasso, or otherwise engage the points on either side of the printer drive mechanism. The rotation of the printer drive member would then be transmitted through the engaged drive shaft working end to rotate the cartridge drive shaft.

Figure 24A:
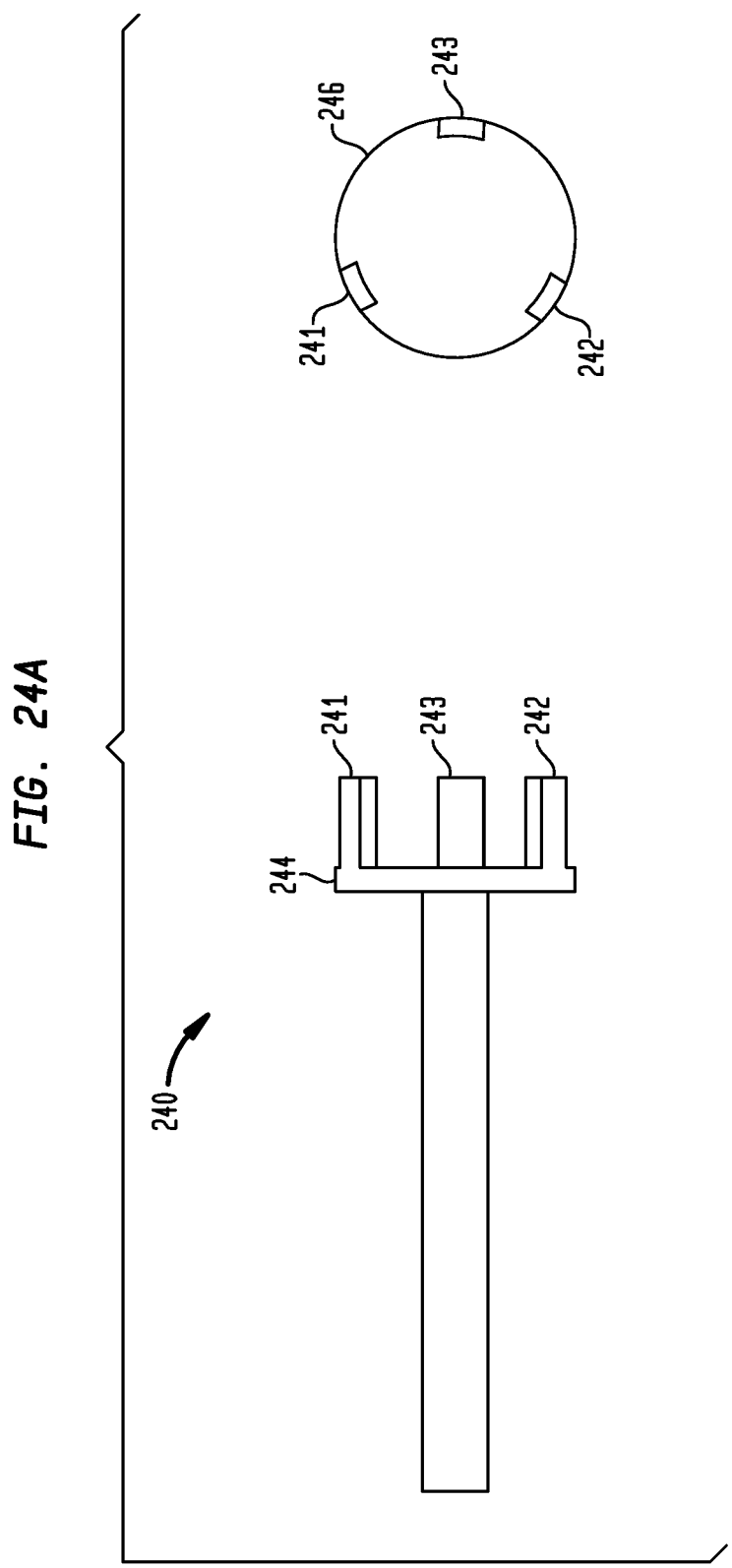
FIGS. 24A & 24B illustrate a square extruding prongs on the cartridge drive gear shaft base.
Figure 24B:
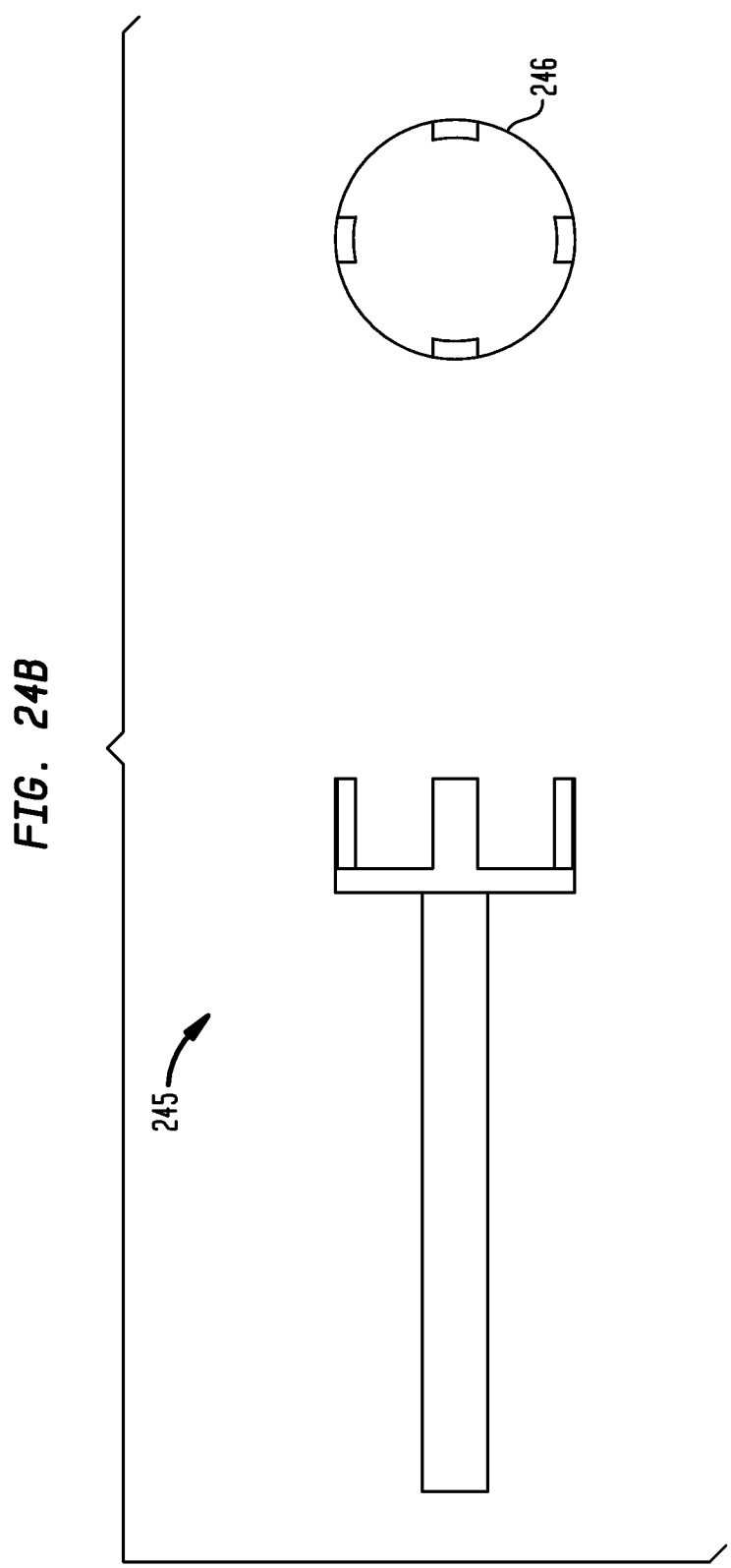

FIG. 24 illustrates square extruding prongs on the cartridge drive gear shaft working end 240. The extruded prongs 241, 242, 243 are substantially square or rectangular in shape and extend in a substantially perpendicular manner from the flat working end 244. The working end may have a two or three 240 extruding prongs. The flat working end 244 may further have four 245 or any number or extruded prong. The plurality of prongs may or may not be evenly spaced 246 about the circumference of the working end and may or may not be at differing distances from the center of the working end or from the edge of the working end. When the cartridge is inserted into the printer device, the extruded prongs engage with the points on the printer drive mechanism and the rotation of the printer drive mechanism turns the cartridge drive gear shaft due to the engagement between the drive shaft prongs and the print driver mechanism points.

Figure 25:
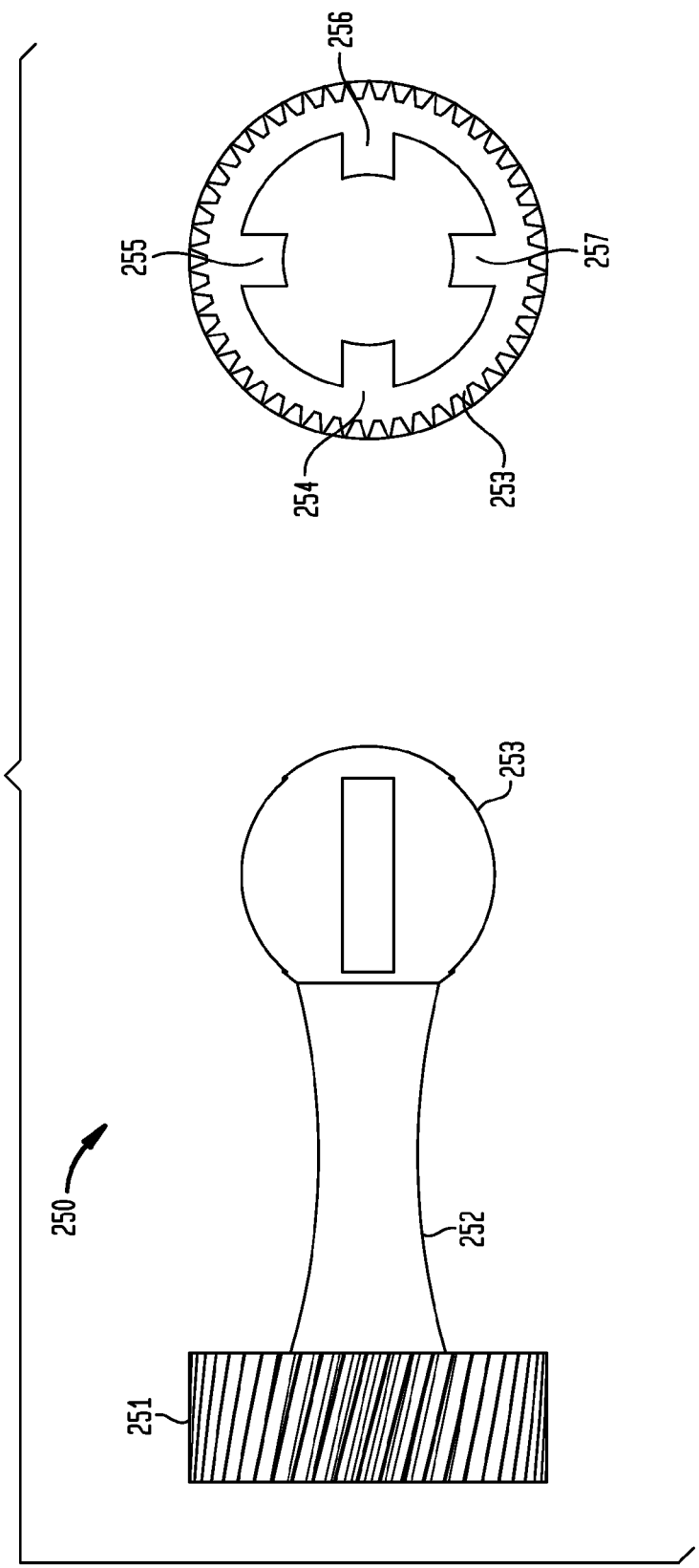
FIG. 25 illustrates a sphere mounted on a podium working end for the cartridge drive gear shaft.

FIG. 25 illustrates a sphere mounted on a podium working end for the cartridge drive gear shaft 250. The working end 251 of the gear shaft contains a long, narrow podium 252 atop which sits a sphere 253 shape. The sphere 253 contains a plurality of notches 254, 255, 256, 257 or grooves each running in a direction parallel to the podium and parallel to each and every other groove. While the notches illustrated are square notches, the notches could be of any shape including but not limited to round, triangular, and the like. The notches 254, 255, 256, 257 may be cut out the spherical shapes 253 or the spheres may be casts, formed, or otherwise produces with the notches created at the time the sphere 253 is created. The notches 254, 255, 256, 257 extending from the working end would provide an area to engage the prongs contained on either side of the printer drive mechanism. The notches may be diametrically opposite or unevenly spaced about the diameter of the sphere. When the cartridge is installed, the notches on the sphere attached to the drive shaft working end would line up with the points on the printer drive mechanism.

Figure 26:
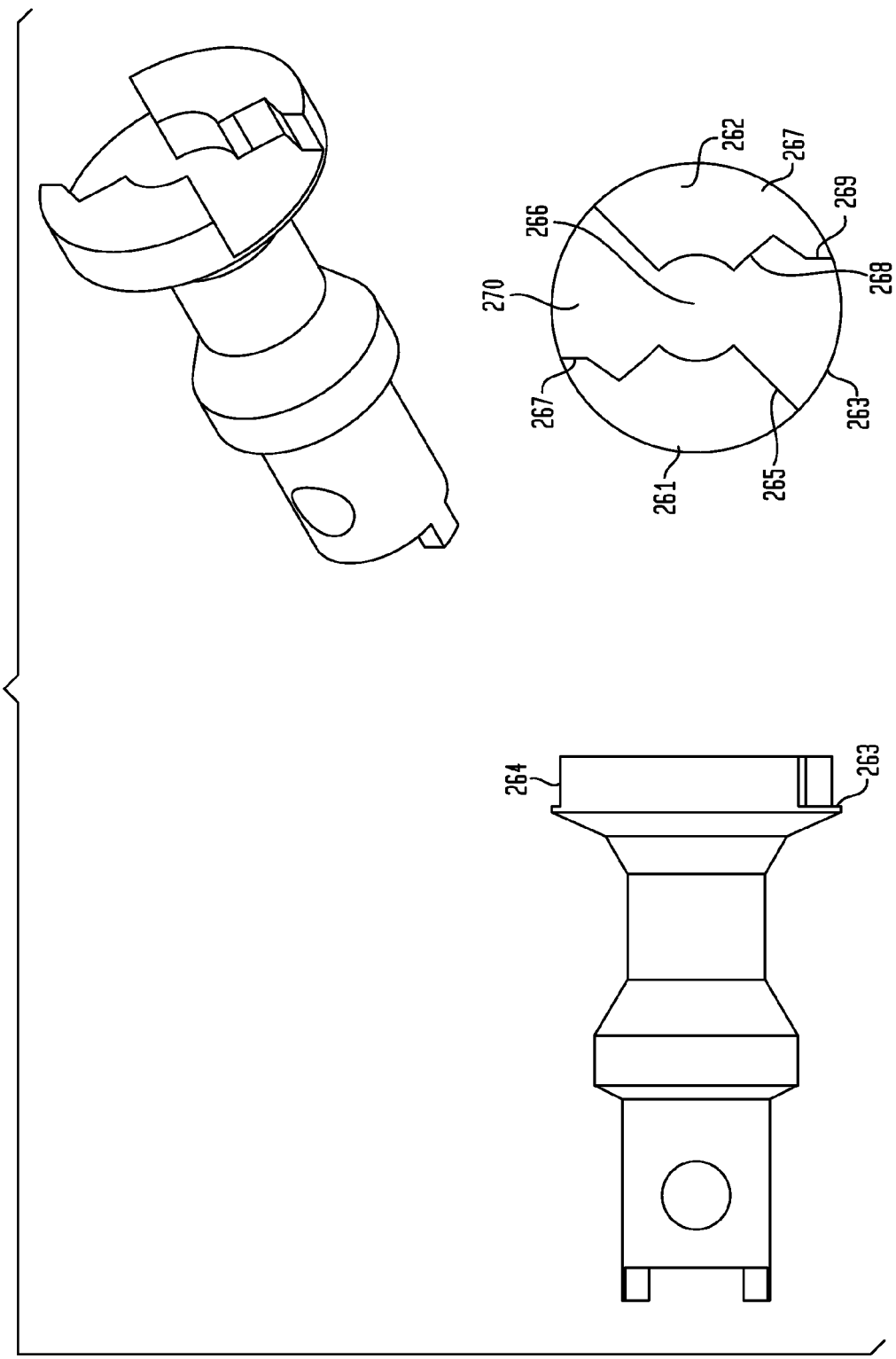
FIG. 26 illustrates a multiple solid section working end on the cartridge drive gear shaft.

FIG. 26 illustrates a multiple solid section working end on the cartridge drive gear shaft 260. Attached to the working end 263 are at least two solid sections 261, 262 which each solid section covers a fractional portion of less than half of the area of the working end. The individual solid sections are raised 264 above the working end 263. Each individual solid section may or may not be symmetric to itself. Each asymmetric solid section 261, 262 may have a side where a flat portion 265 is on an axis that intersects with the center 266 of the working end, while the other side has a guide section 267. The guide section 267 will have a portion 268 of the side that is on an axis with the center of the working end 266, while the remainder has a curved hook section 269. The individual solid sections may contain a surface that is flat with each point on the surface at the same distance from the working end of the drive shaft gear. Alternately, the surface of the individual solid section may be not perfectly flat, with different portions at different distances from the working end. These not perfectly flat portions may be angled, ramped, or slanted in a plurality of angles. The adjacent solid sections may or may not be located diametrically opposite to each other on the surface of the working end. There may be two, three or any number of solid sections located on the working end. The solid sections may be joined in any manner or they may be independently not connected. When the cartridge is inserted into the printer, the solid sections slide over the printer drive member and the points seat in the gaps 270 between the solid sections. The hook section 269 in the guide section 267 may facilitate the seating of the points into the gaps.

Figure 27:
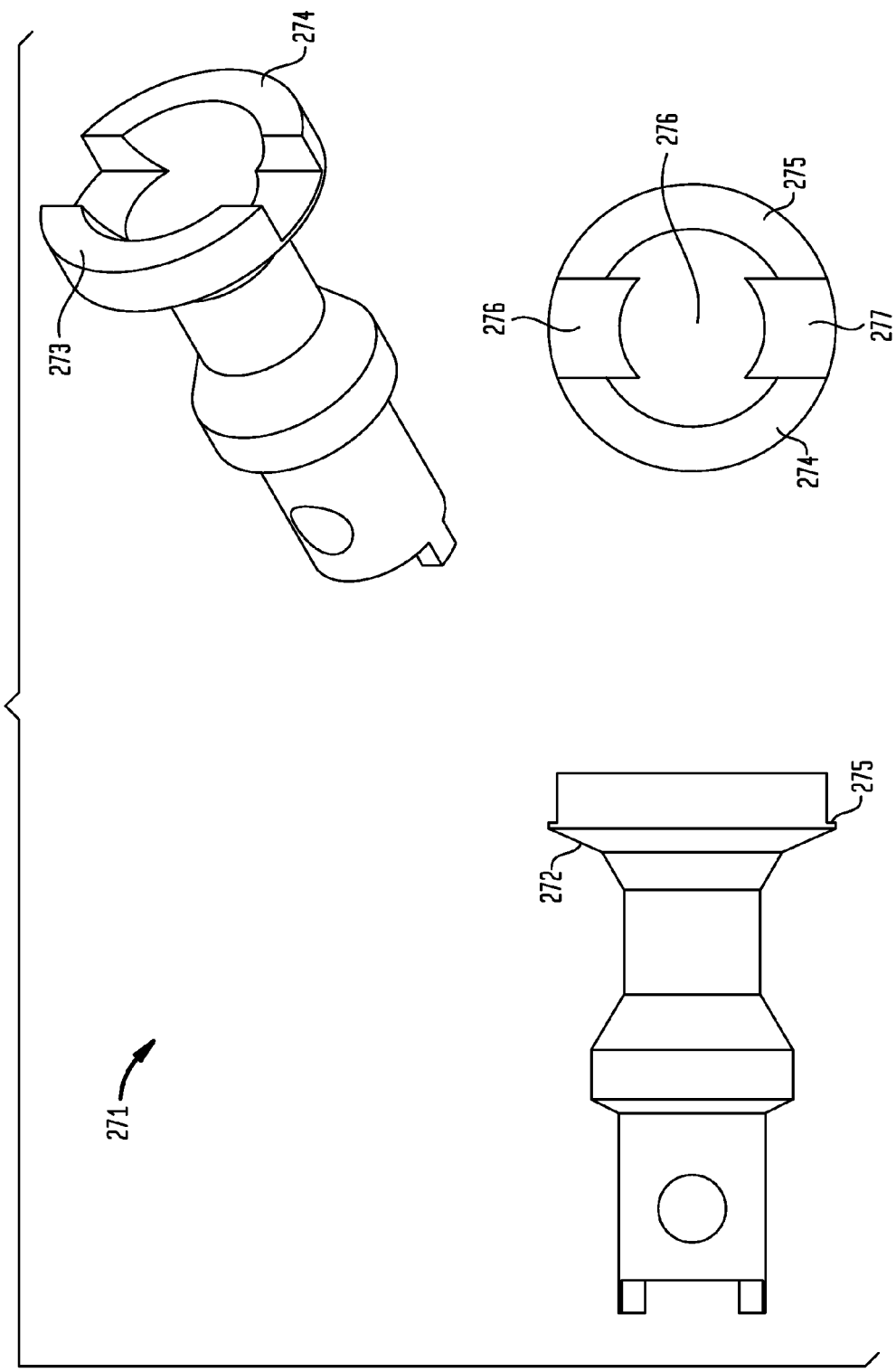
FIG. 27 illustrates a circular shapes and recess working end for the cartridge drive gear shaft.

FIG. 27 illustrates a circular shapes and recess working end for the cartridge drive gear shaft 271. The working end 272 contains a plurality of essentially thick, flat crescent circular shaped crescent areas 273, 274 extending from the working end 272. The exterior of the crescent shapes may be flush 275 with the edge of the working end, while the interior of the crescent shapes are an empty area comprising a hollow recess 276 which form a hollow recess area. The plurality of crescents areas 273, 274 are separated by a plurality of slots 276, 277 cut between the crescents on opposing sides. When the cartridge is inserted into the printer, the hollow recess 276 would fit over the top of the printer drive mechanism and the points would catch and be engaged by the slots 276, 277 within the drive gear shaft working end.

Figure 28:
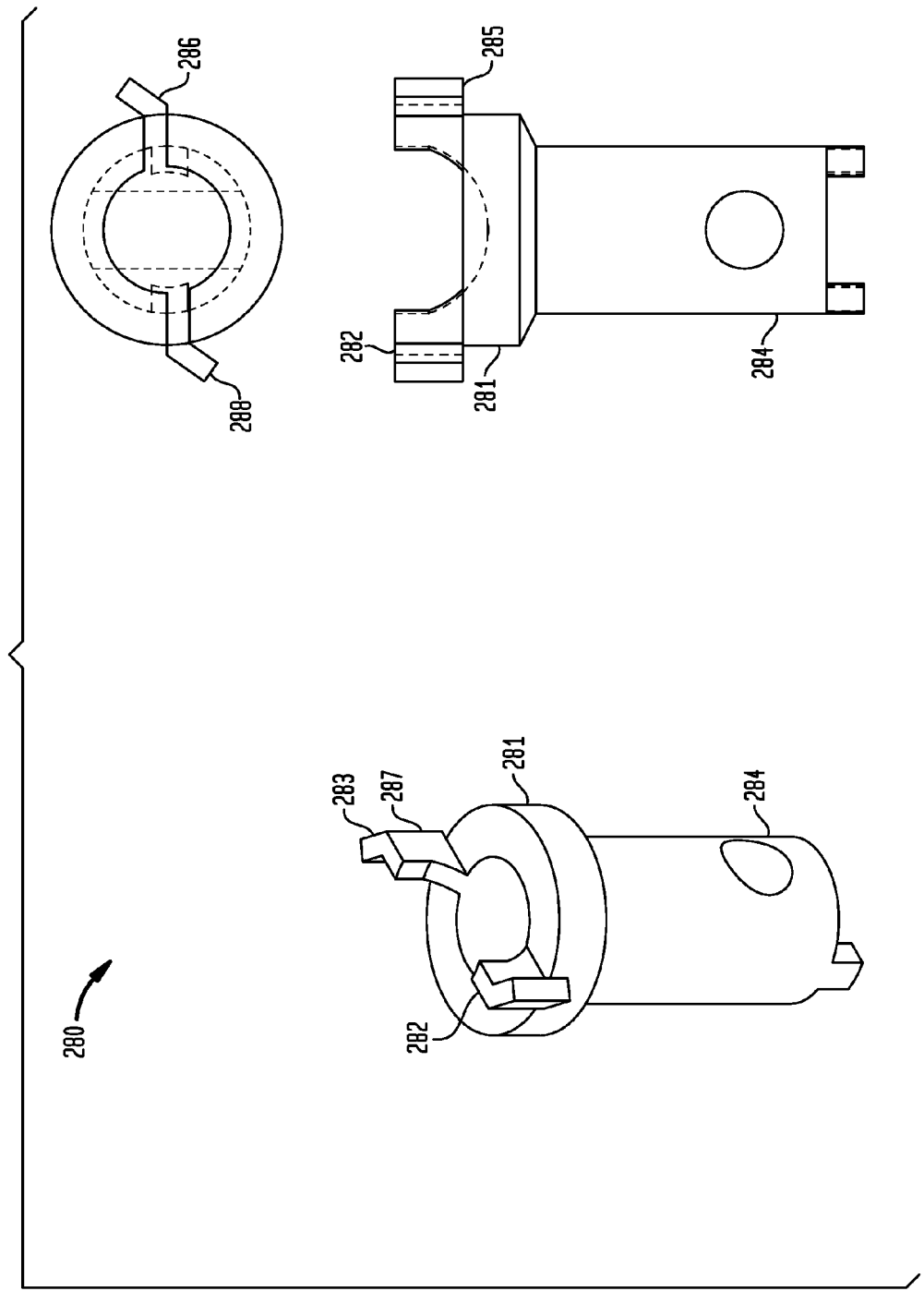
FIG. 28 illustrates small engaging portions on the working end of the cartridge drive gear shaft.

FIG. 28 illustrates use of small engaging portions on the working end for the cartridge drive gear shaft 280. The working end 281 is an essentially flat disc which contains a plurality of fins 282, 283 proceeding from the working end 281 in a direction parallel with the direction of the drive shaft 284. The fins may contain an extend portion 285 which extends past the diameter of the working end such that the distance between the outward edges of two diametrically opposed fin extend portions would exceed the diameter of the working end. The fins may or may not be bent 286 such that the portion of the fin that is directly perpendicular 287 to the working end is aligned at an angle and in a different orientation than the extend portion of the fin 288. The center of the working end which separates the diametrically opposed fins may also contain a circular shaped recess. When the cartridge is inserted into the printer, the circular shaped recess would fit over the top of the printer drive mechanism and the fins would catch and be engaged by the points on the printer drive mechanism.

Figure 29A:
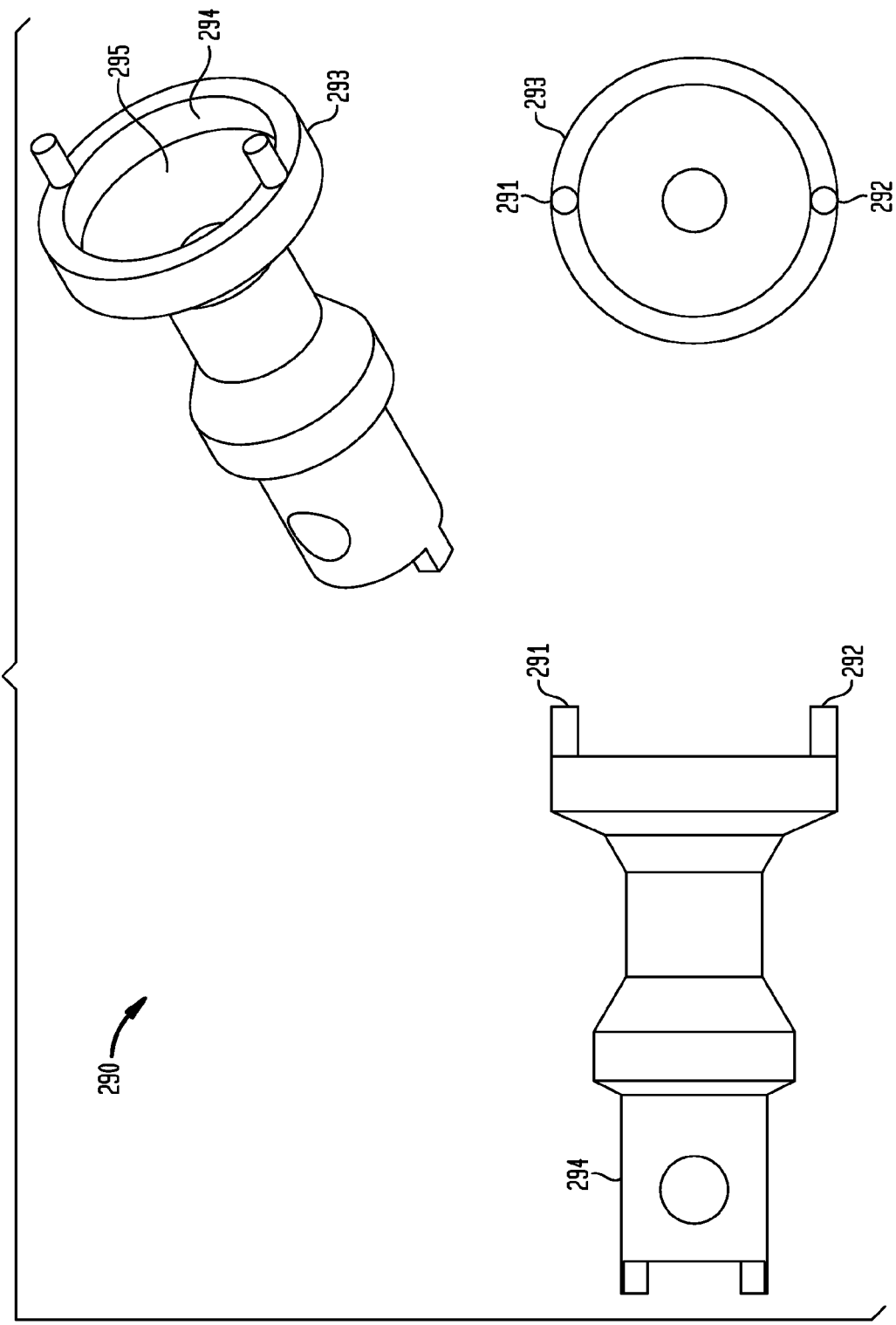
FIGS. 29A & 29B illustrate a plurality of pegs on the working end of the cartridge drive gear shaft.
Figure 29B:
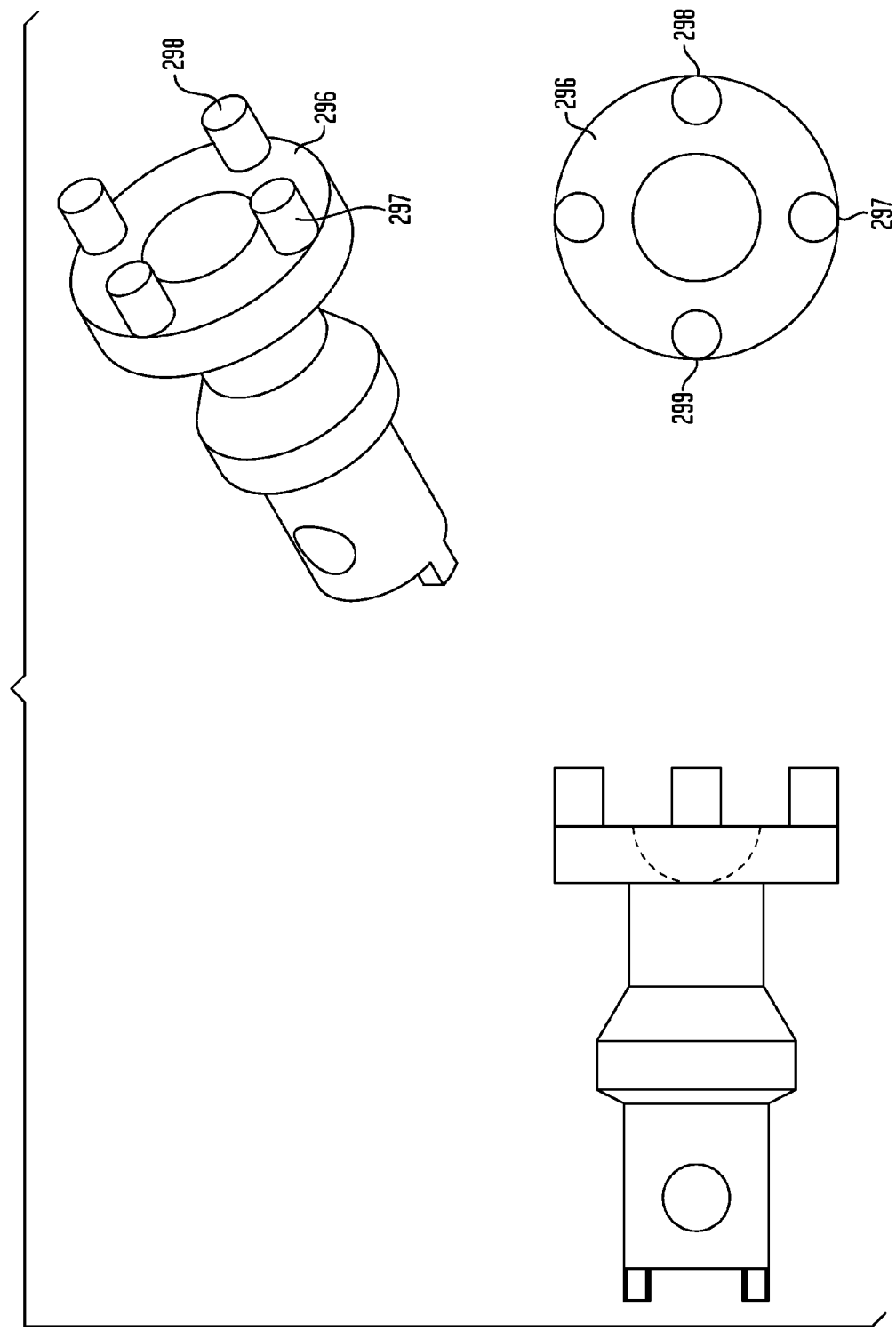

FIG. 29 illustrates a plurality of pegs on the working end of the cartridge drive gear shaft 290. The pegs are circular extruded portions 291, 292 that extended off of the working end 293 in a direction parallel to the drive shaft 294. The number of pegs 291, 292 extrusions from the working end 293 may consist of two or more and may or may not be diametrically opposed to each other. The working end 293 may also contain an extended edge, which is a circular wall 294 shaped ledge containing a hollow center recess 295. The pegs would be located atop the top of this wall shaped ledge.

The width of the ledge may be larger 296 than the diameter of the individual pegs 297, 298. The edge of a peg may be flush 299 with the edge of the working end, or alternately the pegs 297, 298 may be located closer to the center recess. The pegs 291, 292 may or may not be located at the same distance from the center of the recess or the edge of the working end. The number of pegs extrusions from the working end may consist of two 290, three, four, or more and may or may not be diametrically opposed to each other. When the cartridge is inserted into the printer, the hollow recess 295 would fit over the top of the printer drive mechanism and the points would catch and be engaged by the pegs 291, 292 located on the drive gear shaft working end.

FIG. 30 illustrates a circular shapes and recess working end for the cartridge drive gear shaft 300. The working end 303 contains a plurality of essentially thin, flat crescent circular shaped arcs 301, 302 extending from the working end 303. The exterior of the arc shapes 304 may be flush 305 with the edge of the working end 303, while the interior of the crescent shapes are an empty area 306 which form a hollow recess area. The plurality of arcs 301, 302 are separated by a plurality of slots 307, 308 cut between the arcs 301, 302 on opposing sides. When the cartridge is inserted into the printer, the hollow recess 306 would fit over the top of the printer drive mechanism and the points would catch and be engaged by the slots 306, 307 within the drive gear shaft working end 303.

Figure 31:
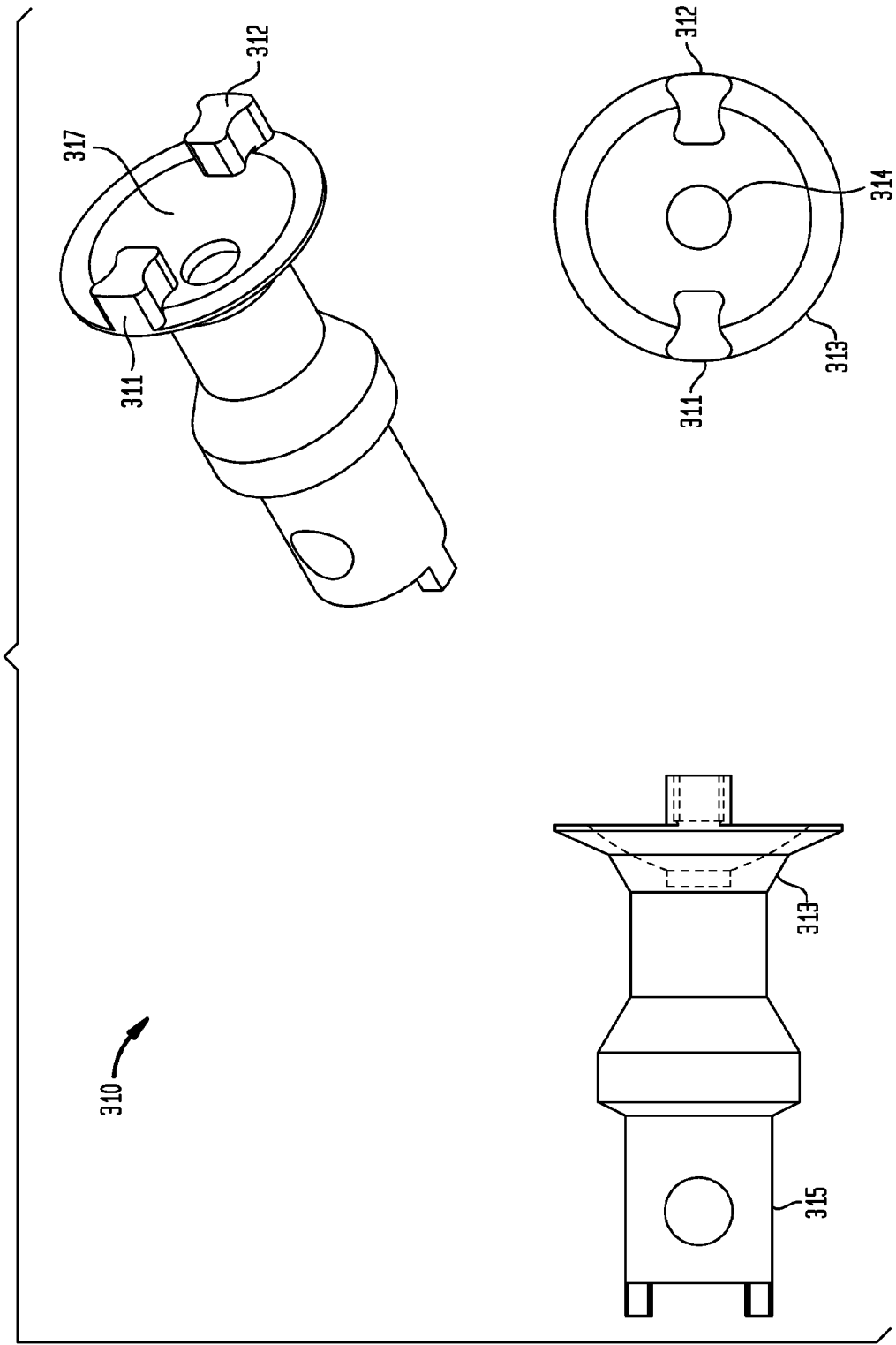
FIG. 31 illustrates fins on the working end of the cartridge drive gear shaft.

FIG. 31 illustrates use of small fins on the working end 313 of the cartridge drive gear shaft 310.

The working end 313 contains a plurality of fins 311, 312 extruding from the working end 313 in a direction parallel with the direction of the drive shaft 315. The two extruded fins 311. 312 members are elongated toward the center 314 of the cartridge drive gear shaft. The fins 311, 312 may or may not be bent such that the portion of the fin that is directly perpendicular to the working end 313 is aligned at an angle and in a different orientation than the extend portion of the fin. The center of the working end 314 which separates the diametrically opposed fins 311, 312 may also contain a circular shaped recess 317. When the cartridge is inserted into the printer, the circular shaped recess 317 would fit over the top of the printer drive mechanism and the fins 311, 312 would catch and be engaged by the points on the printer drive mechanism.

Figure 32:
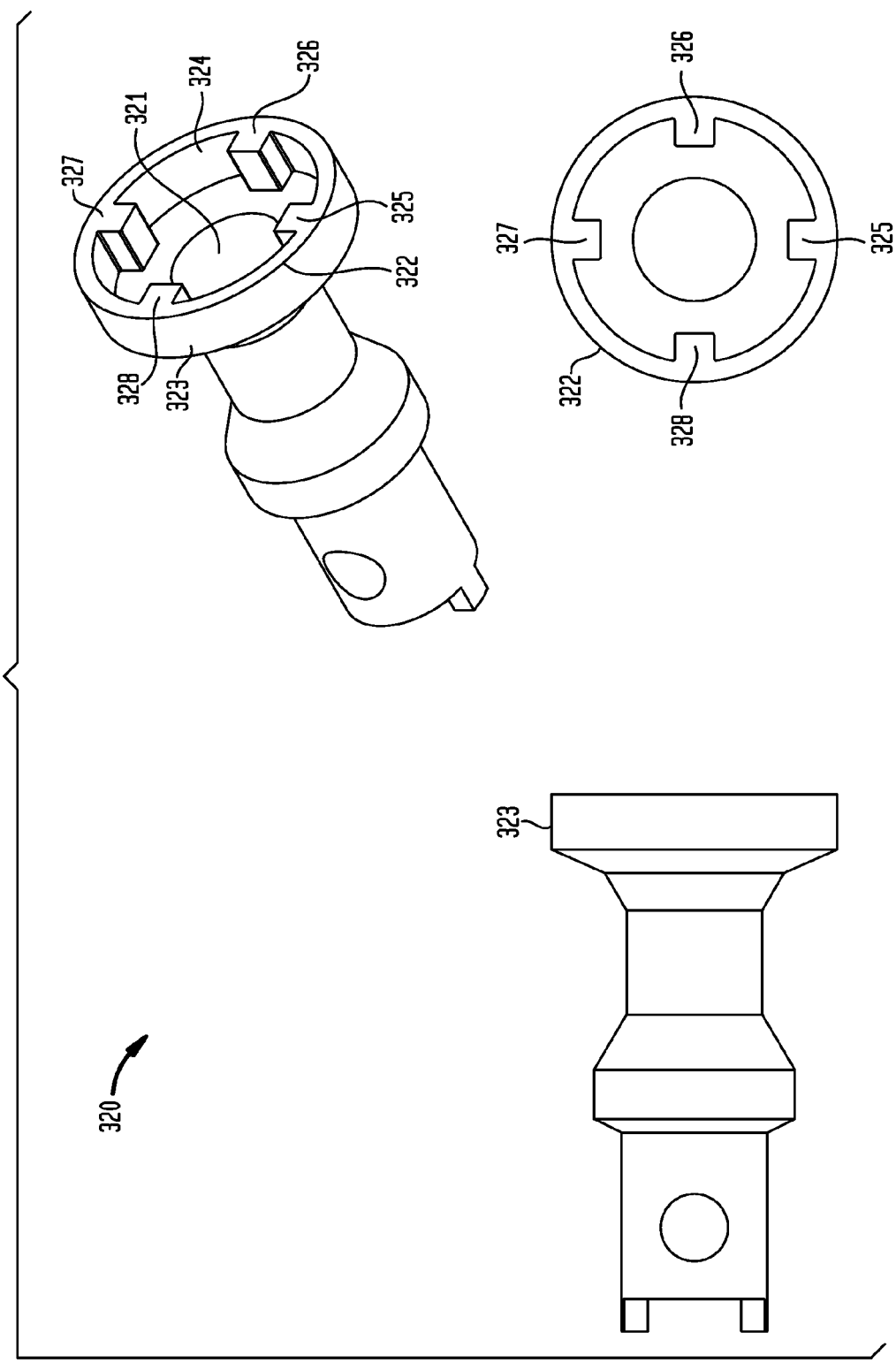
FIG. 32 illustrates a plurality of recessed pockets within the working end of a cartridge drive gear shaft.

FIG. 32 illustrates a plurality of recessed pockets within the working end of a cartridge drive gear shaft 320. The working end 323 is empty or hollow creating a recess 321 enclosed by a thin ring 322. The ring wall 324 contains a plurality of ribs 325, 326, 327, 328 pointed inward toward the center of the working end recess. A pocket 329 consists of the area located between adjacent ribs. When the cartridge is inserted into the printer, the recess 321 would fit over the top of the printer drive mechanism and the pockets 329 would be located over the points on the print drive mechanism. The ribs would catch and be engaged by the points on the printer drive mechanism.

Figure 33:
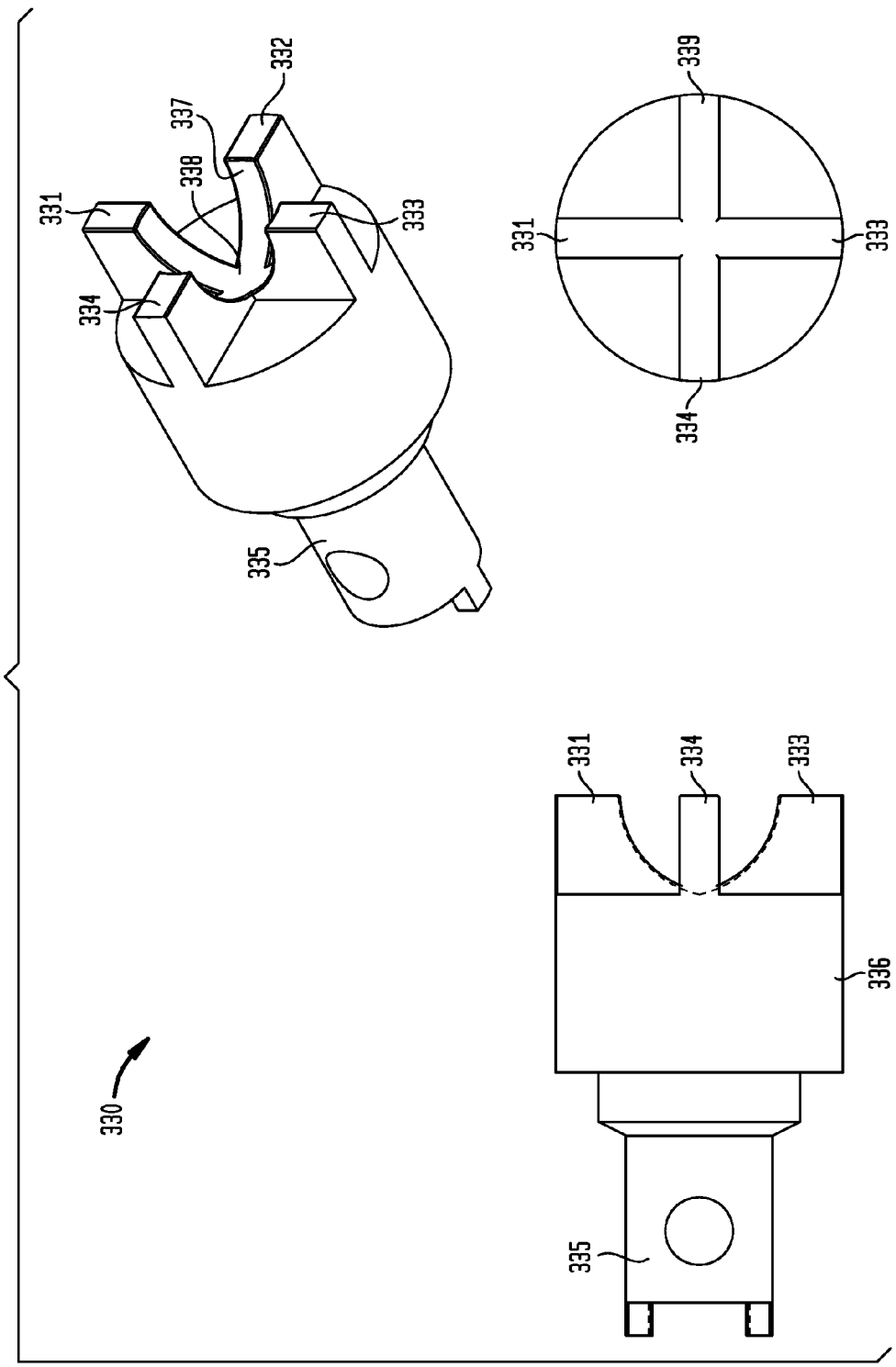
FIG. 33 illustrates a plurality of prongs attached to the working end of the cartridge drive gear shaft.

FIG. 33 illustrates a plurality of prongs attached to the working end of the cartridge drive gear shaft 330. A plurality of prongs 331, 332, 333, 334 extend out from the flat working end in a direction substantially parallel to the axis of the drive shaft 335 and at least one side of the prong is aligned with the side of the working end 336. The working end may contain two, three, four or more prongs and the prongs may or may not be diametrically opposed to each. The prongs 331, 332, 333, 334 may or may not be attached to each either adjacently or oppositely. The side of each prong 337 oriented toward the center of the working end may contain a circular recess 338 cut such that a plurality of similarly cut prongs 331, 332, 333, 334 do produce a recess portion 338 in the center of the working end. The collection of such prongs may produce a cross with a center 339 at the center of the working end. When the cartridge is inserted into the printer, the recess portion 338 would fit over the top of the printer drive mechanism and the points on the print drive mechanism would fit between the adjacent prongs.

Figure 34:
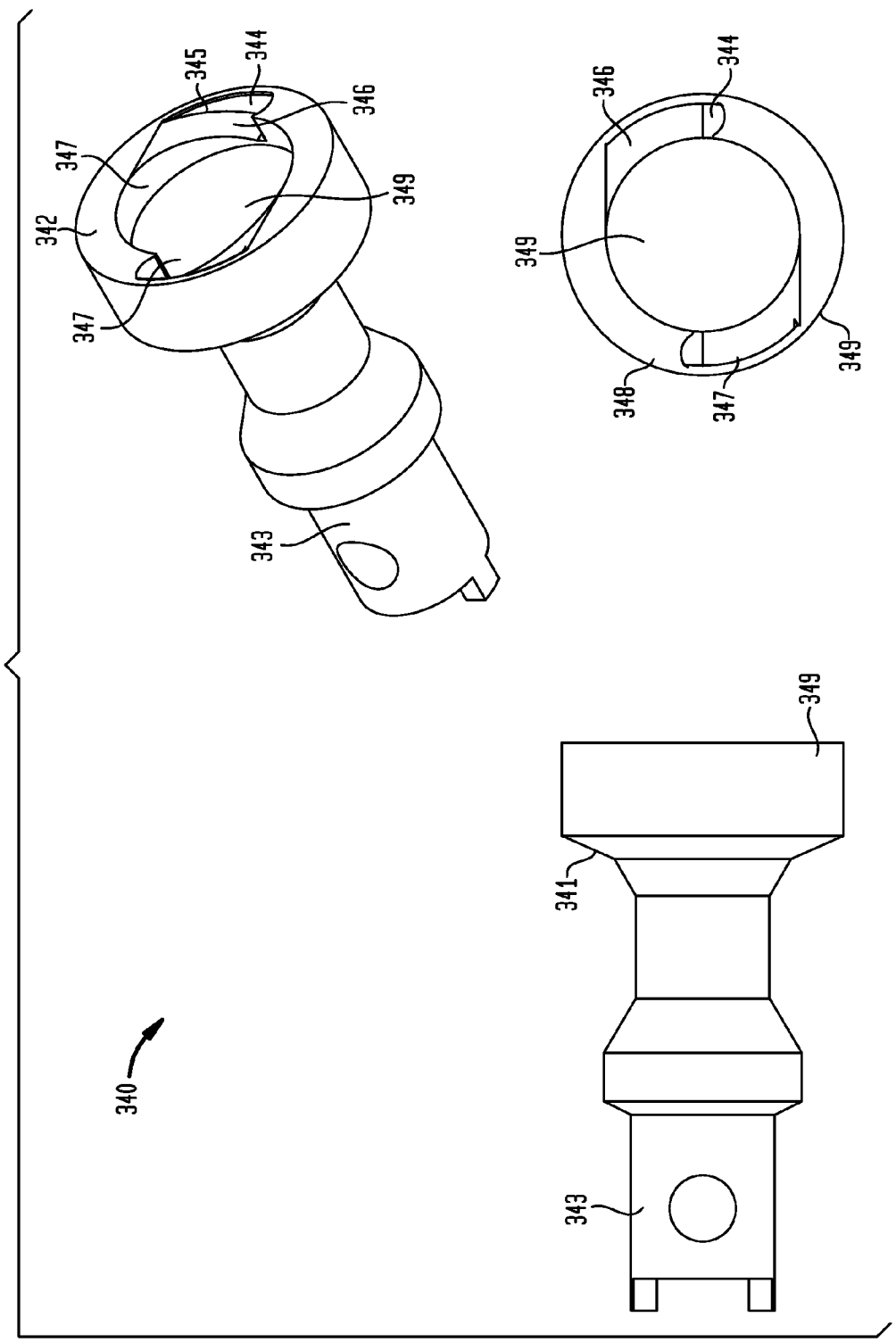
FIG. 34 illustrates a groove inside the working end of the cartridge drive gear shaft.

FIG. 34 illustrates a groove inside the working end of the cartridge drive gear shaft 340. The working end 341 contains a circular ledge 342 that forms a cylinder shape 349 wherein the axis of the cylinder is the same as the axis of the drive shaft 343. The cylinder 349 is closed on the end nearest to the working end 341 drive shaft main portion 343. The ledge 342 contains an engaging portion being formed in a circular shape. The ledge is thick enough as to be able to have tapered recesses 345 cut into the inside of the ledge. The ledge 342 contains a plurality of grooves 346, 347 cut into the body of the ledge. Each groove 346 begins with an opening 344 in the ledge 342 and circles along the inside 346 of the ledge, ending where at a point prior to the beginning opening of an adjacent groove 348. The inside of the ledge 342 will remain open from the cut. The inside of the engaging part of the cartridge drive gear shaft will have an open circle 349 formed from the ledge. The open circle 439 in the middle of the engaging portion of the cartridge drive gear shaft will fit over the printer drive mechanism and the points will fit into the grooves 346, 347. As the printer drive mechanism is rotated the points will move up into the grooves 346 and engage the working end, which will transfer rotational energy from the printer driver mechanism to the cartridge.

Figure 35:
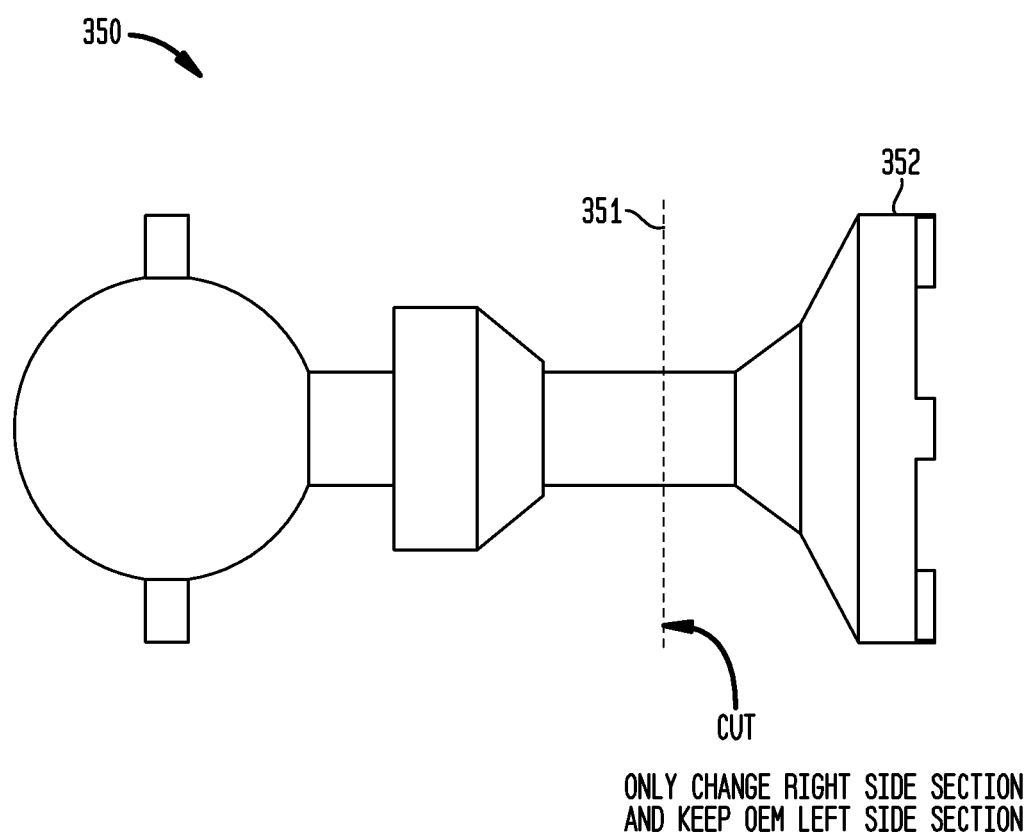
FIG. 35 illustrates a changing only one side the right side of the cartridge drive gear.

FIG. 35 illustrates a means of replacing the working end of the cartridge drive shaft 350. The OEM cartridge drive gear shaft would have to be cut 351 and then the working end 352 could be removed and replaced with and engagement portion that would mate and interface with the printer drive member. Alternately, only one half of the working end end section could be replaced with the other half remaining as it currently arranged. When the cartridge is inserted into the printer, the replacement working end end portion engages the printer drive member.

Figure 36:
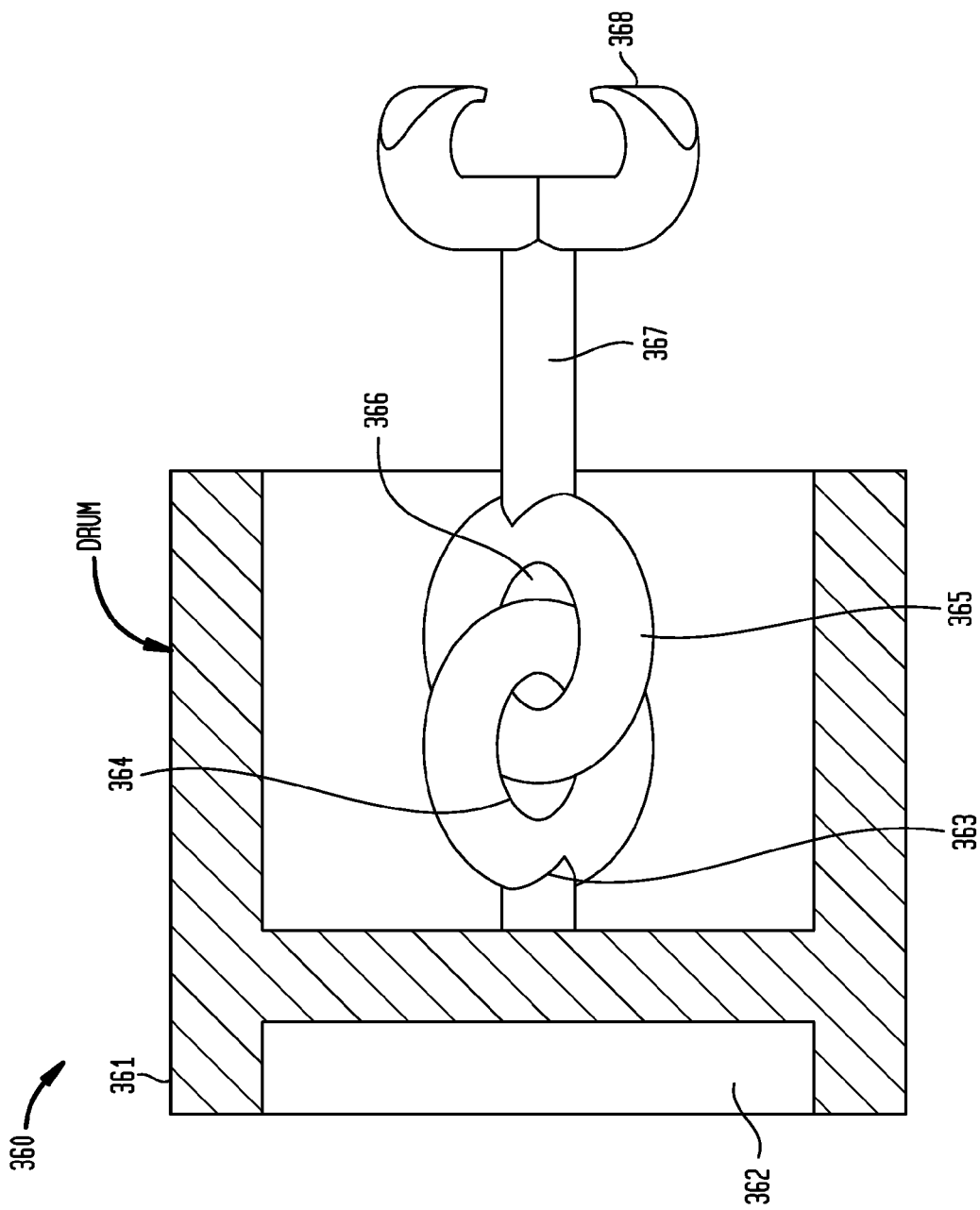
FIG. 36 illustrates a chain link base end for cartridge drive gear shaft.

FIG. 36 illustrates a chain link working end for cartridge drive gear shaft 360. The working end 361 is a hollow cylinder like a pipe or drum with the end nearest the drive shaft closed 362. In the center of the closed end is a first loop 363 comprised of a first outer circle section 364 surrounding a first empty space. The first loop is secured by attachment substantially near the center of the working end inside of the cylinder. Attached to the first loop 363 is a second loop 365 made up of a second outer circle section 366 surrounding and enveloping a second empty space. The second loop 365 may be attached by a shaft 367 to any manner of device that can accommodate the printer driver 368 mechanism. The first loop 363 and the second loop 365 are attached together by the first outer circle section 364 passing through the second empty space 366 while simultaneously the second outer circle section 365 passes through the first empty space 364. Alternately, the first loop 363 and the second loops 365 may be connected by at least one link of chain connecting the first loop 363 with the second loop 365 without either loop directly interacting with the other loop.

Figure 37:
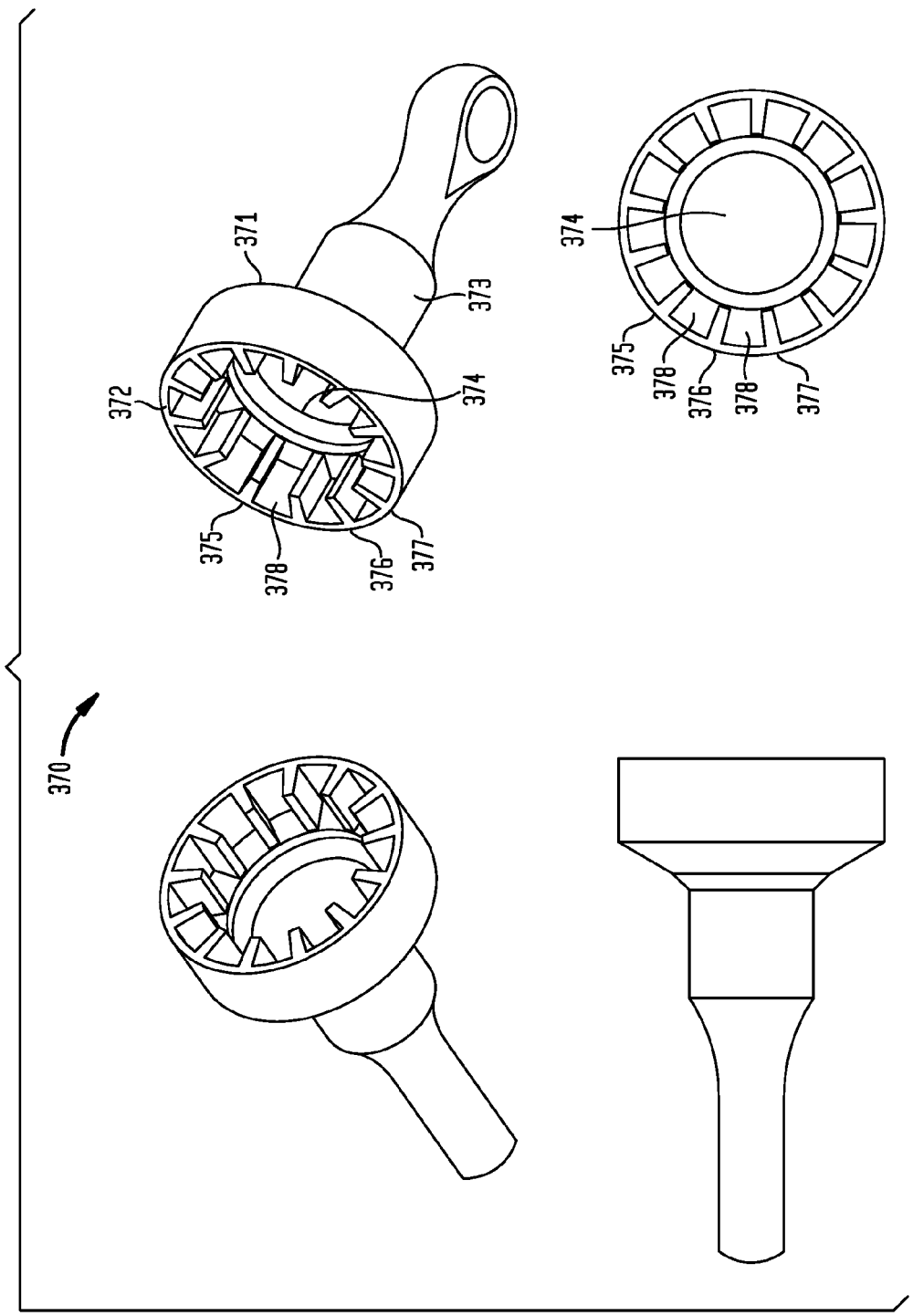
FIG. 37 illustrates 13 ribs lining a cylinder on the working end of the cartridge drive gear shaft.

FIG. 37 illustrates a rib lined cylinder on the working end of the cartridge drive gear shaft 370. The cylinder 371 is comprised of a ring 372 attached to the working end where the height of the ring runs in a direction perpendicular to the drive shaft 373. The interior 374 of the ring is empty. A plurality of ribs 375, 376, 377 spaced equal distantly apart 378 from each adjacent rib 375, 376, 377 are attached to the side of the ring and facing inward toward the center 374 of the ring. The present ring contains 13 such ribs but any number of ribs may be employed. An odd number of ribs such as 3, 5, 7, 9, 15 and the like would prevent any two ribs from being diametrically opposite. When the cartridge is inserted into the printer, the interior 374 which is empty engages the printer drive member and the printer drive mechanism points are engaged between the equal distantly apart 378 ribs 375, 376.

Figure 38:
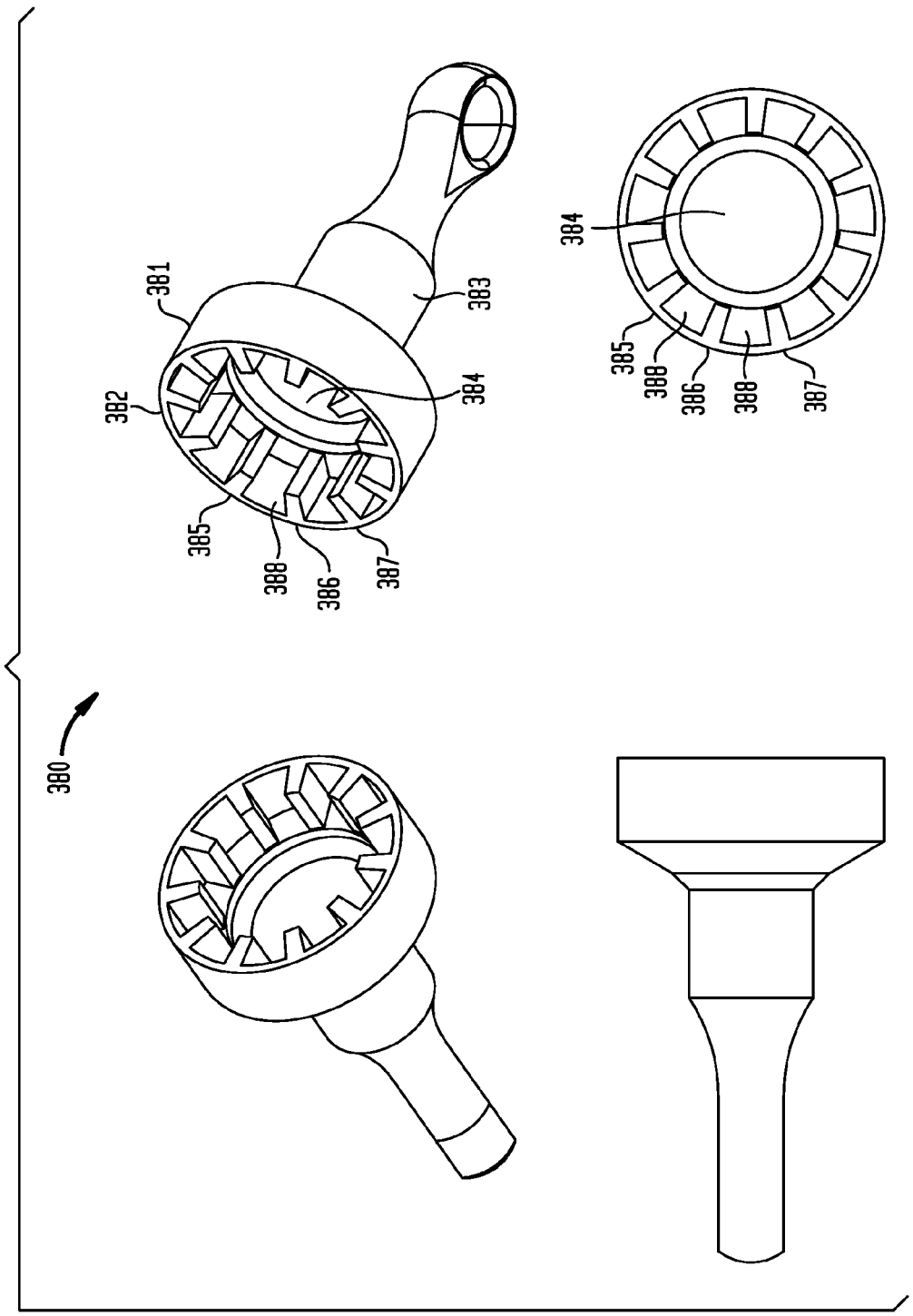
FIG. 38 illustrates 11 ribs lining a cylinder on the working end of the cartridge drive gear shaft.

FIG. 38 illustrates 11 ribs lining a cylinder on the working end of the cartridge drive gear shaft 380. The cylinder 381 is comprised of a ring 382 attached to the working end where the height of the ring runs in a direction perpendicular to the drive shaft 383. The interior of the ring 384 is empty. A plurality of ribs 385, 386, 387 spaced equal distantly apart 388 from each adjacent rib are attached to the side of the ring and facing inward toward the center of the ring. The present ring contains 11 ribs 385, 386, 387, but any number of ribs may be employed. An odd number of ribs would prevent any two ribs from being diametrically opposite. When the cartridge is inserted into the printer, the interior 384 which is empty engages the printer drive member and the printer drive mechanism points are engaged between the equal distantly apart 388 ribs 385, 3865.

Figure 39:
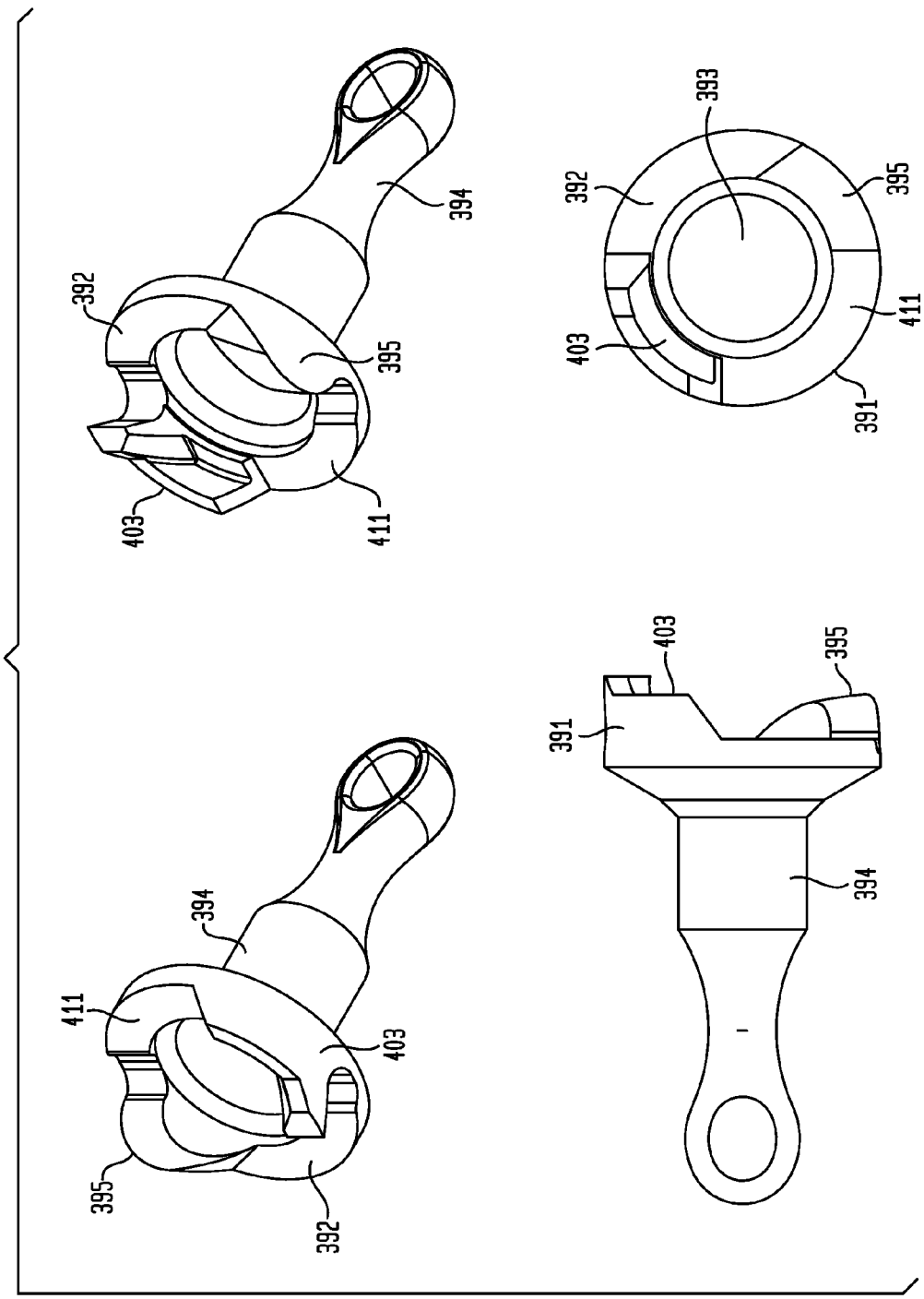
FIG. 39 illustrates an asymmetric working end for cartridge drive gear shaft.

FIG. 39 illustrates an asymmetric working end for cartridge drive gear shaft 390. The working end 391 comprises a flat bottomed portion of a ring 392, 411 with a surface on the bottom of the working end and a recess 393 in the center. The flat bottom portion of the ring 392, 411 on the working end contains two separate and distinct extensions, a rounded side first extension 395 and a claw side second extension 403. The extensions 395, 411 are attached in substantially opposite sides of the working end ring 392 and extending in a direction parallel to the axis of the drive shaft 394.

Figure 40:
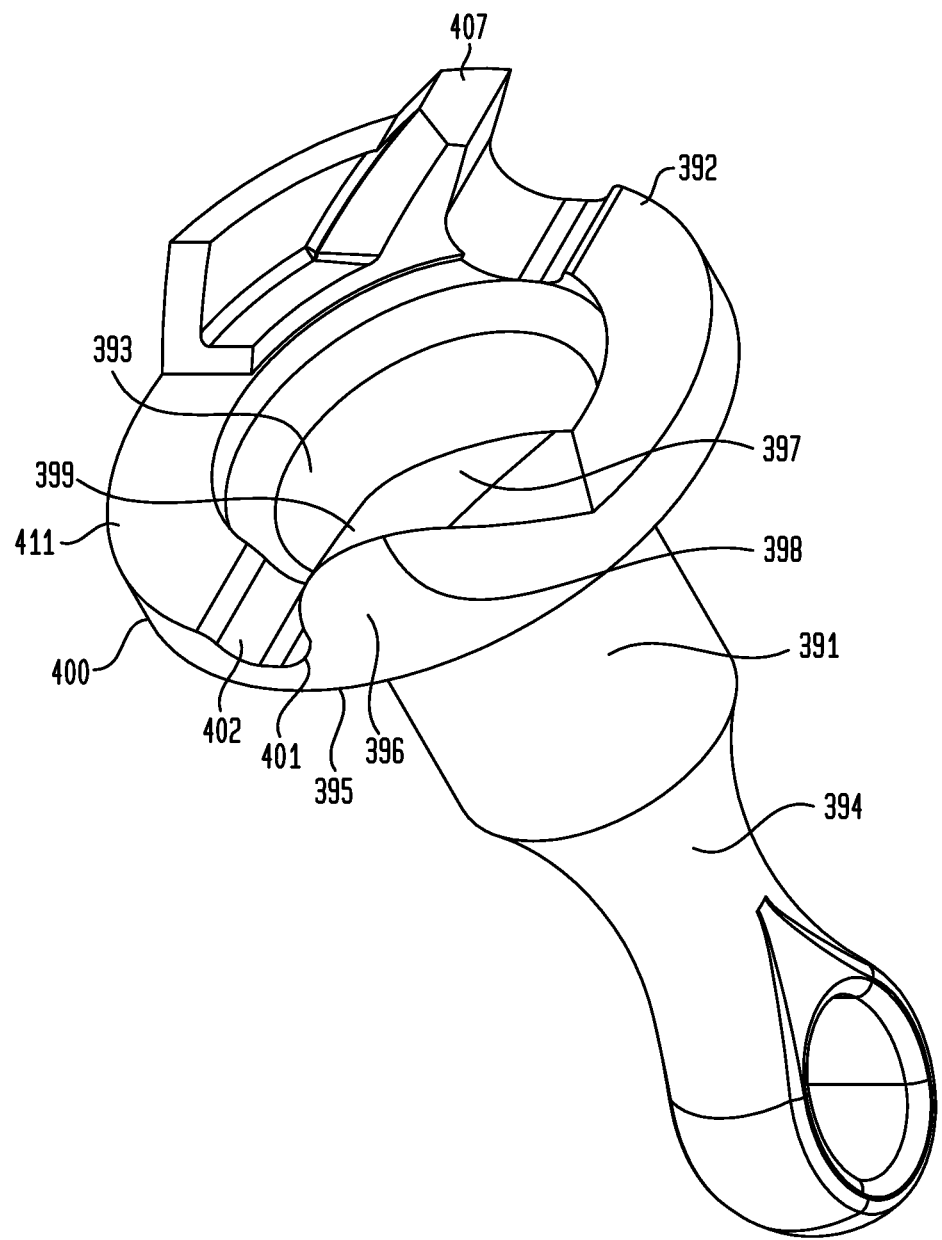
FIG. 40 illustrates a claw side of the asymmetric working end for cartridge drive gear shaft.

FIG. 40 illustrates the rounded side extension 395. The extension 395 contains a rounded side 396 and a notch side 400, the sides being perpendicular to and resting on the working end 391 between the two ring flat bottom potions 392, 411. The rounded side 396 contains an angular ramp 397 which gradually curves up 398 from the ring surface 392 to the peak 399 of the extension. The notch side 400 comprises an essentially flat portion 401 extending from the peak 399 of the round side 396 to a point below 401 the ring surface 411. The point below 401 the ring surface 411 is the side of a semi-circle shaped indentation below the surface of the ring 411, which is a notch 402.

Figure 41:
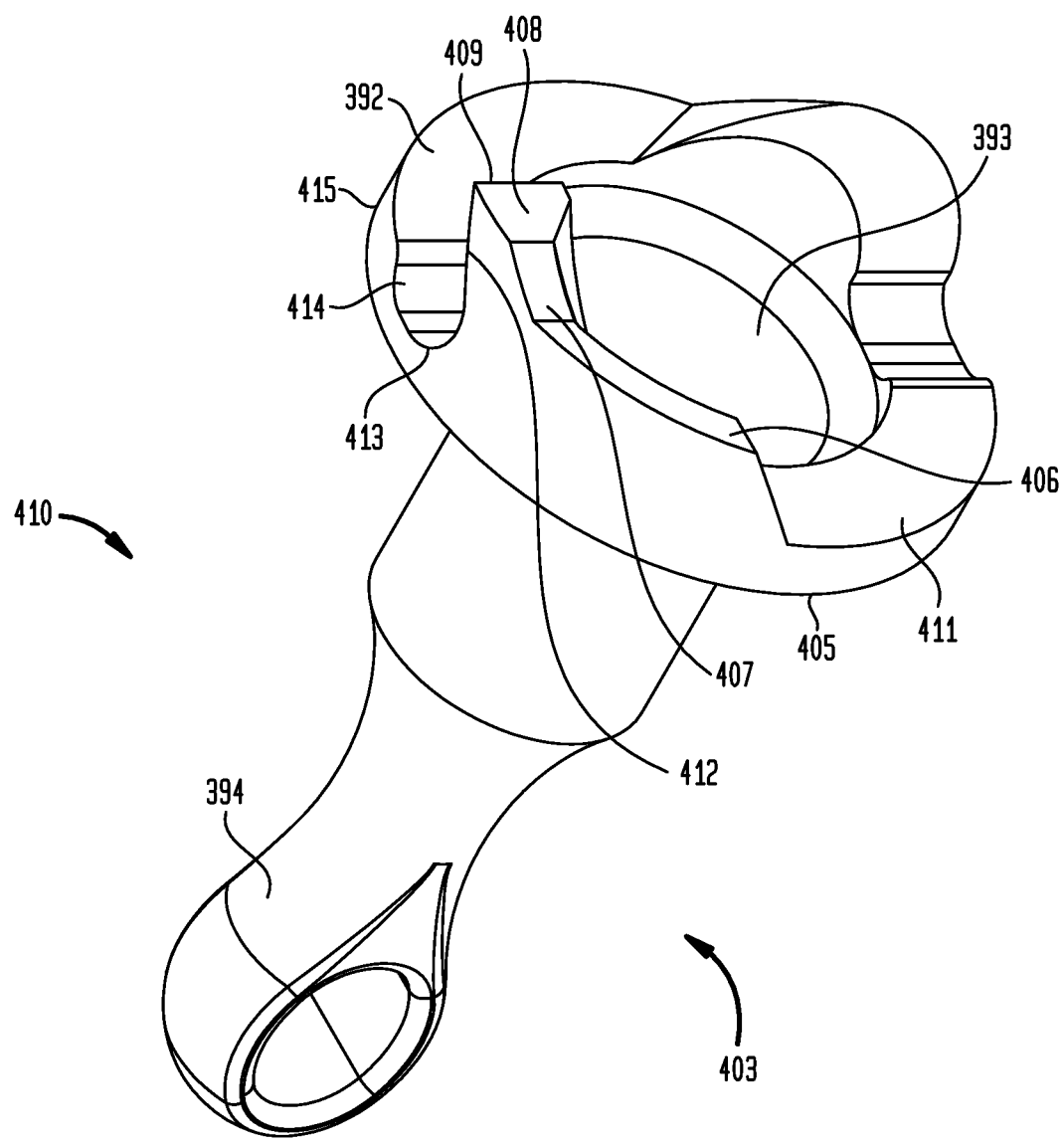
FIG. 41 illustrates a round side of the asymmetric working end for cartridge drive gear shaft.

FIG. 41 illustrates the claw side extension 403. The claw side extension 403 contains a ramp side 404 and a claw side 410. The ramp side 404 begins with the surface of the ring 411 which leads to a ramp 405 and extends up and away from the surface of the ring 411 to a plateau portion 406. The plateau portion 406 is substantially at the same height from the surface of the ring as is the peak 399 of the first extension 395. The plateau portion then leads to a second smaller ramp 407 which leads to a top substantially flat second plateau portion 408 which extends to and ends at a sharp point 409 on the claw side 410. The claw side 410 contains a sharp point 409 formed by the intersection of the second plateau portion 408 and a drop off 412. The drop off 412 then tapers back as a semi-circular surface 413 gradually transitioning back up 414 to the surface of the ring 392. The surface under the claw forms a notch 415. The notch 415 is also located below the surface of the ring surface 392.

When the cartridge is inserted into the printer, the recess 393 would fit over the top of the printer drive mechanism and the points on the print drive mechanism would slide into and fit into the notches 402, 415. The notches 402, 415 would securely receive and retain the points such that when the printer drive mechanism rotates, the points are securely seated in the notches 402, 415 and transfer the rotational force to the cartridge drive shaft.

Figure 42:
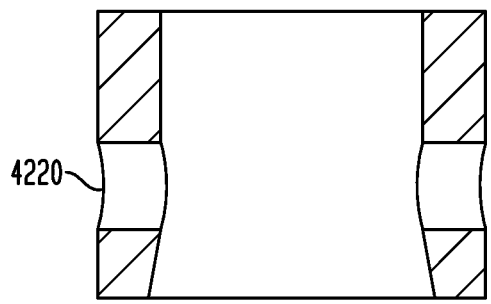
FIG. 42 illustrates a base end of the cartridge drive gear shaft.

FIG. 42 illustrates a base end 4200 of the cartridge drive gear shaft. This base end is used to connect the cartridge drive gear shaft to the printer cartridge gear. This base end 4200 may be used with any of the drive gear shafts described above. The base end is cylindrical and has two holes 4220.

Figure 43A:
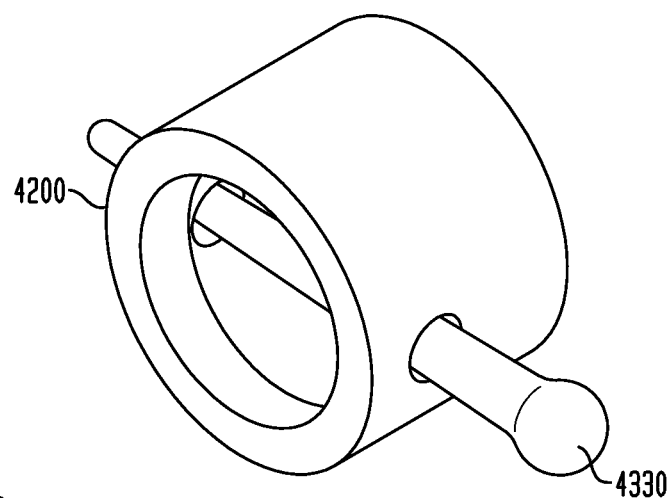
FIG. 43A illustrates the base end with a pin.
Figure 43B:
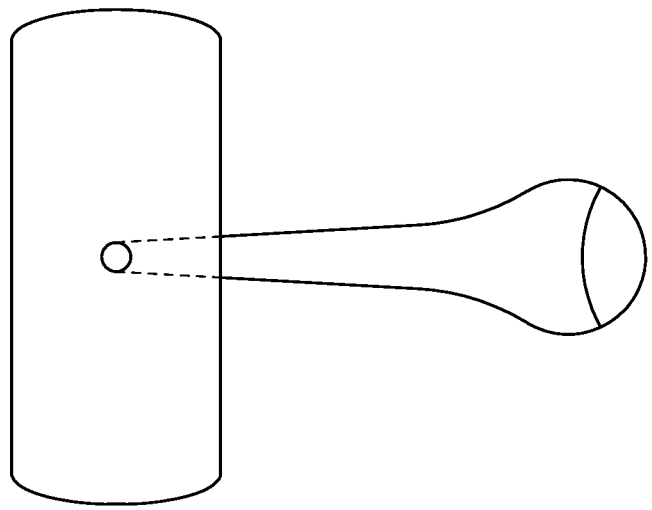
FIG. 43B illustrates the base end having the cartridge drive gear shaft mounted thereon.

FIG. 43 illustrates how the base end is used to hold the cartridge drive gear shaft. The two holes receive a pin that may extend beyond the exterior wall of the base end. The cartridge drive gear shaft is mounted onto the pin via an eyelet (as shown in FIG. 41), a hole in the shaft, or some other feature. The cartridge drive gear is able to rotate about the pin in an angular direction. The base unit limits the range of motion of the cartridge drive gear shaft.

In alternative embodiment, the drive gear shaft is attached via a link as shown in FIG. 36. In this embodiment there is no pin in the base end. The base end may be provide with two protrusions where the holes were located in order to allow for the base to engage with the print cartridge gear.

Figure 44:
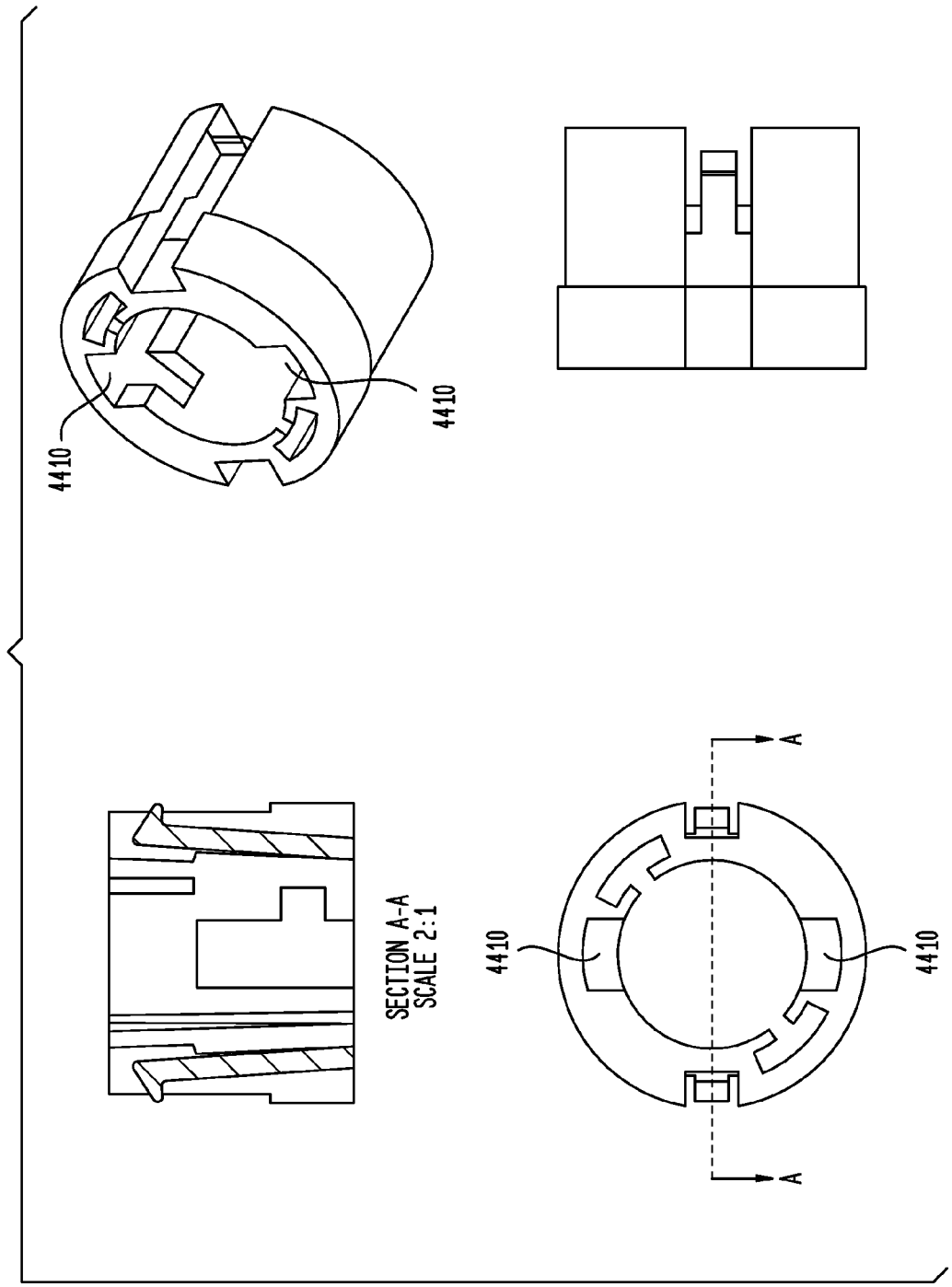
FIG. 44 illustrates an interior of the print cartridge gear.

FIG. 44 illustrates an interior of the print cartridge gear. This interior may be formed as part of the gear or may be inserted that fits inside the gear. The interior of the gear has one or more slots 4410 for receiving the pin 4330 and the one more slots guide the pin to a position that allows transfer of rotation forces from the drive gear element to the gear. Each of the slots extends "vertically" from a distal end towards a base end. The base end is the end nearest the print cartridge. Each of the slots also has a slot that extends in "horizontally" outward. The horizontal slots allows for the base unit illustrated in FIG. 43 to connect via the pin 4330. This configuration also allows for the prior art cartridge drive gear shaft having a ball end to engage the interior of the gear.

FIG. 45 an alternative embodiment of the interior of print cartridge gear. In this embodiment the one or more slots start off "vertically" to receive the pin 4330. The slots then extend diagonally towards the base end of the interior. The slots may extend diagonally in a substantially straight line or in a curved line. The slots have a final vertical drop to receive the pin. When the pin is seated in the vertical drop, rotation of the drive gear is transmitted via the pin to the print cartridge. This embodiment allows for a full range of motion of cartridge drive gear shaft when the base end illustrated in FIG. 43 is used. When the prior art ball base is used, motion is limited to a single direction.

In another aspect of the present invention, the following detailed description of preferred embodiments refers to the accompanying drawings which illustrate specific embodiments of the invention. In the discussion that follows, specific systems and techniques for providing a drive gear for a drum or roller, such as an organic photo conductor (OPC) drum, for example, of a replaceable imaging cartridge adapted for holding marking material, are disclosed. Other embodiments having different structures and operations for the repair, remanufacture and operation of other types of replaceable imaging components, such as other types of drums or rollers, and for various types of imaging devices, such as laser printers, inkjet printers, copiers, facsimile machines and the like, do not depart from the scope of the present invention.

Figure 46:
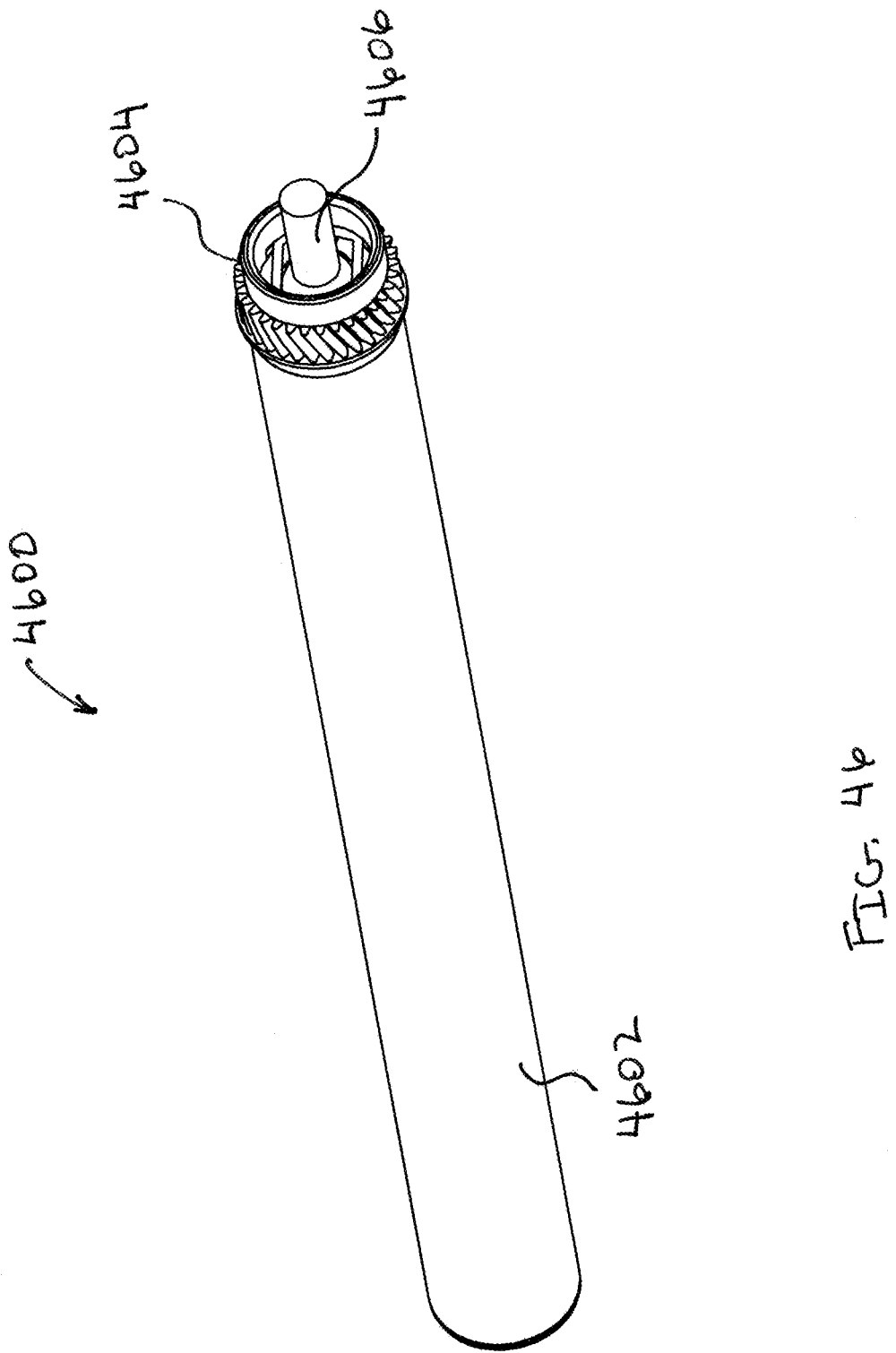
FIG. 46 shows an isometric view of an OPC drum assembly in accordance with the present invention.

FIG. 46 shows an OPC drum assembly 4600 in accordance with one aspect of the present invention. The OPC drum assembly 4600 includes an OPC drum 4602, a drive gear assembly 4604, and a portion of a drum coupling 4606. (For clarity, only a portion of the drum coupling is shown. A complete drum coupling 4606 is shown below in FIG. 47.) One end of the drive gear assembly 4604 is adapted to be attached to a hollow roller or generally cylindrical imaging component, such as the OPC drum 4602. The other end of the drive gear assembly 4604 is adapted to engage a spherical end of the drum coupling 4606, described in greater detail below.

Figure 47:
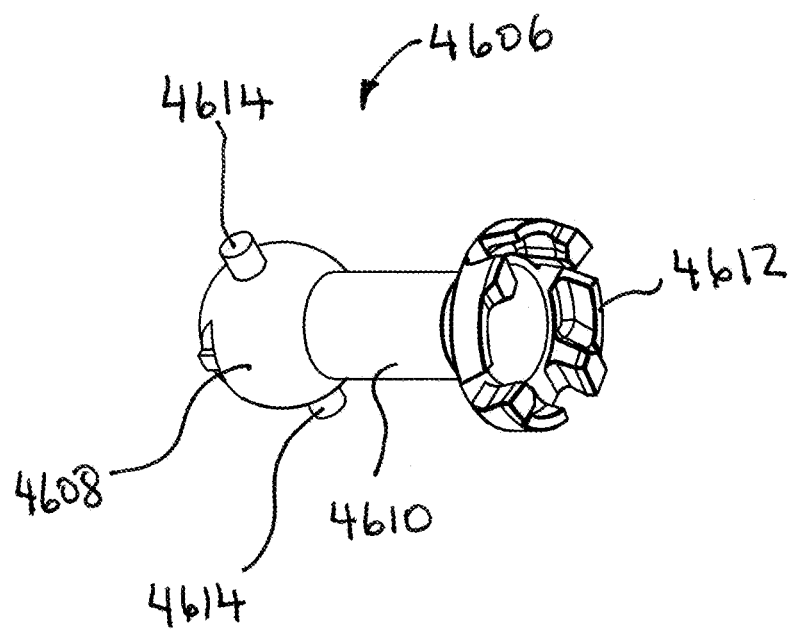
FIG. 47 shows an isometric view of a prior art OPC drum coupling.

FIG. 47 shows a complete prior art drum coupling 4606. The drum coupling 4606 includes a spherical driving portion 4608 on one end, a shaft 4610, and a driven portion 4612 on the opposing end. The spherical driving portion 4608 includes a pin 4614 which extends through the spherical driving portion 4608 and protrudes from opposing sides. In operation, the driven portion 4612 engages with a rotatable element (not shown) of an imaging device. When the rotatable element of the imaging device rotates, the drum coupling 4606 rotates also, which causes the drive gear assembly 4604 and the OPC drum 4602 to rotate also.

Figure 48:
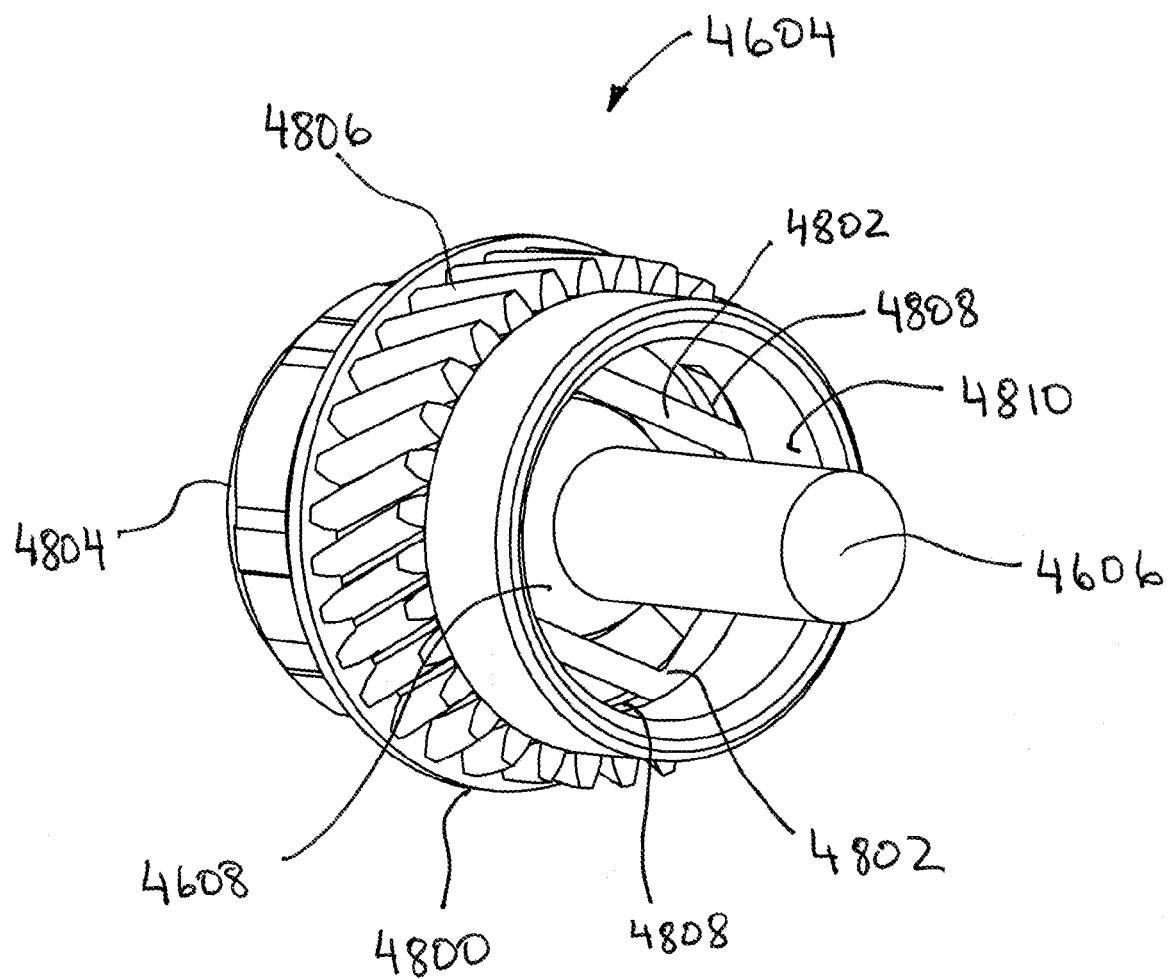
FIG. 48 shows an isometric view of a drive gear assembly in accordance with the present invention.

FIG. 48 shows an isometric view of the drive gear assembly 4604 and the portion of the drum coupling 4606 in accordance with the present invention. The drive gear assembly 4604 includes a drive gear 4800 and a clip 4802 disposed in opposing slots 4808 formed in an inner surface 4810 of the drive gear 4800. The drive gear 4800 may be manufactured in a plastic resin or other materials. The clip 4802 is shaped to engage the slots 4808 and hold the spherical driving portion 4608 of the drum coupling 4606 in place, but also allow drum coupling 4606 limited freedom to rotate and pivot. The clip 4802 is preferably a spring clip and may be round, bent spring material, although other material may be used. In alternate embodiments, a single slot 4808 or a plurality of slots 4808 may be used to hold the clip, depending at least part on the shape of the clip. Additionally, a plurality of clips may be used in the place of a single clip. The drive gear 4800 includes a drum end portion 4804 adapted to engage the generally cylindrical imaging component 4602, such as an OPC drum. A plurality of angled gear teeth 4806 preferably extend from the outer surface of the drive gear 4800 which drive the rest of the cartridge components in addition to the OPC.

Figure 49:
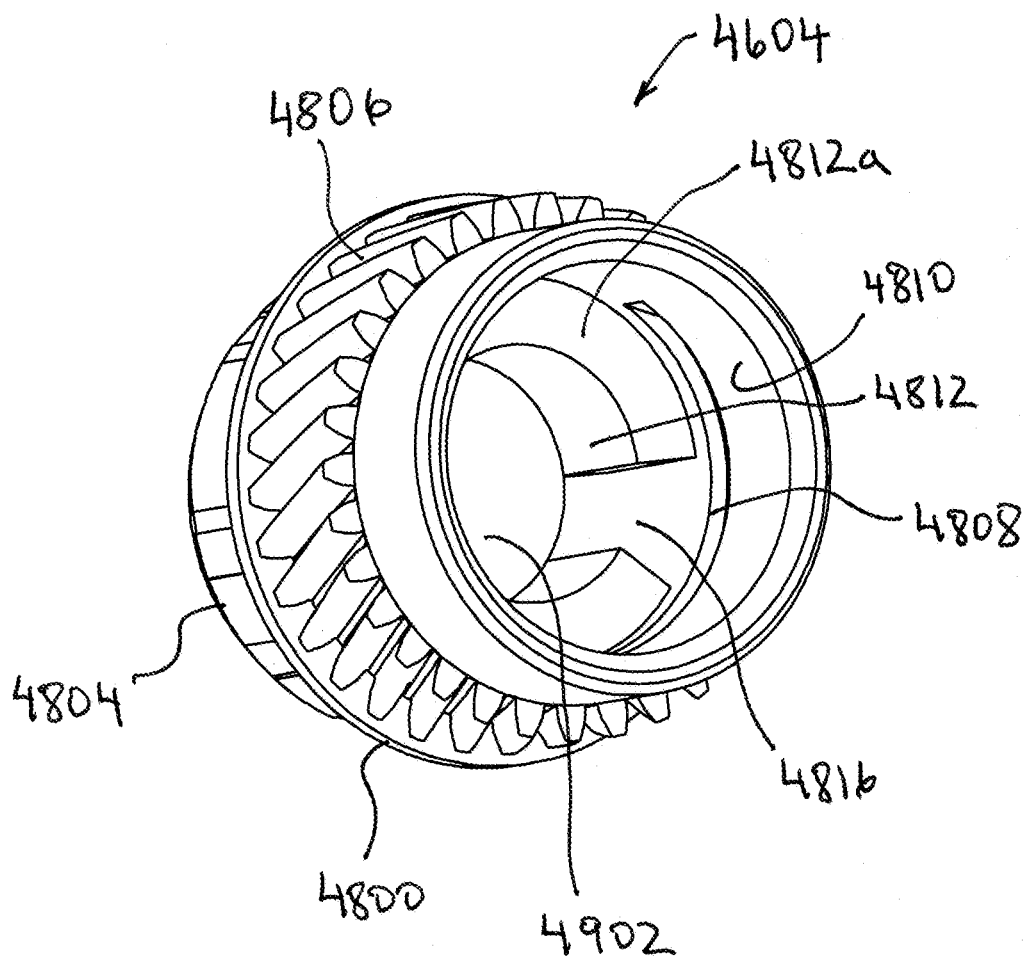
FIGS. 49 and 50 show an isometric view of a drive gear in accordance with the present invention.
Figure 50:
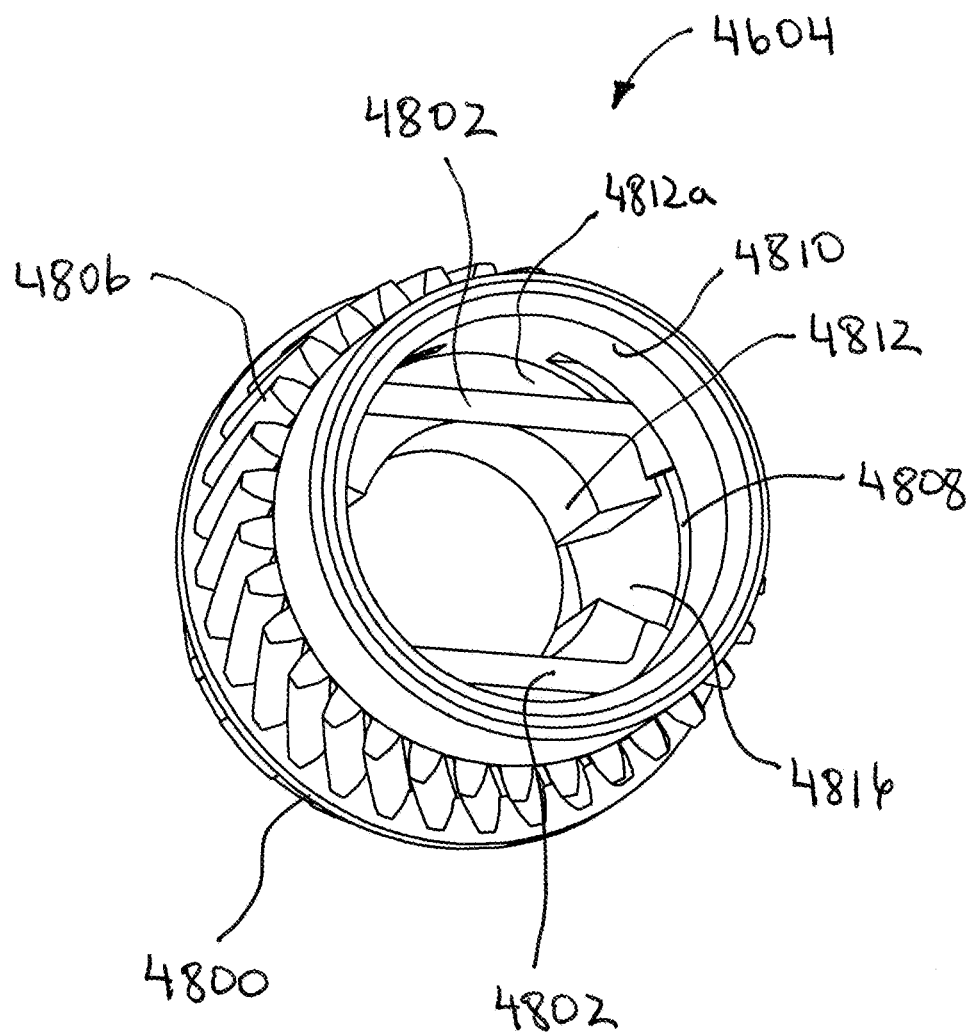
Figure 62:
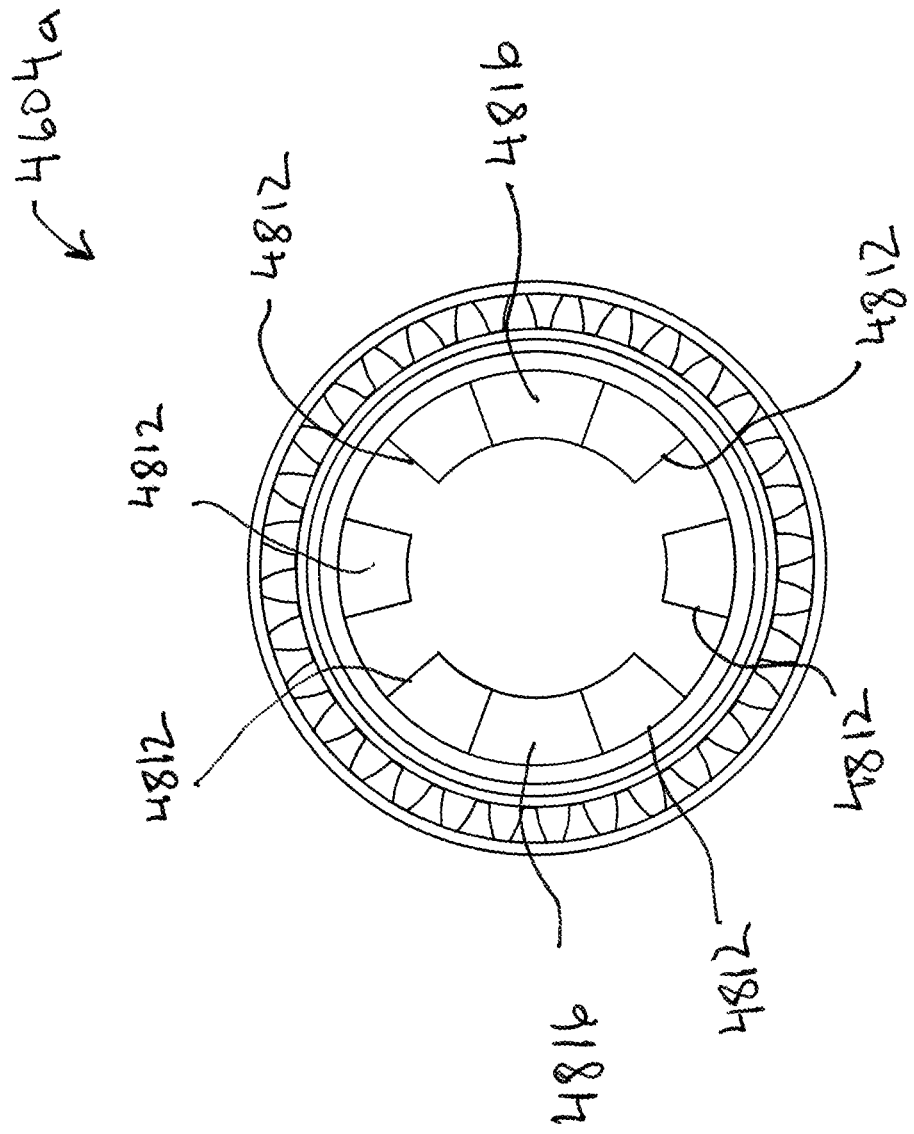
Figure 63:
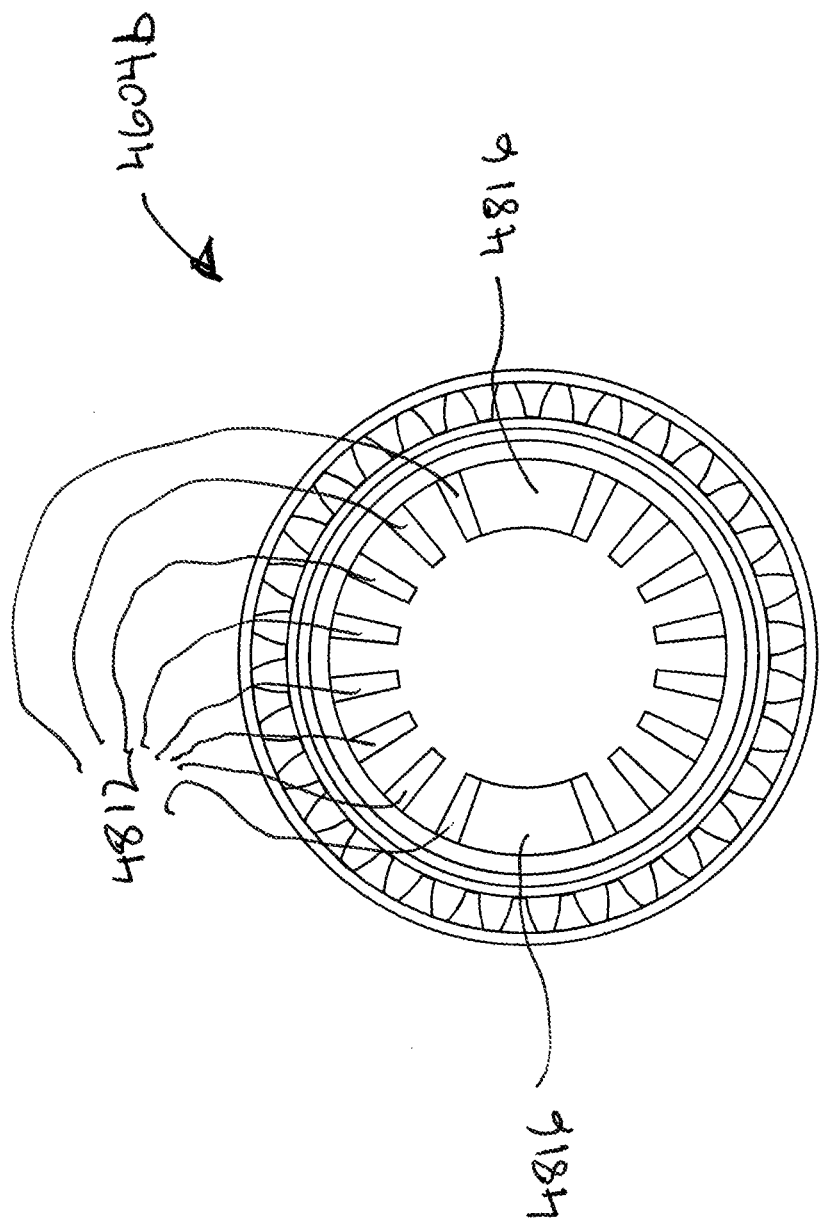

FIG. 49 shows an isometric view of a portion of the drive gear assembly 4604 with the clip 4802 and the drum coupling 4606 removed, providing a clearer view of a portion of one of the slots 4808 of the drive gear 4800. The opposing slots 4808 are disposed in the inner surface 4810 and separated from top surfaces 4812a of two or more inner projections 4812. In an alternate embodiment, the opposing slots 4808 are disposed in the inner surface 4810 and adjacent to the top surfaces 4812a of the inner projections 4812. The inner projections 4812 include voids 4816 on opposing sides of the inner surface 4810. In one embodiment the inner projections 4812 comprise inner side walls as seen in FIG. 49. Other exemplary embodiments of the inner projections 4812 are shown in FIGS. 62 and 63, described below. The voids 4816 provide space to contain the ends of the pin 4614. An end surface 4902 provides a surface for the spherical driving portion 4608 to abut and rotate. Alternatively, three pylons placed in a triangle, a ring or other suitable structure, for example, may provide the surface for the spherical driving portion 4608 to abut and pivot. FIG. 50 shows an isometric view of the drive gear assembly 4604 including the clip 4802 and the gear 4800, but with the drum coupling 4606 removed.

Figure 51:
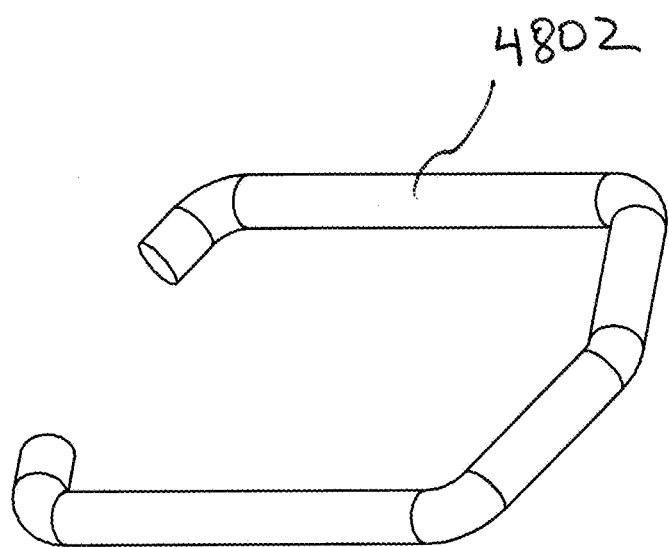
FIG. 51 shows an isometric view of a clip in accordance with the present invention.

FIG. 51 shows the clip 4802 in accordance with one aspect of the present invention.

Figure 52:
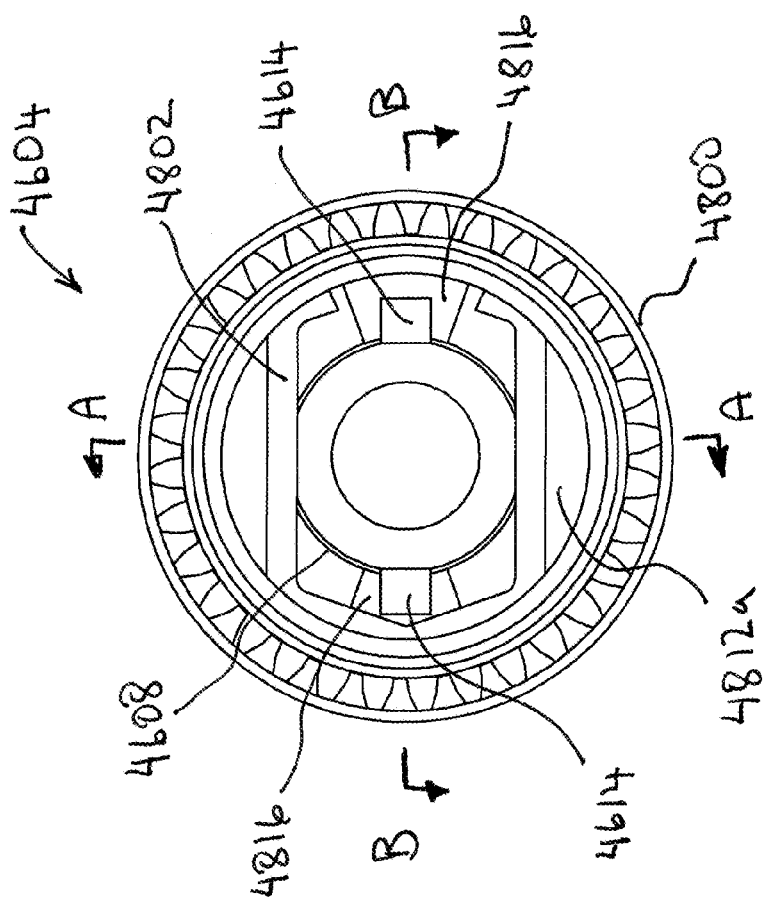
FIG. 52 shows an end view of a drive gear assembly in accordance with the present invention.

FIG. 52 shows an end view of the drive gear assembly 4604 showing the portion of the drum coupling 4606, the gear 4800 and the clip 4802. As can be seen in FIG. 52, the ends of the pin 4614 extend into voids 4816.

Figure 53:
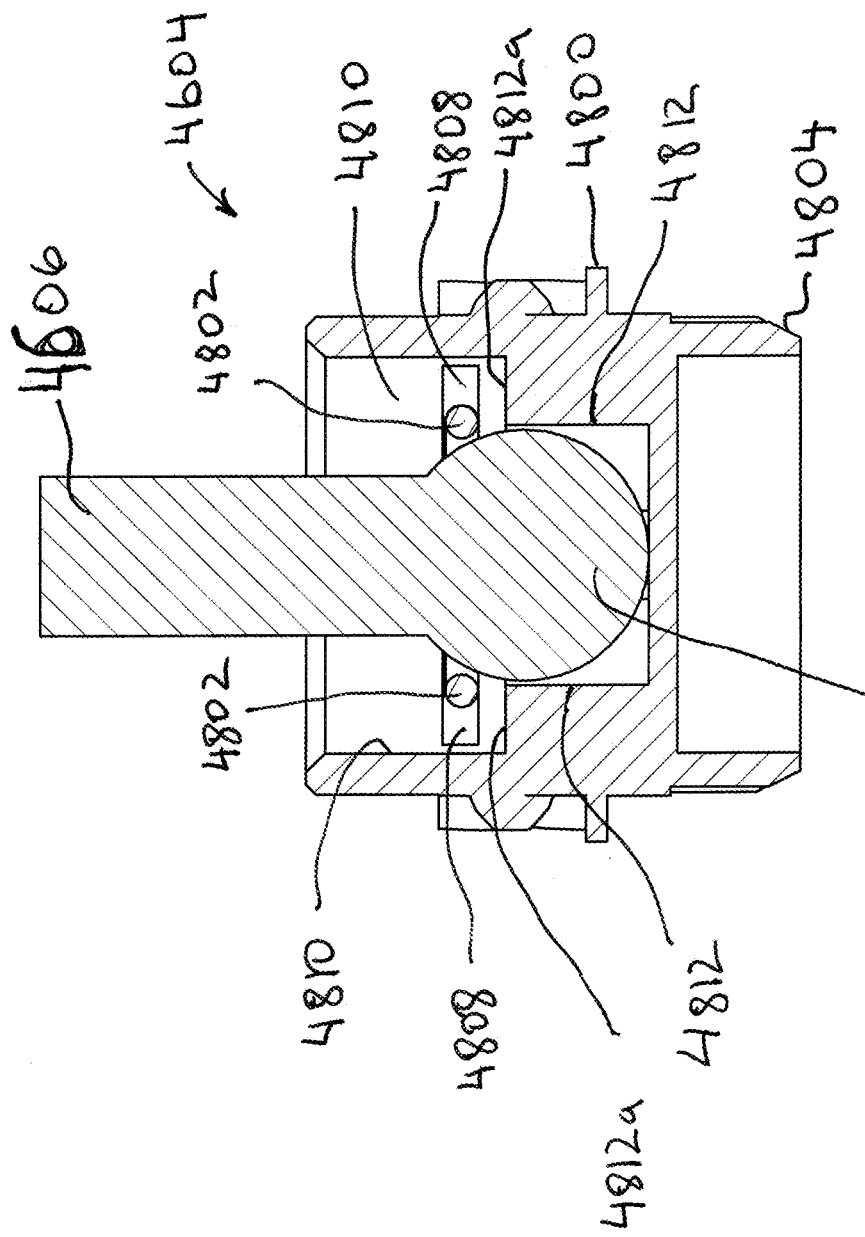
FIG. 53 shows a cross-sectional view taken along lines A-A of FIG. 52 in accordance with the present invention.
Figure 54:
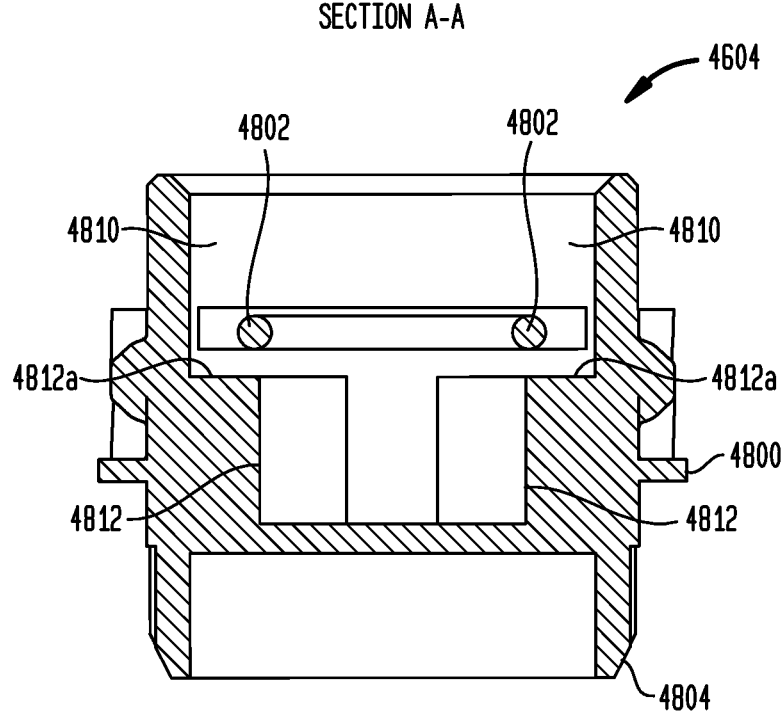
FIG. 54 shows a cross-sectional view taken along lines A-A of FIG. 52 without the drum coupling in accordance with the present invention.
Figure 55:
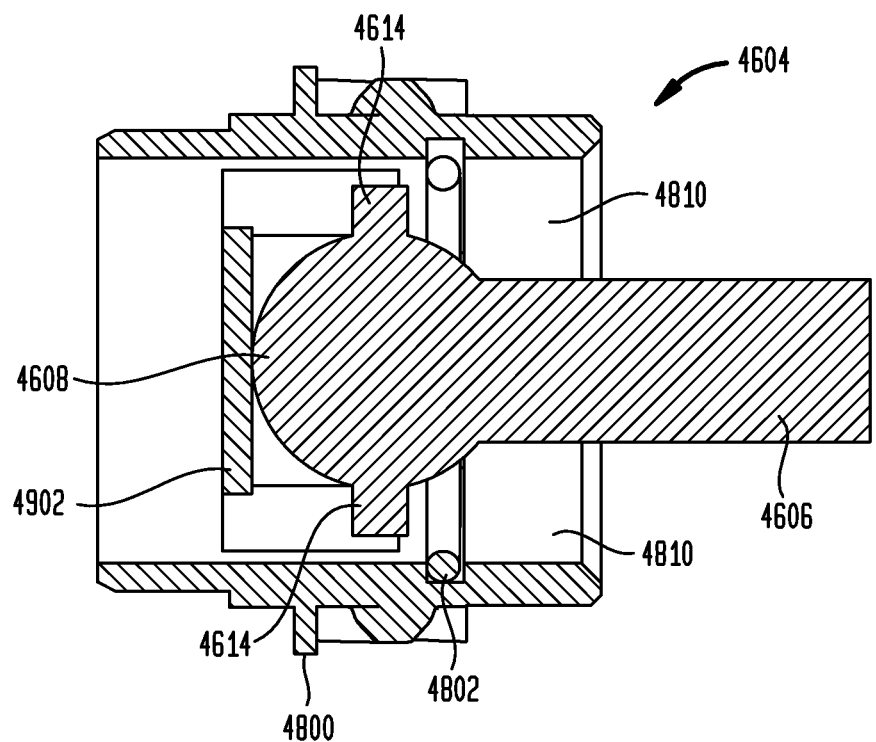
FIG. 55 shows a cross-sectional view taken along lines B-B of FIG. 52 in accordance with the present invention.
Figure 56:
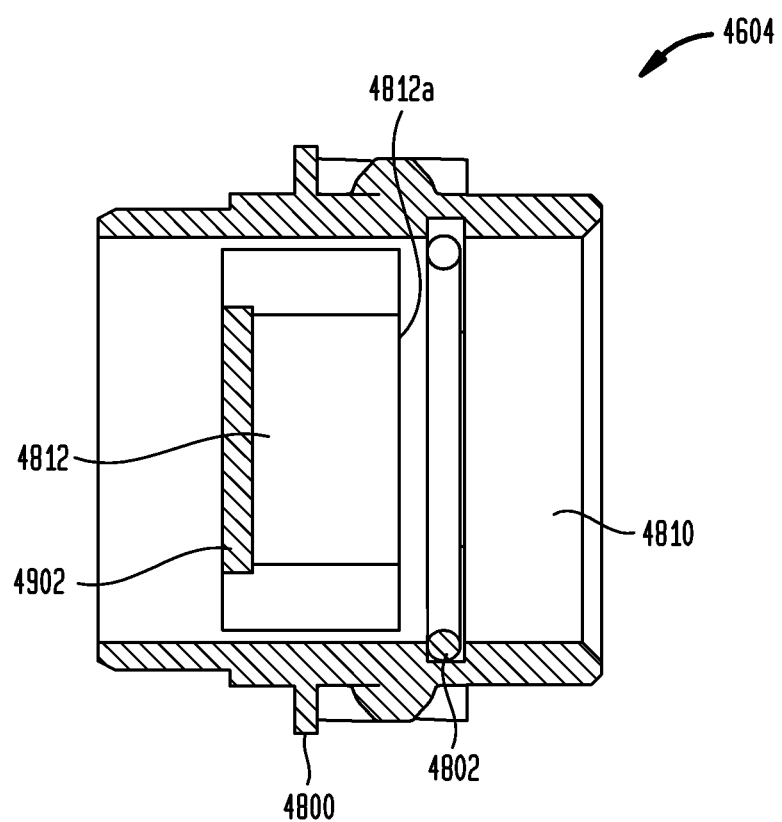
FIG. 56 shows a cross-sectional view taken along lines B-B of FIG. 52 without the drum coupling in accordance with the present invention.
Figure 57:
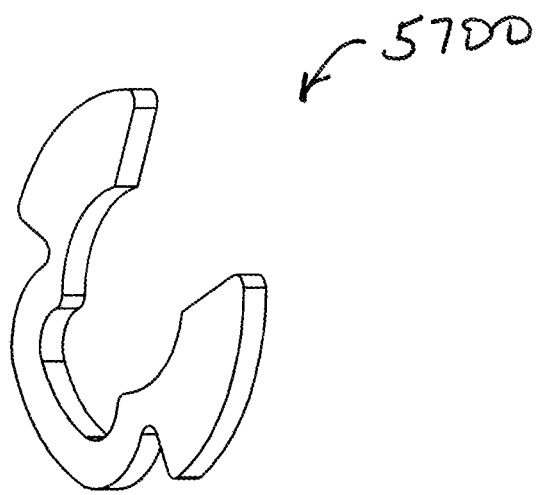
FIGS. 57-61 show a plurality of clips 5700, 5800, 5900, 6000, and 6100 suitable for use with the present invention.
Figure 58:
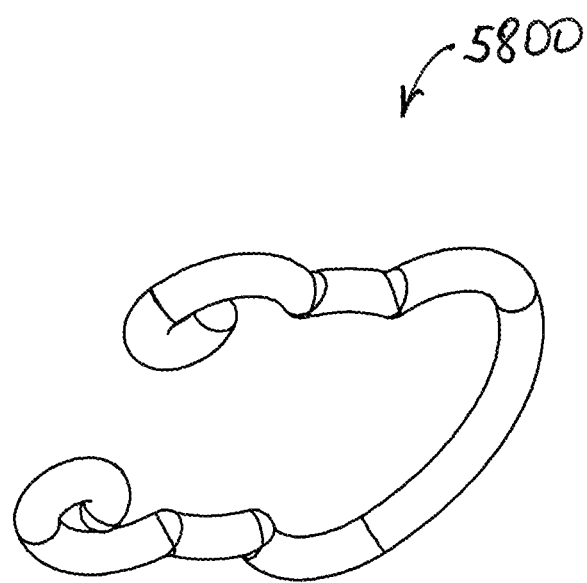
Figure 59:
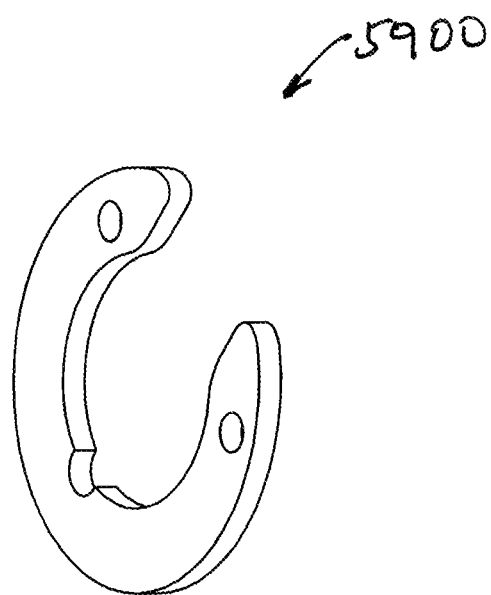
Figure 60:
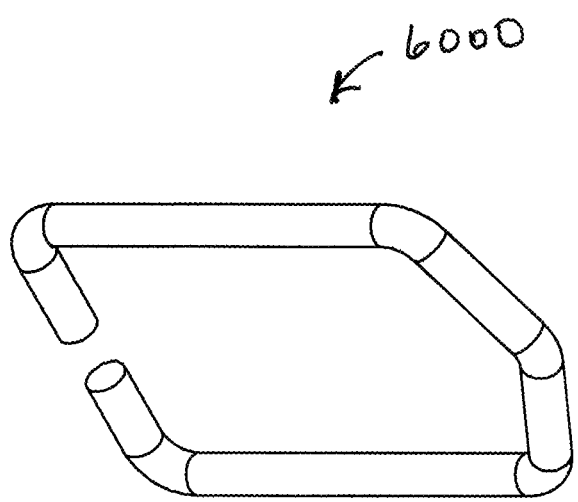
Figure 61:
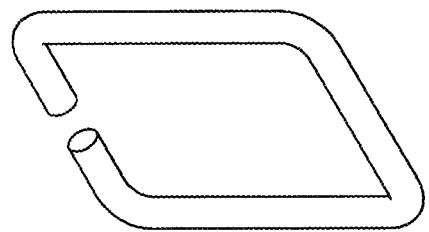

FIG. 53 shows a cross-sectional view taken along lines A-A of FIG. 52 in accordance with one aspect of the present invention. FIG. 54 shows a cross-sectional view taken along the lines A-A without the drum coupling. FIG. 55 shows a cross-sectional view taken along the lines B-B of FIG. 52. FIG. 56 shows a cross-sectional view taken along the lines B-B without the drum coupling. As can be seen clearly in FIGS. 53-56 the slots 4808 are separated from the top surface 4812a by a portion of the inner surface 4810 and the clip does not contact the top surface 4812a. In an alternate embodiment, as described above, the slots are adjacent to the top surface 4812a and the clip 4802.

FIGS. 57-61 show a variety of clips 5700, 5800, 5900, 6000, and 6100 suitable for use with the present invention. Other clip designs may also be used without departing from the teachings of the present invention. As would be understood by one of ordinary skill in the art, the number, placement and dimensions of the slots may need to be modified depending on the specific clip utilized.

Figure 64:
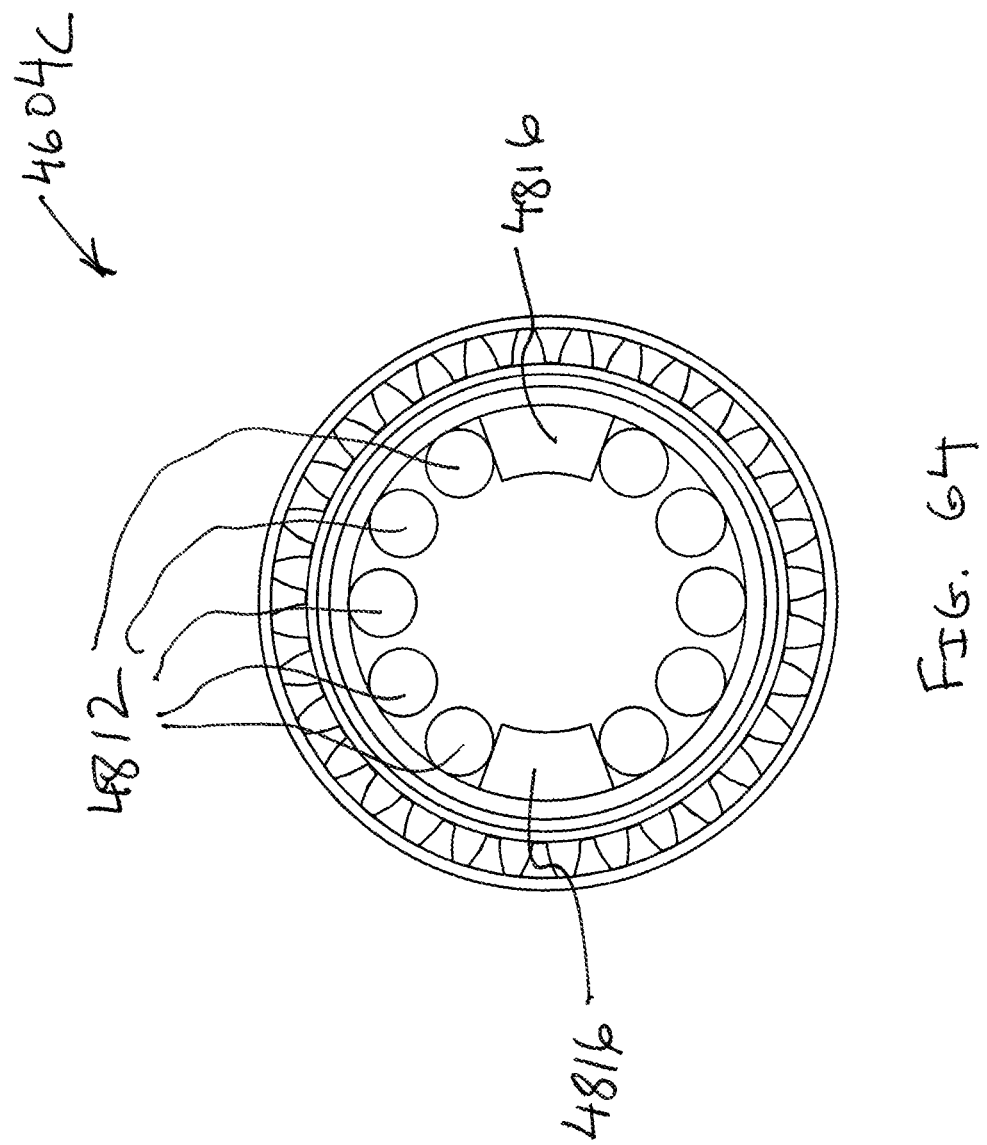
Figure 65:
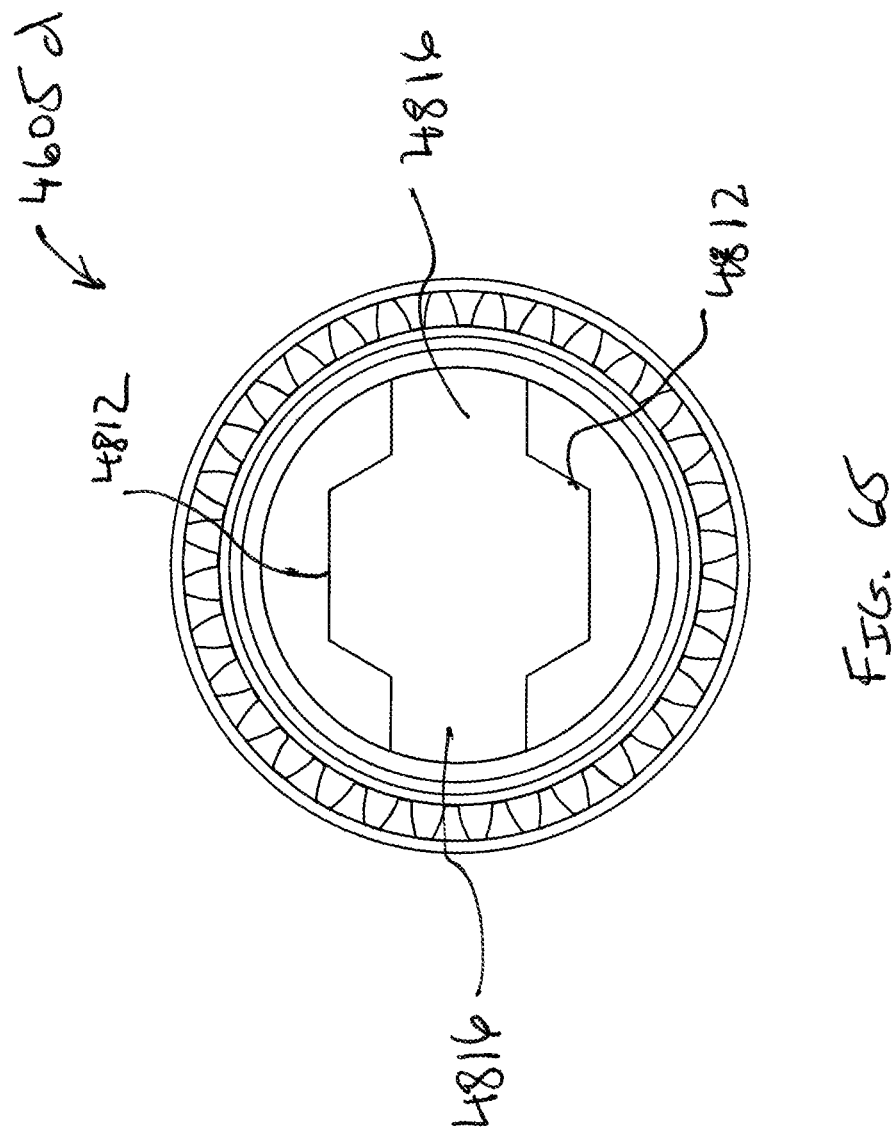

FIGS. 62 and 63 show end views of drive gear assemblies 4604a and 4604b in accordance with another aspect of the present invention. In these alternative exemplary embodiments, the inner projections 4812 comprise a plurality of ribs located to hold the spherical driving portion 4608. FIG. 64 shows an end view of drive gear assembly 4604c in accordance with another aspect of the present invention. In this alternative embodiment, the inner projections 4812 comprise a plurality of ribs having at least one rounded portion. FIGS. 65 and 66 show end view of drive gear assemblies 4605d and 4605e illustrating alternate embodiments of the inner projections 4812.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A cartridge drive gear assembly for holding a drum coupling comprising:
 a drive gear having an outer surface and an inner surface, the inner surface including inner projections which extend into the interior of the drive gear and includes at least two voids disposed on opposing sides of the inner projections; and
 at least one slot disposed in the inner surface,
 wherein the at least one slot is disposed in the inner surface and separated from a top surface of the inner projections.

2. The cartridge drive gear assembly of claim 1 further comprising a clip sized to be held by the at least one slot.

3. The cartridge drive gear assembly of claim 2 wherein the at least one slot comprises two slots disposed in opposing portions of the inner surface.

4. The cartridge drive gear assembly of claim 3 further comprising a drum coupling, the drum coupling including a shaft, a spherical driving portion at one end of the shaft and a driven portion at the opposing end of the shaft, the spherical driving portion including two ends of a pin extending out from the surface of the spherical driving portion,
- wherein the spherical driving portion is disposed at least partially within the inner projections, and
- wherein the ends of the pin are at least partially disposed in the opposing voids of the inner projections.

5. The cartridge drive gear assembly of claim 4 wherein the clip is held in place by the two slots.

6. An OPC drum assembly comprising:
- an OPC drum; and
- a first end of a drive gear mated to one end of the OPC drum, a second end of the drive gear having an outer surface and an inner surface, the inner surface including inner projections which extend into the interior of the drive gear and includes two voids disposed on opposing sides of the inner projections, the drive gear further including at least one slot disposed in the inner surface, wherein the at least one slot is disposed in the inner surface and separated from a top surface of the inner side projections.

7. The OPC drum assembly of claim 6 further comprising a clip sized to be held by the at least one slot.

8. The OPC drum assembly of claim 7 wherein the at least one slot comprises two slots disposed in opposing portions of the inner surface.

9. The cartridge drive gear assembly of claim 8 further comprising a drum coupling, the drum coupling including a shaft, a spherical driving portion at one end of the shaft and a driven portion at the opposing end of the shaft, the spherical driving portion including two ends of a pin extending out from the surface of the spherical driving portion,
- wherein the spherical driving portion is disposed at least partially within the inner projections, and
- wherein the ends of the pin are at least partially disposed in the opposing voids of the inner projections.

10. An OPC drum assembly comprising:
- an OPC drum; and
- a first end of a drive gear mated to one end of the OPC drum, a second end of the drive gear having an outer surface and an inner surface, the inner surface including inner projections which extend into the interior of the drive gear and includes two voids disposed on opposing sides of the inner projections, the drive gear further including at least one slot disposed in the inner surface, wherein the inner projections comprise a plurality of ribs having at least one rounded portion.

11. A cartridge drive gear assembly for holding a drum coupling comprising:
- a drive gear having an outer surface and an inner surface, the inner surface including inner projections which extend into the interior of the drive gear and includes at least two voids disposed on opposing sides of the inner projections; and
- at least one slot disposed in the inner surface, wherein the inner projections comprise a plurality of ribs having at least one rounded portion.

* * * * *

UNITED STATES PATENT AND TRADEMARK OFFICE
CERTIFICATE OF CORRECTION

PATENT NO. : 8,892,004 B2  
APPLICATION NO. : 14/175593  
DATED : November 18, 2014  
INVENTOR(S) : Donald R. Huck et al.

Page 1 of 1

It is certified that error appears in the above-identified patent and that said Letters Patent is hereby corrected as shown below:

Title Page,

Related U.S. Application Data should read

(63) Non-Provisional of application No. 61/965,613, filed on February 3, 2014, and Continuation-in-part of application No. 14/172,351, filed on Feb. 4, 2014, which is a continuation of application No. 13/074,849, filed on Mar. 29, 2011, now. Pat. No. 8,644,733.

Signed and Sealed this
Twenty-seventh Day of October, 2015

Michelle K. Lee
*Director of the United States Patent and Trademark Office*